US011913256B2

(12) United States Patent
Zhang et al.

(10) Patent No.: US 11,913,256 B2
(45) Date of Patent: Feb. 27, 2024

(54) COMBINATION LOCK WITH ELECTRONIC OVERRIDE KEY

(71) Applicant: Digilock Asia Ltd., Kowloon (HK)

(72) Inventors: An Zhang, Shaoguan (CN); Asil Gokcebay, Petaluma, CA (US)

( * ) Notice: Subject to any disclaimer, the term of this patent is extended or adjusted under 35 U.S.C. 154(b) by 525 days.

(21) Appl. No.: 17/106,911

(22) Filed: Nov. 30, 2020

(65) Prior Publication Data

US 2021/0079692 A1 Mar. 18, 2021

Related U.S. Application Data

(63) Continuation of application No. 16/687,223, filed on Nov. 18, 2019, now Pat. No. 10,851,563, which is a (Continued)

(51) Int. Cl.
*E05B 37/00* (2006.01)
*E05B 47/06* (2006.01)
(Continued)

(52) U.S. Cl.
CPC ...... *E05B 47/0657* (2013.01); *E05B 37/0034* (2013.01); *E05B 37/0048* (2013.01); *E05B 37/12* (2013.01); *E05B 47/0001* (2013.01); *E05B 47/0603* (2013.01); *E05B 47/0673* (2013.01); *E05B 49/00* (2013.01); (Continued)

(58) Field of Classification Search
CPC ............. E05B 37/0034; E05B 37/0048; E05B 37/0058; E05B 37/0096; E05B 41/00; E05B 47/0001; E05B 47/0603; E05B 47/0673; E05B 49/00; E05B 65/025; E05B 2047/0084; E05Y 2900/208; G07C 9/00571; G07C 9/00182;
(Continued)

(56) References Cited

U.S. PATENT DOCUMENTS 4,831,851 A 5/1989 Larson
7,047,773 B1 * 5/2006 Lin ...................... E05B 37/025 70/330

(Continued)

FOREIGN PATENT DOCUMENTS

CN 108868356 A 11/2018

OTHER PUBLICATIONS

EPO Machine Translation of Disclosure of CN108868356A.

*Primary Examiner* — Suzanne L Barrett
(74) *Attorney, Agent, or Firm* — Russell C. Petersen

(57) ABSTRACT

A combination lock can be operated manually via the manipulation of dials and by way of an electronic key. The lock includes one or more rotatable selectors each having multiple indicia disposed thereon. Rotation of the rotatable selectors to predetermined indicia places the lock in the unlocked position. The lock can further include an electronic port and an actuator. Upon receipt of a predetermined credential via the port, the actuator can place the lock in in the unlocked position. The lock further includes a knob that, when the lock is in the unlocked position, can be rotated between a first position in which the lock is in a closed position and a second position in which the lock is in an open position. The combination lock may automatically scramble the positions of the dials upon opening for security purposes.

21 Claims, 60 Drawing Sheets

Related U.S. Application Data continuation-in-part of application No. 16/427,226, filed on May 30, 2019, now Pat. No. 10,487,541.

(51) Int. Cl.

| | |
|---|---|
| ***E05B 37/12*** | (2006.01) |
| ***E05B 47/00*** | (2006.01) |
| ***E05B 49/00*** | (2006.01) |
| ***G07C 9/00*** | (2020.01) |
| *E05B 65/02* | (2006.01) |

(52) U.S. Cl.

CPC ........ *G07C 9/00182* (2013.01); *E05B 65/025* (2013.01); *E05B 2047/0084* (2013.01)

(58) Field of Classification Search

CPC ....... G07C 2009/00769; Y10T 70/7068; Y10T 70/7141; Y10T 70/7147

USPC .... 340/5.2, 5.54; 70/278.1, 303 A, 284, 285

See application file for complete search history.

(56) References Cited

U.S. PATENT DOCUMENTS

| | | | | |
|---|---|---|---|---|
| 7,552,607 | B2 * | 6/2009 | Yang | E05B 35/105 70/432 |
| 8,881,558 | B2 * | 11/2014 | Misner | E05B 37/025 70/284 |
| 2007/0214853 | A1 * | 9/2007 | Huang | E05B 39/00 70/432 |

* cited by examiner

COMBINATION LOCK WITH ELECTRONIC OVERRIDE KEY

CROSS REFERENCE TO RELATED APPLICATIONS

This application is a continuation of, and claims priority to, U.S. patent application Ser. No. 16/687,223, which issued as U.S. Pat. No. 10,851,563, on Dec. 1, 2020, which is a continuation-in-part of U.S. patent application Ser. No. 16/427,226, filed on May 30, 2019, which issued as U.S. Pat. No. 10,487,541 on Nov. 26, 2019.

FIELD OF THE INVENTION

The present subject matter is concerned with security of lockers, safes, desks, file cabinets, or other storage devices assigned for temporary or long-term use, especially lockers. In particular, disclosed herein is a mechanical combination lock, having no battery power, that includes an electronic key override. In one instance, the disclosed combination lock can be used in conjunction with a locker having a standard three-hole locker door prep layout, to replace a standard key or combination lock fitting the same locker door. In another instance, the combination lock automatically scrambles the positions of the dials upon opening for security purposes.

BACKGROUND OF THE INVENTION

Combination locks, such as those for lockers, are known. Lockers in secondary schools and health club locker rooms may include a mechanical combination lock with a mechanical key override. The mechanical key can be used when a student or a user has forgotten his or her combination, and an administrator can use the mechanical key to both open the lock and reset the combination. Moreover, a school administrator uses the mechanical key at the end of a school year to open all lockers, to individually re-set all combinations, then records the new combinations of each locker. Many of these locks have mechanical key lock cylinders inside the lock which are either not accessible to rekey or very labor intensive to remove, rekey, and reinstall. The administrator must do so to ensure that the older students who were previously assigned a locker do not have the combination for the forthcoming years. This process is laborious, time-consuming, and expensive. Moreover, if the administrator key is lost, the locks must be re-cored or re-keyed. Other mechanical combination locks having mechanical override keys are known. See, for example, U.S. Pat. No. 9,222,283, assigned to the assignee of the present application, U.S. Pat. Nos. 6,877,345, 7,444,844, 7,628,047, 7,958,757, 8,234,891, 8,316,675, and U.S. Patent Application Publication Nos. 2009/0301147 and 2008/0307838.

U.S. Pat. No. 8,769,999 describes a mechanical combination lock, where a mechanical key can be used with the lock to identify the unlocking combination. While it primarily describes a mechanical key, in a parenthetical it mentions an electronically operated mechanism that can identify the unlocking combination. But it fails to disclose any structure whatsoever for the electronically operated mechanism or how it operates.

Electronically-operated locks, moreover, are known as well. U.S. Pat. Nos. 5,886,644 and 5,894,277, owned by the assignee of this application, describe electronic locker locks to fit a standard three-hole door prep layout as well as other doors. The electronic locks described in those patents comprise two housings, mounted at front and back of the door, and electronically connected through the center hole of the three-hole door prep layout, and they included an electromagnetically-driven latch, retracted automatically by the lock device when the proper code was entered by a user, either via a keypad or an electronic ID device such as an iButton®. U.S. Pat. No. 8,161,781 likewise discloses an electronically-operated lock to fit a standard three-hole door prep. All three patents are incorporated herein by reference.

U.S. Pat. No. 9,121,199 discloses an electronic combination lock that can be operated via touchscreen and also with an electronic key. The same access code is sent to the microprocessor to open the lock, regardless of whether the access code is entered via the touchscreen or input via the electronic key.

There is a need for a mechanical combination lock that can be opened by an administrator or manager with an electronic key of relatively inexpensive construction, particularly for lockers but with more versatility as to use on various standard designs, modularity as to assembly and opposite-hand use, easy programmability and convenience and simplicity to the user. It would be particularly advantageous if the mechanical combination lock required no battery storage within its housing, but still permitted an electronic key to override the mechanical combination and unlock it. Finally, it would be advantageous if the lock scrambled the dial combination upon opening.

SUMMARY OF THE INVENTION

A combination lock with electronic override includes a knob or a handle that is selectively rotatable between a closed position and an open position. A rotatable core is operatively coupled to the knob or handle on a first end, and the rotatable core is operatively coupled to a locking element on a second end. A slider is operatively coupled to the knob or handle and disposed between the knob or handle and the drive shaft. One or more rotatable selectors each has multiple indicia disposed thereon, wherein rotation of the one or more rotatable selectors to a predetermined indicium is configured to place the combination lock in a first unlocked position.

The combination lock further includes a microcontroller, an access terminal in communication with the microcontroller that is configured to receive a credential, and an actuator in communication with the microcontroller, the actuator operatively coupled to the locking slider, wherein upon receipt of a predetermined credential by the access terminal, the microcontroller is configured to direct the actuator to translate the slider from a first slider position to a second slider position, wherein when the slider is in the second slider position, the combination lock is in a second unlocked position.

The combination lock is configured such that in either the first unlocked position or the second unlocked position, the knob or handle and rotatable core are simultaneously rotatable to shift the combination lock between the closed position and the open position. A reset arm is operatively connected to the knob or handle, wherein rotation of the knob or handle shifts the reset arm from a first reset arm position to a second reset arm position. The one or more rotatable selectors each include a cam follower, and the reset arm is configured to engage the cam followers in the second reset arm position and drive the one or more rotatable selectors to a reset position.

DETAILED DESCRIPTION

Figure 1:
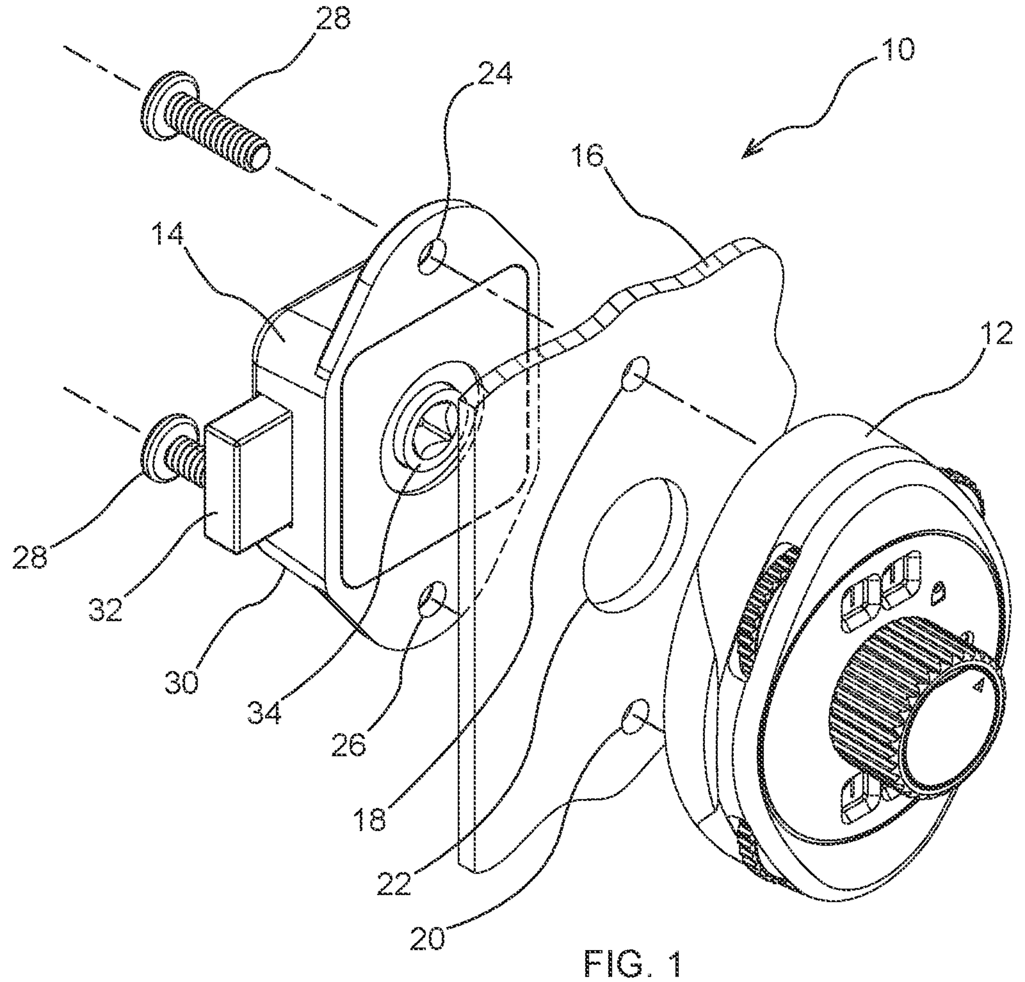
FIG. 1 is an exploded view in perspective of a first example of a combination lock with an electronic key override mounted to a locker door.
Figure 2:
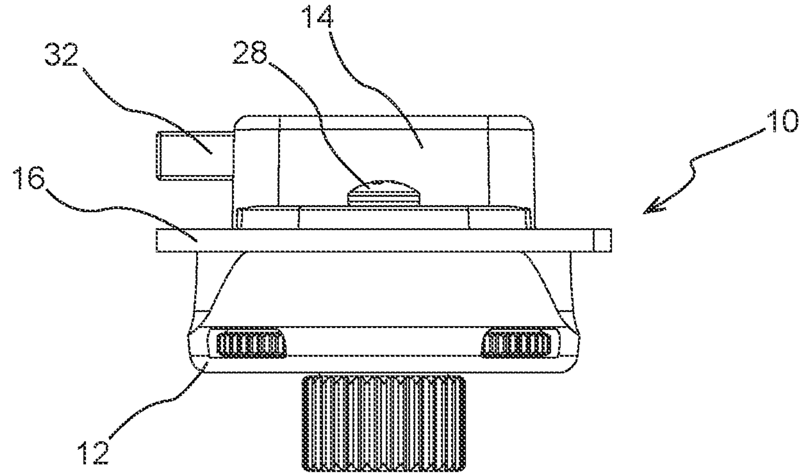
FIG. 2 is a top view of the combination lock and door of FIG. 1.

FIGS. 1 and 2 show a first example of a combination lock 10, including an outer housing 12 and locking mechanism 14, that is fixed to a door 16. In this example, the door 16 is a door for a locker, and has the standard three-hole door prep as known in the art, with two opposed mounting holes 18, 20 at top and bottom and a larger center hole 22. The locking mechanism 14 includes through holes 24, 26 that are coaxial with the mounting holes 18, 20 in the locker door, and the outer housing 12 includes internally threaded holes (not shown) likewise coaxial. The combination lock 10 can be mounted to the door 16 via threaded bolts 28 as depicted in FIG. 1. In other examples not shown, the combination lock 10 can be integral to the locker door 16 and therefore mounted permanently to the door 16. Moreover, the combination lock 10 and door 16 can be one of many in a system of lockers, such as in a school, locker room, or corporate environment. Further, the combination lock 10 can be employed in other enclosures, such as, for example, drawers, desks, cabinets, and other panels.

The locking mechanism 14 includes a housing 30, a bolt 32, and a rotatable shaft 34 operatively coupled to the bolt 32 in a known manner. Rotation of the shaft 34 90 degrees will retract the bolt 32 into the housing, such that the combination lock 10 is in the open position. Rotating the shaft 34 90 degrees counterclockwise will extend the bolt 32 out from the housing 30, as shown in FIGS. 1 and 2, such that the combination lock 10 is in the closed position.

Figure 3:
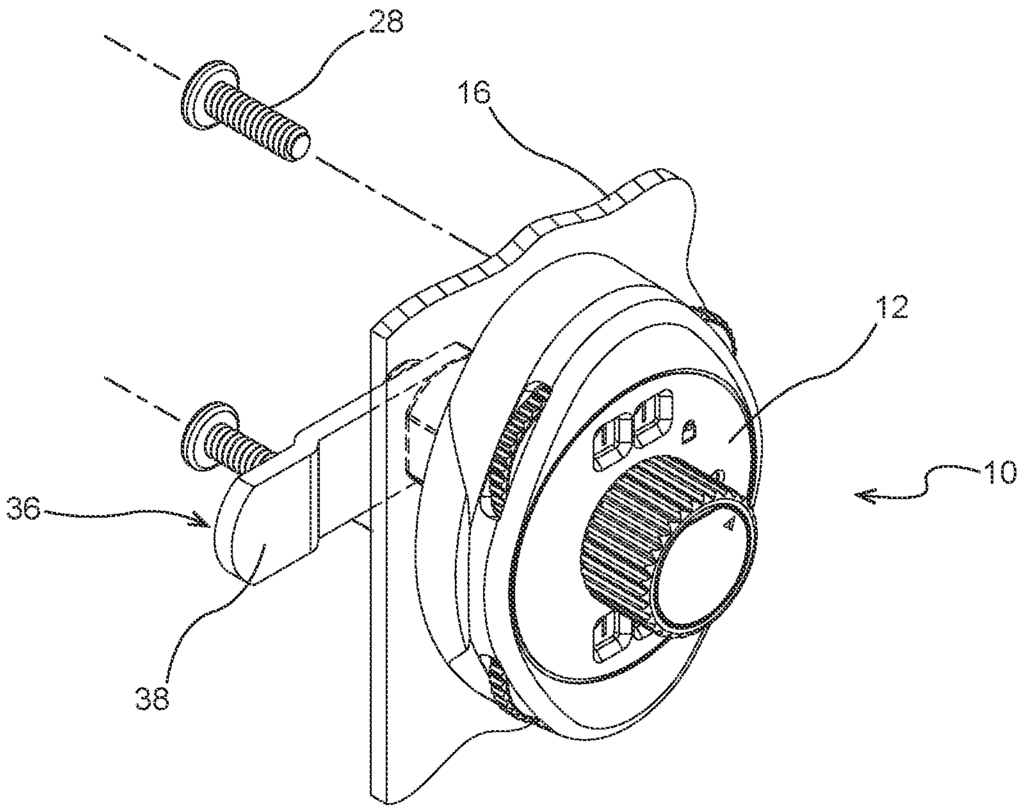
FIG. 3 is a perspective view of the combination lock of FIG. 1, including an alternative locking mechanism.
Figure 4:
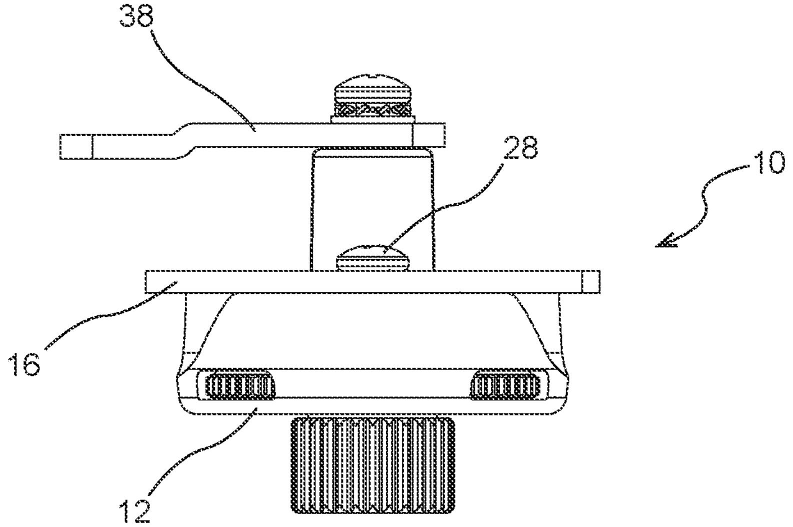
FIG. 4 is a top view of the combination lock of FIG. 3.

The bolt locking mechanism 14 is a typical application of a combination lock 10, and other locking mechanisms can be used. For example, FIGS. 3 and 4 depict a second example of a locking mechanism 36 operable with the outer housing 12 including a cam 38 that is likewise rotatable via operation of the combination lock 10. Rotation of the cam 38 while the door 16 is closed can place the cam 38 behind a strike plate or door frame to lock the door 16.

One of ordinary skill will understand that other locking mechanisms, such as slam-latch locking mechanisms, drop cam locking mechanisms, and the like, can be adapted to the combination lock 10. As is known, in a slam latch, the latch is spring loaded and has an angled face such that as the door is closing, the latch contacts a strike plate on the door frame and is pushed into the locking mechanism. Once the door is fully closed and the latch passes by the strike plate, however, the latch extends out again from the latch housing under the force of the spring, thereby maintaining the door closed. Again, rotation of the shaft 34 will retract the latch into the housing 12.

Figure 5:
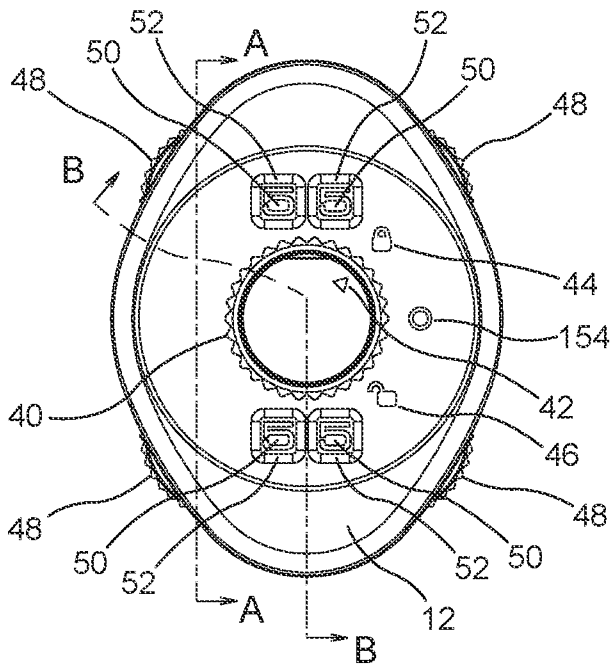
FIG. 5 is a front view of the outer housing of the combination lock of FIG. 1.

Referring now to FIG. 5, the outer housing 12 includes a rotatable knob 40 with an arrow indicator 42 disposed on it. The outer housing 12 also includes a closed position symbol 44 and open position symbol 46. When the knob 40 is rotated such that the arrow indicator 42 points to the closed position symbol 44, as shown in FIG. 5, the combination lock is in the closed position, such that, for example, the bolt 32 is extended out from the housing 30 of the locking mechanism 14 (as shown in FIG. 1), or cam 38 is rotated down, and the door 16 is secured in a closed position. In this position, the bolt 32 or cam 38 can extend into a recess in or behind a frame of the locker (not shown), or into or behind a strike plate (not shown) affixed to the locker, to secure the locker door shut, as is known in the art. Referring back to FIG. 5, the knob 40 can be rotated counterclockwise so that the arrow indicator 42 points to the open position symbol 46, the combination lock 10 is in an open position. The bolt 32 is retracted into the housing 30 of the locking mechanism 14 (or the cam 38 is rotated upwardly) away from the frame of the locker or the locker strike plate, and a user can freely open and close the door 16. While the knob 40 is disclosed as generally cylindrical in shape, the knob 40 can also include a handle having a lever extending laterally outward to allow easier rotation of the knob 40.

The outer housing 12 further includes four rotatable dials 48, each with the indicia 50 printed on them. In this example, the indicia 50 are the numerals 0-9. The outer housing 12 also includes four windows 52 that each allow a single numeral to be viewed, and thereby indicate to the user the currently selected number for each dial. As will be described herein, selection of four pre-selected indicia 50 will place the combination lock 10 in an unlocked position.

Figures 6, 6A:
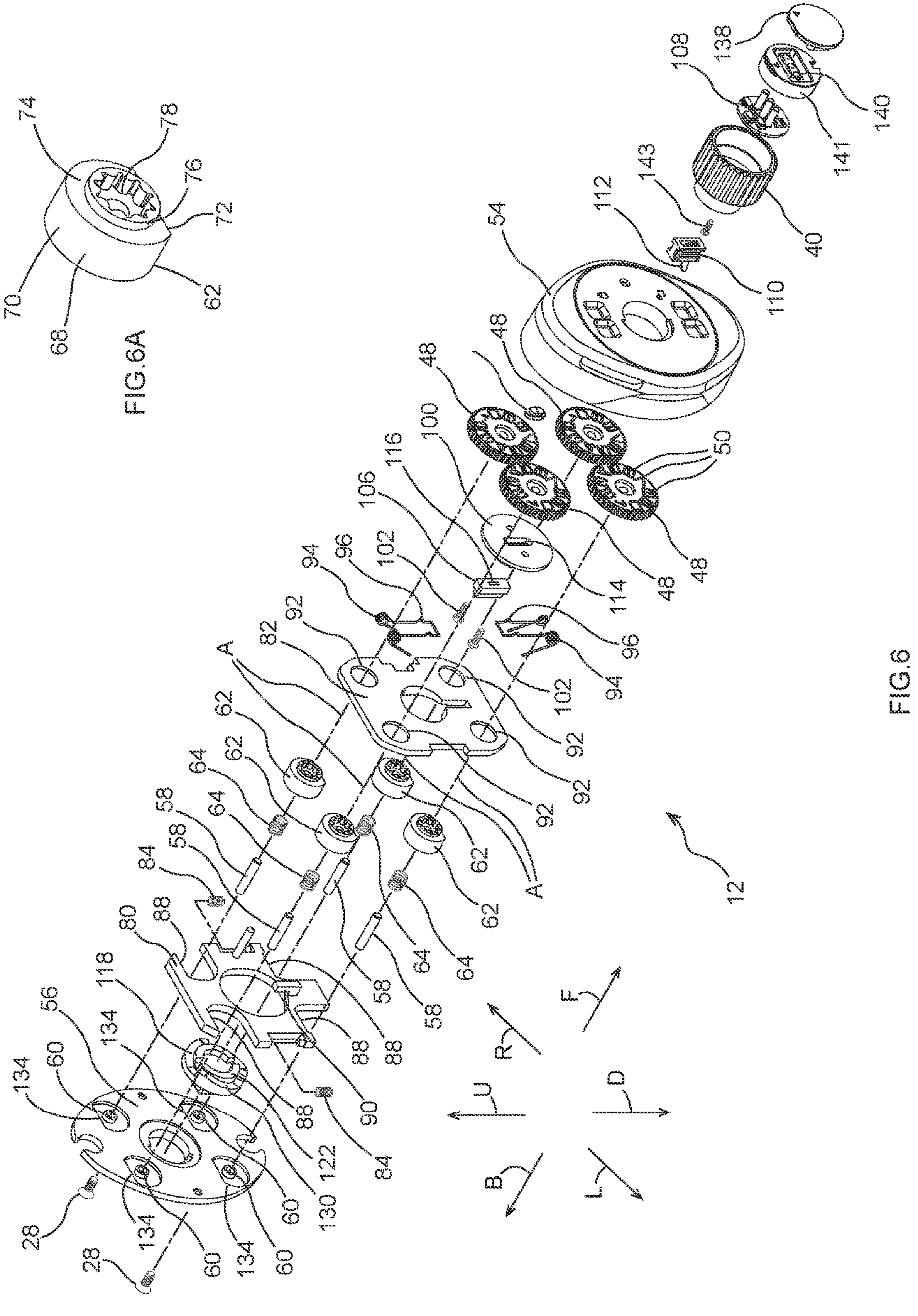
FIG. 6 is an exploded perspective view of the outer housing of the combination lock of FIG. 1.
FIG. 6*a* is a detail view of a cam wheel of FIG. 6.
Figure 7:
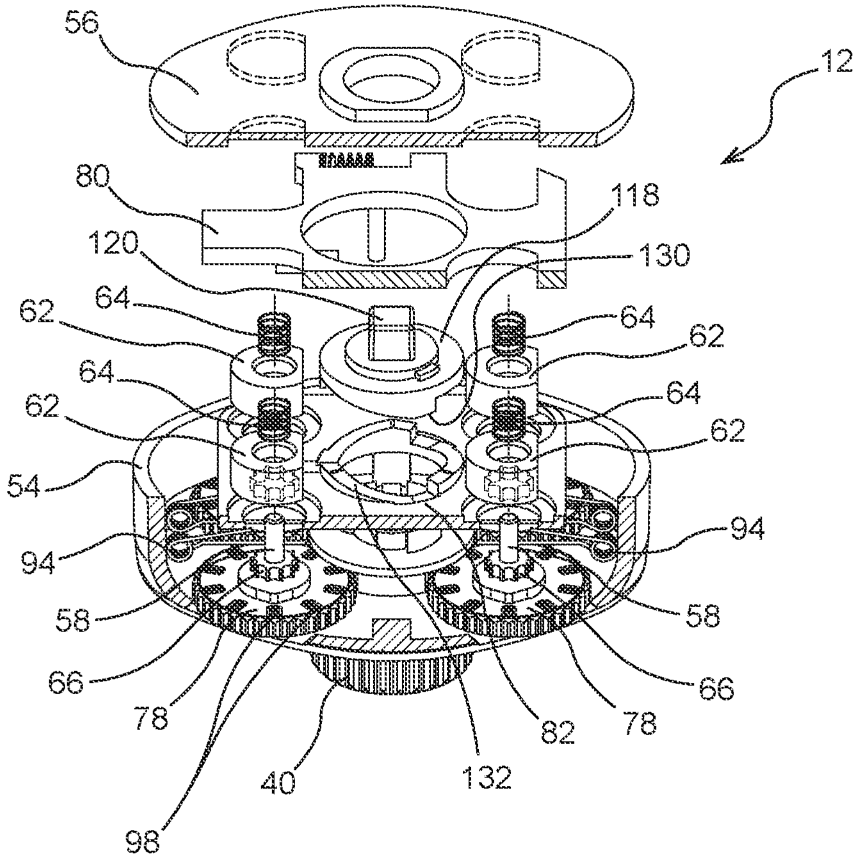
FIG. 7 is an exploded perspective view of the combination lock of FIG. 1 taken along line A-A in FIG. 5.

Referring now to FIGS. 6, 6*a*, and 7, the outer housing 12 further includes a casing 54 and a back plate 56. Dials shafts 58 extend from shaft recesses 60 in the back plate 56 to similar recesses (not shown) in the casing 54. Disposed on the dial shafts 58 are the rotatable dials 48, cam wheels 62, and cam springs 64. Moreover, as best shown in FIG. 7, disposed on the back of the rotatable dials 48 and affixed to the dials 48 are 10-point star drivers 66. The dial shafts 58 each define an axis A about which the rotatable dials 48 and cam wheels 62 rotate. As best seen in FIG. 6A, each of the cam wheels 62 have an outer periphery 68 that is generally D-shaped in cross-section with a curved section 70 and a flat section 72. Each of the cam wheels 62 further include a shoulder 74 with a cylindrical projection 76 extending in a direction F and a 10-point star recess 78 within the projection 76 that is complementary to the 10-point star drivers 66 of the rotatable dials 48. The cam springs 64 bias the cam wheels 62 away from the back plate 56 in direction F such that the star drivers 66 are normally engaged with the star recesses 78, and rotation of the dials 48 rotates the cam wheels 62 about axis A.

Also disposed within the outer housing 12 is a locking plate 80 and a cam plate 82. The locking plate 80 includes locking springs 84 that bear against posts 86 (best seen in FIG. 15) that extend rearwardly from the casing 54. The locking springs 84 bias the locking plate 80 in a downward direction D as shown in FIG. 6. The peripheries 68 of the cam wheels 62 bear on linear bearing surfaces 88 of the locking plate 80, and therefore rotational motion of the cam wheels 62, in combination with the biasing force of the locking springs 84, controls linear motion of the locking plate 80 in directions U and D. In other words, when the flat surfaces 72 of each of the four cam wheels 62 are engaged with the linear bearing surfaces 88 of the locking plate 80, the locking springs 84 bias the locking plate 80 and translate the locking plate 80 in direction D. The locking plate 80 also includes a push rod 90 that aids in the locking and unlocking of the combination lock 10, as will be described below.

The cam plate 82 includes four circular openings 92 that are coaxial with the dial shafts 58, and it is biased against the cam wheels 62 by cam plate springs 94 (only two of which are shown in FIG. 6). The shoulders 74 of the cam wheels 62 bear on the distal side of the cam plate 82 with the projections 76 of the cam wheels 62 extending through openings 92 in the cam plate 82 such that the cam wheels 62 rotate relative to the cam plate 82. The cam plate springs 94 include detents 96, and the rotatable dials 48 include complementary recesses 98 (see FIG. 7) corresponding to each indicium 50, such that when rotating the rotatable dials 48, the dial 48 will snap into place for each indicium 50 viewable through a window 52.

Figure 8:
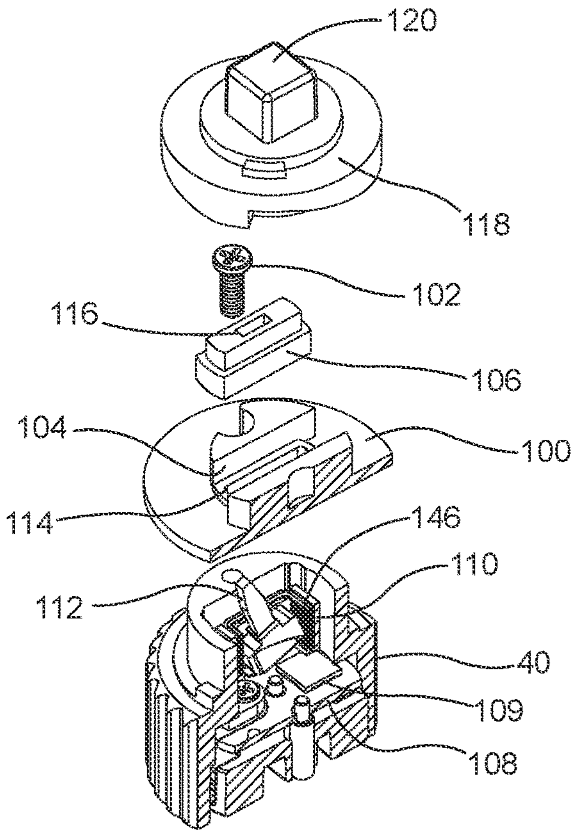
FIG. 8 is a partial cross-section and exploded detail view of a knob assembly and drive shaft of the combination lock.
Figure 9:
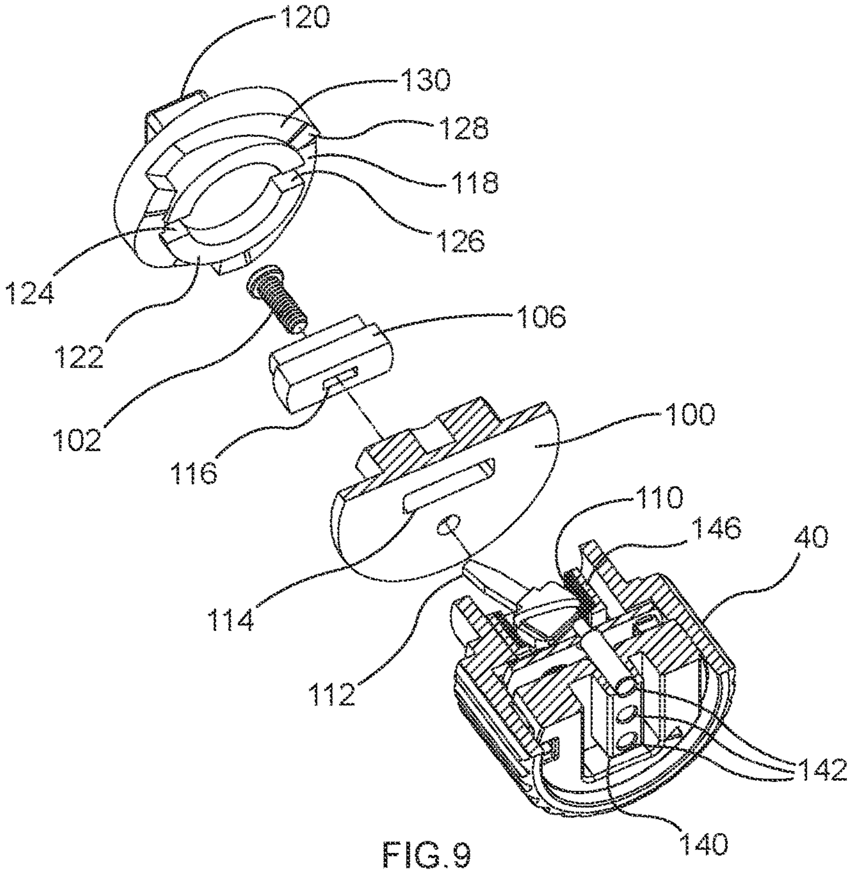
FIG. 9 is a second partial cross-section and exploded detail view of the knob assembly and drive shaft of the combination lock.
Figure 11:
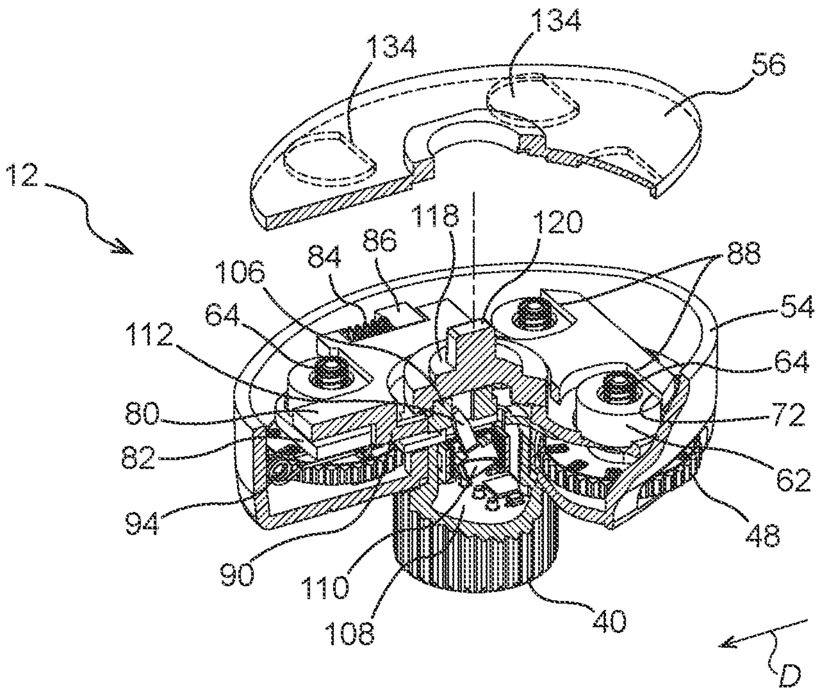
FIG. 11 is a partial cross-section view, taken along line B-B in FIG. 5, in which the outer housing is in the same position as in FIG. 10.

Referring now to FIGS. 6, 8, and 9, a retaining plate 100 is disposed in the outer housing 12 and is affixed to the knob 40 via screws 102. As best seen in FIGS. 8 and 9, the retaining plate 100 includes a slot 104 within which a locking slider 106 can slide back and forth. Accordingly, rotation of the knob 40 will likewise rotate the retaining plate 100 and the locking slider 106. As will be discussed in further detail later, disposed within the knob 40 is a circuit board 108 with a microcontroller 109 and a swing actuator 110 having an arm 112 that extends through a slotted hole 114 in the retaining plate 100 and into a recess 116 in the locking slider 106. Moreover, as best shown in FIGS. 6 and 11, the push bar 90 of the locking plate 80 engages the base portion of the locking slider 106, and the translational movement of the locking plate 80 in directions U and D, as described above, in combination with the swing actuator 110, serves to control movement of the locking slider 106 within the slot 104.

Also disposed within the outer housing 12 is a drive shaft 118. Extending from the distal side of the drive shaft 118 is a boss 120. The boss 120 extends through an opening in the back plate 56 of the outer housing 12, through the center hole 22 in the locker door 16, and into the rotatable shaft 34 of the locking mechanism 14. As can be seen and is known, rotation of the drive shaft 118 controls the locking mechanism 14.

On the proximal side of the drive shaft 118 is an inner cylinder 122 having upper and lower notches 124, 126 in the sidewall of the inner cylinder 122. The locking slider 106 is sized such that its length is shorter than the interior diameter of the inner cylinder 122, that it can freely rotate within the inner cylinder 122, and rotation of the knob 40 therefore does not engage the drive shaft 118. When the locking slider 106 is within the inner cylinder 122, the combination lock 10 is in the "locked position." The position of the locking slider 106 can be linearly shifted, however, such that it is disposed within either the upper notch 124 or the lower notch 126. In these positions, the locking slider 106 engages the inner cylinder 122, and rotation of the knob 40 will rotate the drive shaft 118. In this position, the combination lock is in an "unlocked position." The drive shaft 118 also includes an outer cylinder 128 that defines a cylindrical cam surface 130, which will be discussed in more detail below. The upper and lower notches 124, 126 are collectively referred to herein as a recess.

Figure 10:
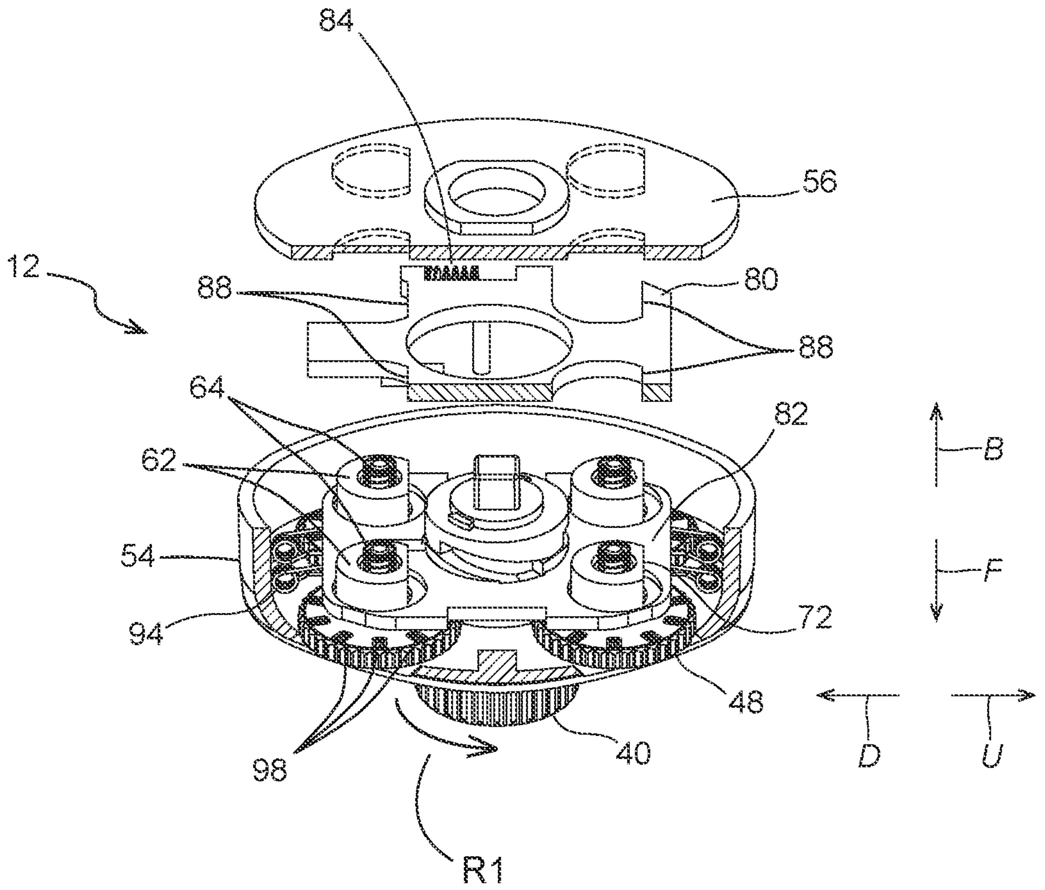
FIG. 10 is a partial cross-section view, taken along line A-A in FIG. 5, in which the outer housing of FIG. 1 is in the unlocked position, and the knob is pointed to the closed symbol.

The operation of the combination lock 10 will now be described. FIGS. 10 and 11 depict the outer housing 12 in the unlocked position, but the knob 40 still positioned such that it points to the closed position symbol 44; i.e., the user has unlocked the combination lock 10, but has yet to open it. The user has rotated the dials 48 to the pre-selected unlocking code such that the flat surfaces 72 of the cam wheels 62 engage the linear bearing surfaces 88 of the locking plate 80. Under the force of the locking springs 84, the locking plate 80 moves in direction D, thereby retracting the push rod 90 away from the locking slider 106. The biasing force of the swing actuator 110 pushes the locking slider 106 in direction D, thereby forcing the locking slider 106 into the lower notch 124 in the inner cylinder 122 of the drive shaft 118 (seen best in FIG. 9). Accordingly, it is now possible for the user to rotate the knob 40 to rotate the drive shaft 118 in direction R1 to move the combination lock 10 from the closed position to the open position.

Figure 12:
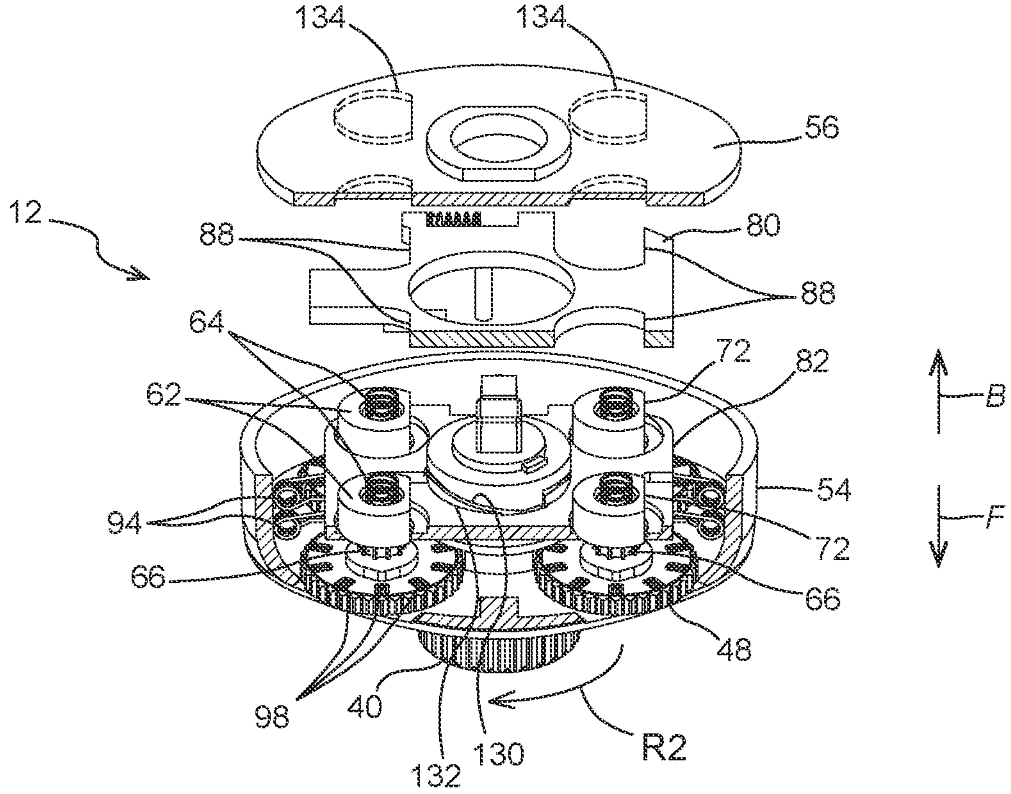
FIG. 12 is a partial cross-section view taken along line A-A in FIG. 5, in which the outer housing of FIG. 1 is in the unlocked position, and the knob is pointed to the open symbol.
Figure 13:
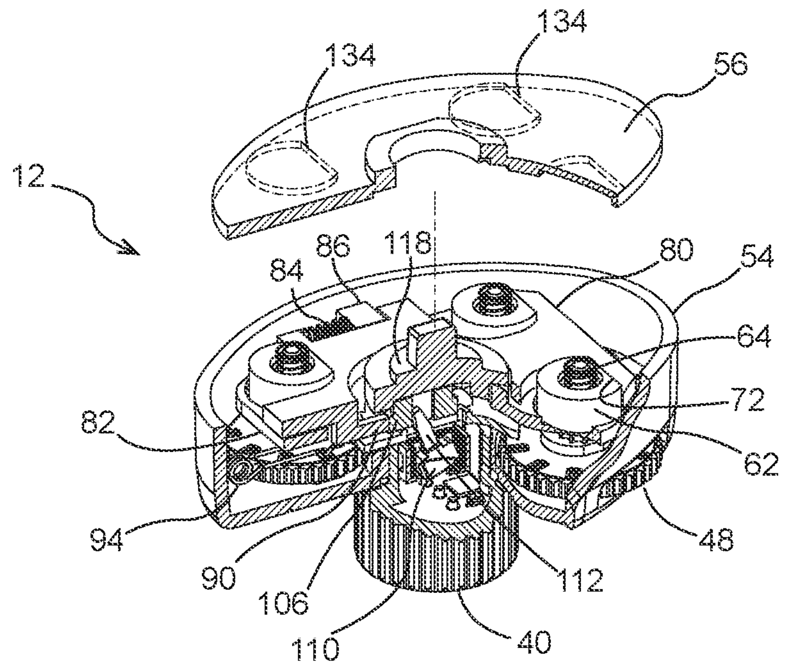
FIG. 13 is a partial cross section view, taken along line B-B in FIG. 5, in which the outer housing is in the same position as in FIG. 12.

FIGS. 12 and 13 depict the outer housing 12 in the unlocked position and the open position. In this position, the dials 48 and cam wheels 62 are in the same position as depicted in FIGS. 10 and 11, with the flat surfaces 72 of the cam wheels 62 bearing against the linear bearing surfaces 88 of the locking plate 80. In this position, however, the user has rotated the knob 40 90° counterclockwise, and the arrow indicator 42 on the knob 40 now points to the open position symbol 44. The bolt 32 is retracted into the housing 30 of the locking mechanism 14, and the user is free to open and close the locker door 16.

When the combination lock 10 is in the open position, the user can change the unlocking code. Rotation of the drive shaft 118 also rotates its cylindrical cam surface 130 relative to a cooperating cam surface 132 of the cam plate 82. When the combination lock 10 is in the closed position, such as shown in FIG. 10, the cylindrical cam surface 130 of the drive shaft 118 forces the cam plate 82 in direction F away from the back plate 56 of the outer housing 12. As the knob 40 is rotated and the combination lock 10 is placed in the open position, however, the cylindrical cam surfaces 130, 132 allow the cam plate 82 to move in direction B toward the back plate 56 of the outer housing 12. Moreover, the cam plate springs 94 overcome the force of the cam wheel springs 64, and the cam plate springs 94 force the cam plate 82 in direction B. The cam plate 82 thereby lifts the cam wheels 62 off of the 10-point star drivers 66 and into cooperating D-shaped recesses 134 in the back plate 56. Thus, when the combination lock 10 is in the open position, the cam wheels 62 are rotationally fixed by the recesses 134 in the back plate 56 and in the unlocked position. The dials 48 can be rotated independently of the cam wheels 62, and the cam wheels 62 will stay in the rotational position that places the combination lock 10 in the unlocked position. The user can therefore set the dials 48 to a new unlocking combination. Upon rotating the knob 40 in direction R2 back to the closed position shown in FIGS. 10 and 11, the cylindrical cam surfaces 130, 132 force the cam plate 82 in direction F, and the cam wheel springs 64 push the cam wheels 62 forwardly to again seat on the 10-point star drivers 66.

Figure 14:
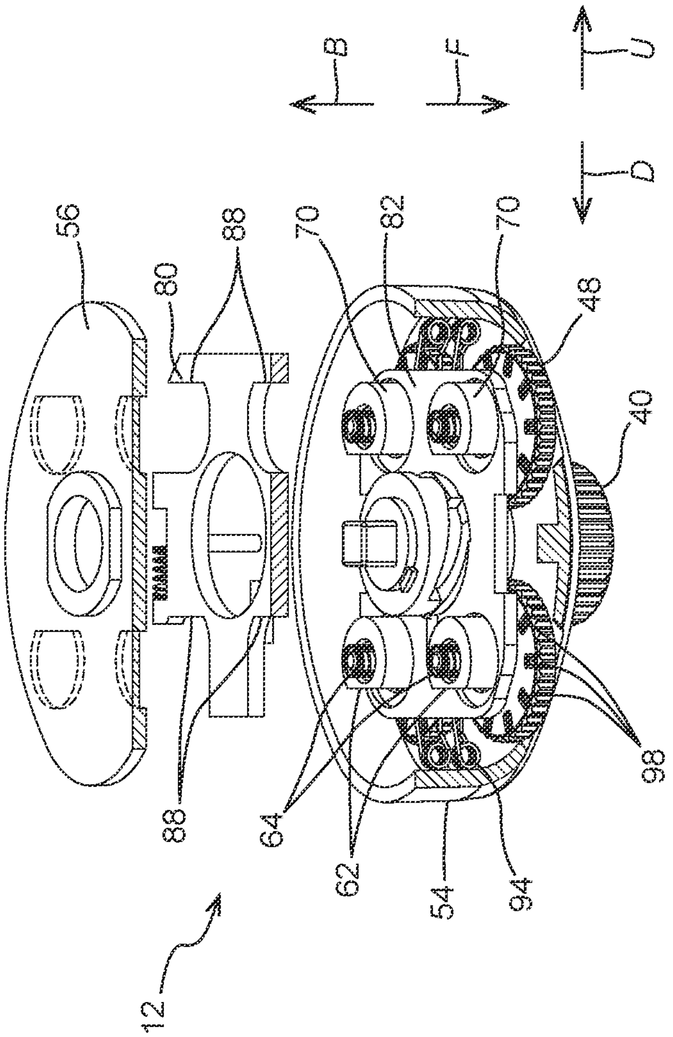
FIG. 14 is a partial cross-section view, taken along line A-A in FIG. 5, in which the outer housing of FIG. 1 is in the locked position, and the knob is pointed to the closed symbol.
Figure 15:
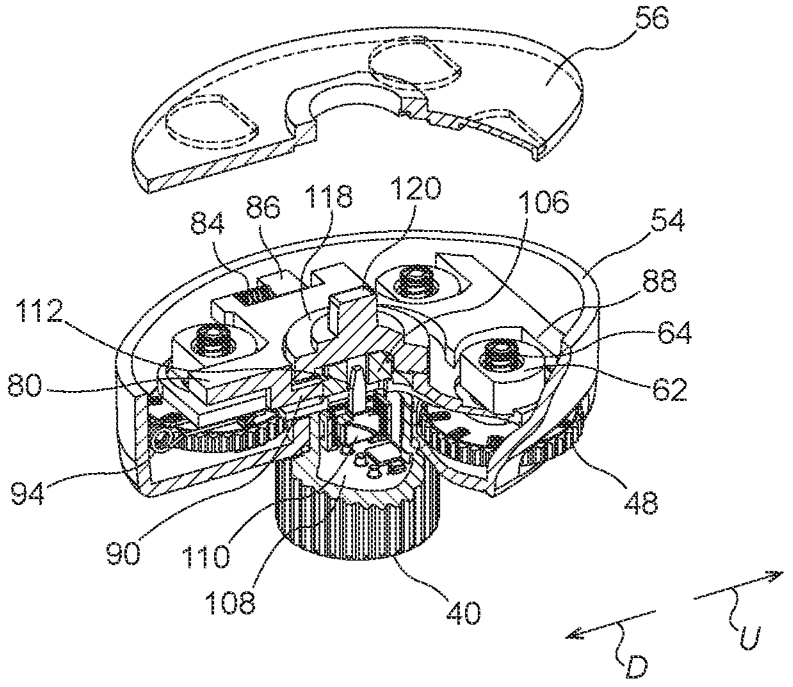
FIG. 15 is a partial cross-section view, taken along line B-B in FIG. 5, in which the outer housing is in the same position as in FIG. 14.

FIGS. 14 and 15 show the combination lock 10 while it is in the locked position and the knob 40 is rotated such that the arrow indicator 42 points to the closed position symbol 44. The rotatable dials 48 have been rotated so that the curved surfaces 70 of the cam wheels 62 engage the linear bearing surfaces 88 of the locking plate 80, thereby forcing the locking plate 80 in direction U, as seen in FIG. 14, and against the biasing force of the locking springs 84. The push rod 90 of the locking plate 80 engages the locking slider 106 and pushes it, again in direction U, so that the locking slider 106 is wholly contained inside the inner cylinder 122 of the drive shaft 118. The swing actuator 110 is biased in direction D, and thereby maintaining the locking slider 106 against the push rod 90. As mentioned earlier, the locking slider 106 is freely rotatable within the inner cylinder 122 of the drive shaft 118 when in the locked position, and therefore when the combination lock 10 is in the locked position, rotation of the knob 40 will not rotate the drive shaft 118. Note that the push rod 90 engages the base of the locking slider 106, and therefore does not interfere with the rotation of the locking slider 106 within the inner cylinder 122. The combination lock 10 cannot, therefore, move from the closed position to the open position.

Figure 16:
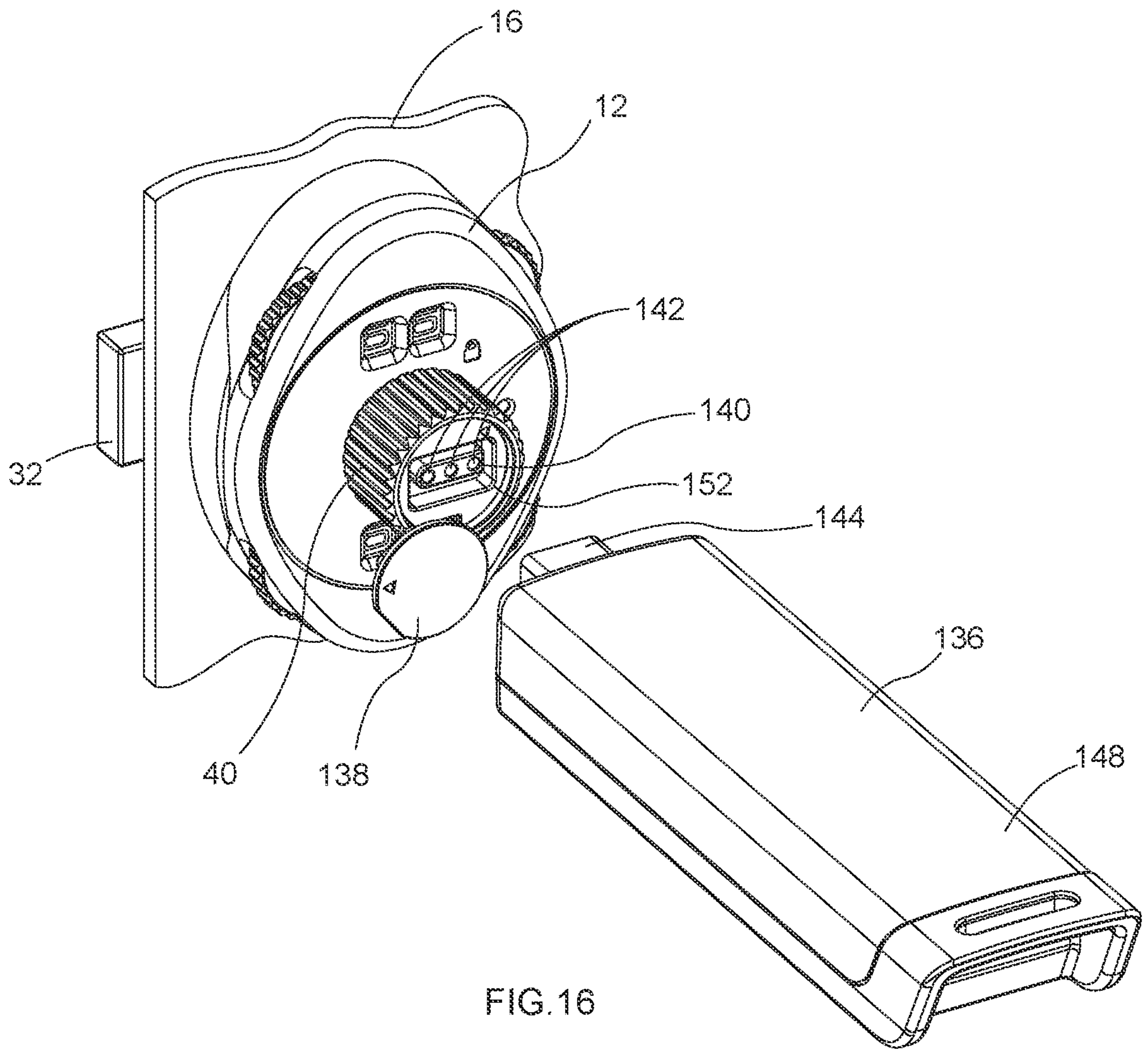
FIG. 16 is a front perspective view of the combination lock of FIG. 1 and an electronic override key.
Figure 17:
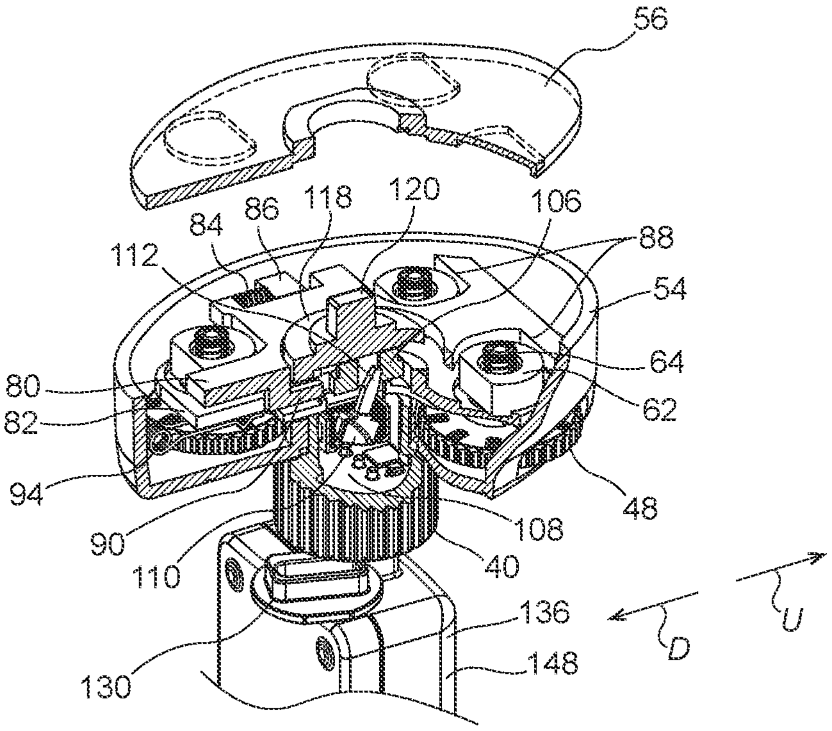
FIG. 17 is a partial cross-section view of the outer housing of FIG. 1, taken along line B-B in FIG. 5, in which the electronic key has overridden the mechanical combination lock and placed the outer housing into the unlocked position.

Referring now to FIGS. 16 and 17, an electronic key 136 can override the mechanical operation of the combination lock 10 and shift the combination lock 10 from the locked position to the unlocked position without regard to the position of dials 48 or cam wheels 62. The knob 40 includes a removable face plate 138 which, when removed, reveals an input or terminal or port 140 in a knob cap 141 for receiving the electronic key 136. The circuit board 108 is affixed to the knob cap 141 by a screw 143 (see FIG. 6). The port 140 includes three contacts 142 that serve to receive an electrical current and data from the electronic key 136. The terminal or port 140 preferably has a protective wall or collar 152, with the contacts 142 recessed inwardly, so as to protect those contacts 142. Other electrical connections that can transmit both data and current can also be used, such as the various USB ports, and the term port shall be understood to encompass all such connections.

The housing 12 further includes the circuit board 108 having the microcontroller 109 and memory which is connected to the port 140 (see FIGS. 8-9). In this case, the circuit board 108 is contained within the knob 40. Moreover, the swing actuator 110 includes a coil 146 that is connected to the circuit board 108. The microcontroller 109 is pre-programmed such that it can read and analyze a code passed to it by the electronic key 136 and compare it to a code stored in its memory. Although the term microcontroller is used herein, it will be understood by one of ordinary skill that any number of structures can be used to effectuate the functions described herein, e.g. controllers, processors, microprocessors, and addressable switches, and therefore the term microcontroller as used herein shall be understood to encompass all such structures.

Referring back to FIGS. 16 & 17, the electronic key 136 includes a housing 148 and three contacts (not shown) that mate with the contacts 142 of the port 140 and allow electrical communication between the two. Disposed within the housing 148 is a jump battery (not shown), which can be a rechargeable battery that is recharged using two of the three contacts, and circuitry capable of storing a master code or access code or both. The three contacts 142 of the port 140, and the mating contacts of the electronic key 136 are sufficient to transmit power from the jump battery using two of the contacts (a common and a power contact), and to communicate with the combination lock 10 using two of the contacts (the common and a data contact). The jump battery can be of sufficient voltage to provide the necessary current to power the operation of the combination lock 10, thereby eliminating the need for battery storage within the combination lock 10 itself. In other words, the outer housing 12 has no battery compartment and needs no batteries to permit the electronic key 136 to override the mechanical operation of the combination lock 10.

The contacts of the electronic key 136 can be spring-biased contacts or plug-in type contacts, with the contacts 142 of the port 140 being sockets in the case of a plug-in arrangement. As shown, the electronic key 136 preferably has a wall or collar 144 surrounding the contacts, so that the wall 144 fits closely within the collar 152 of the knob 40, with a complementary shape to assure correct orientation in engagement.

The internal circuitry of the electronic key 136 can include an access code or master code for all combination locks 10 in the system, communicated via two of the contacts to the combination lock 10 when the electronic key 136 is pushed against or plugged into the combination lock 10 as shown in FIG. 17. At the same time, the battery of the electronic key 136 will provide jump power to the combination lock 10. If desired, the casing 148 can have an external switch, such as a momentary switch, to switch on the power jumping function only when needed to conserve battery power, and not when the only problem is a lost electronic code. The design of the collars 144, 152 and the contacts provide protection against inadvertent shorting of the power.

The electronic key 136 can be pre-programmed to be multi-functional. For example, the electronic key 136 can be programmed to only open combination locks 10 during business hours to ensure that, should the key fall into the wrong hands, it cannot be operated after hours. Further, the electronic key 136 can include a memory to record operational data, such as the date and time it is used to open any combination lock 10, the identity of the combination lock 10 that has been opened, and so forth. Finally, the electronic key 136 can have differing levels of authorization, such as administrator keys and manager keys. Administrator keys can be restricted such that they, for example, may only be authorized to open the lock at certain times or they may only open lockers in certain locations (such as restricting staffers from opening locks in health club lockers in locker rooms of the opposite gender). They may further be programmed with an access code, whereby they can open a lock but not change the electronic code that opens the lock.

A manager key, however, may be programmed with a master code, which will both open the lock and set a new electronic code for the combination lock. This can be important if one of the administrator keys is lost or stolen. By setting a new code for a combination lock, the administrator keys are rendered inoperable until they are reprogrammed with the new code set by the administrator key. This process is far more efficient than re-coring and/or re-keying the lockers with mechanical override keys if a master key is lost. Other examples of items that can serve as an electronic key 136 could be, for example, smart phones, tablet computers, and laptop computers.

In another example of electronic keys 136, a key 136 can be configured to store a credential comprising a serial number and a revision number. The serial number is specific to the end user of the lockers, and may be specific to the location of the end user. In other words, an end user may have several sites, and each site may have its own serial number. Each credential also can include a revision number appended to the end of the serial number. By connecting a key 136 with this configuration to a lock 10 via the port 140, the key 136 will provide the credential that can electronically unlock the lock 10, and the microcontroller 109 will store the credential in memory. In the case of an end user losing a key 136, a new key 136 can be sent to the end user by the manufacturer having the same serial number but with a revision number incremented by one relative to the lost key 136. By connecting the new master key 136 to the port 140, the microcontroller 109 recognizes the incrementally-advanced revision number, then rewrites and stores the new credential in memory. Moreover, this process will work even if the revision number for the new key 136 is more than one higher than the current revision number. In other words, a key 136 with revision number four can update a lock have revision number 2 stored therein if any of the locks were forgotten in the previous round of updates. But the keys with the lower revision number will no longer be operable.

Although a key 136 is disclosed herein, it is contemplated that outer housing 12 could be adapted and or modified to include a wireless reader, such that a user could transmit a code wirelessly to the circuit board 108 via RFID, BLE, Bluetooth, NFC, or the like. In this scenario, the outer housing 12 would likely require batteries or line power to power the wireless reader. In this example, the wireless reader serves the same function as the port 140 and can be considered a port.

Referring now to FIG. 16, to operate the combination lock 10 with the electronic key 136, the user first opens the face plate 138 to expose the contacts 142 of the port 140. The user then inserts the contacts of the electronic key 136 into the contacts 142 of the port 140 to power the circuit board 108. The microcontroller reads the access code (or master code) from the electronic key 136; if it matches with the pre-programmed code stored in the memory associated with the microcontroller, the microcontroller allows the electronic key 136 to power the coil 146 of the swing actuator 110, and the magnetic field generated by the coil 146 pushes the magnet of swing actuator 110 to swing in direction U, thereby forcing the locking slider 106 into the upper slot 126 of the inner cylinder 122 of the drive shaft 118. The user can then rotate the knob 40, which will rotate the drive shaft 118, from the closed position to the open position, despite the dials 48 not being in the pre-selected unlocking combination.

If desired, the user can then re-set the unlocking combination. Because the dials 48 are not in the pre-selected unlocking combination, the cam wheels 62 will not initially be seated within the D-shaped recesses 134 of the back plate 56. The cam wheels 62 will be, however, forced against the back plate 56 due to the force of the cam plate springs 94. The user can rotate each dial 48 until he or she feels or hears the cam wheels 62 'click' into place within the recesses 130 (or rotate the cam wheels 360° in any event). At that point, with the cam wheels 62 will be secured in the recesses 130 and therefore in the unlocked position, the user can then rotate the dials 48 to select a new unlocking combination prior to rotating the knob 40 back to the closed position.

Figure 18:
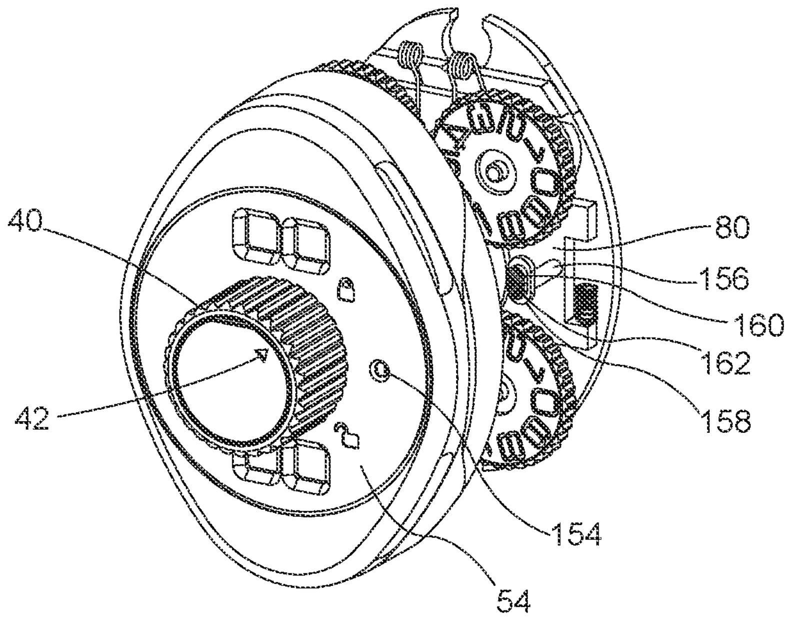
FIG. 18 is a partially-exploded perspective view of the outer housing of FIG. 1 depicting an indicator.

FIG. 18 depicts an indicator system that indicates to the user whether the combination lock 10 is in the locked position or the unlocked position. The outer housing 12 includes an opening 154 that serves as an indicator window. An indicator 156 extends forward from the locking plate 80 and includes a two-colored face 158. In this example, the indicator face 158 includes a red portion 160 and a green portion 162, but only one of the portions is visible through the indicator window 154 at a time. When the user places the dials 48 in the unlocking combination, the locking springs 84 push the locking plate 80 downwardly in the direction D, and the green portion 162 of the indicator 156 can be viewed through the indicator window 154. Similarly, when the user places the dials 48 in a locking combination, the cam wheels 62 force the locking plate 80 upwardly in a direction U, and the red portion 160 of the indicator 156 can be viewed through the indicator window 154.

The indicator system requires no power or current to provide the information to the user, and it therefore adds nothing to any power storage requirements of the combination lock 10.

Figure 19:
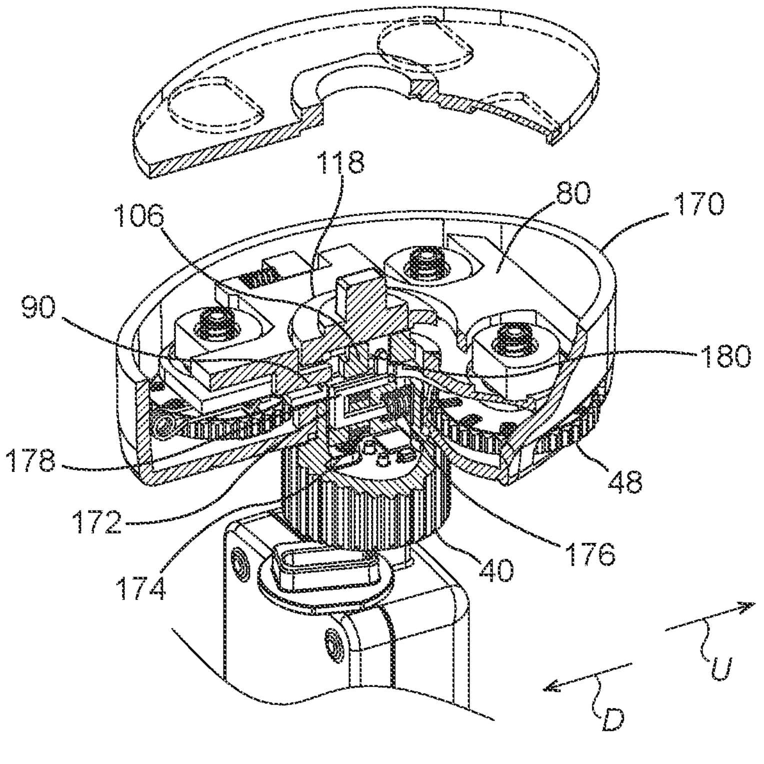
FIG. 19 is a partial cross-section view of an outer housing for a second example of a combination lock, taken along B-B in FIG. 5, which includes an alternative actuating system, and in which the electronic key has overridden the combination lock and placed the lock into the unlocked position.

Referring now to FIG. 19, an outer housing 170 is depicted that is generally the same as outer housing 12 except for an alternative electronic actuator 172. The same numbers used in the previous examples reference the same elements in this example. The actuator 172 here is a linear solenoid actuator with a direction of travel in direction U. Other actuators, such as an electric motor, could be employed as well. The actuator 172 includes a coil 174, a spring 176, and a wrap-around shaft 178 having an end portion 180 that extends perpendicularly to direction U of the actuator 172. Similar to earlier embodiments, the end portion 180 of the shaft 178 extends into a recess 116 in the locking slider 106.

In other regards, the outer housing 170 operates similarly to the outer housing 12. When in the locked position, the push rod 90 maintains the locking slider 106 within the inner cylinder 122. The knob 40 rotates freely without engaging the drive shaft 118. When the user unlocks the outer housing 170 by rotating the dials 48, the locking plate 80 moves in direction D, the push rod 90 moves laterally in the same direction away from the locking slider 106, and the spring 176 biases the wrap-around shaft 178 in the same direction, such that the shaft 178 slides the locking slider 106 into the lower notch 124 of the inner cylinder 122. At this point, rotation of the knob 40 will rotate the drive shaft 118.

Alternatively, the user can electronically override the lock by way of the key 136 or other electronic means, and the actuator 172 will drive the wrap-around shaft 178 in direction U such that the slider 106 slides into upper notch 126 of the inner cylinder 122. Again, rotation of the knob 40 will rotate the drive shaft 118.

Figure 20:
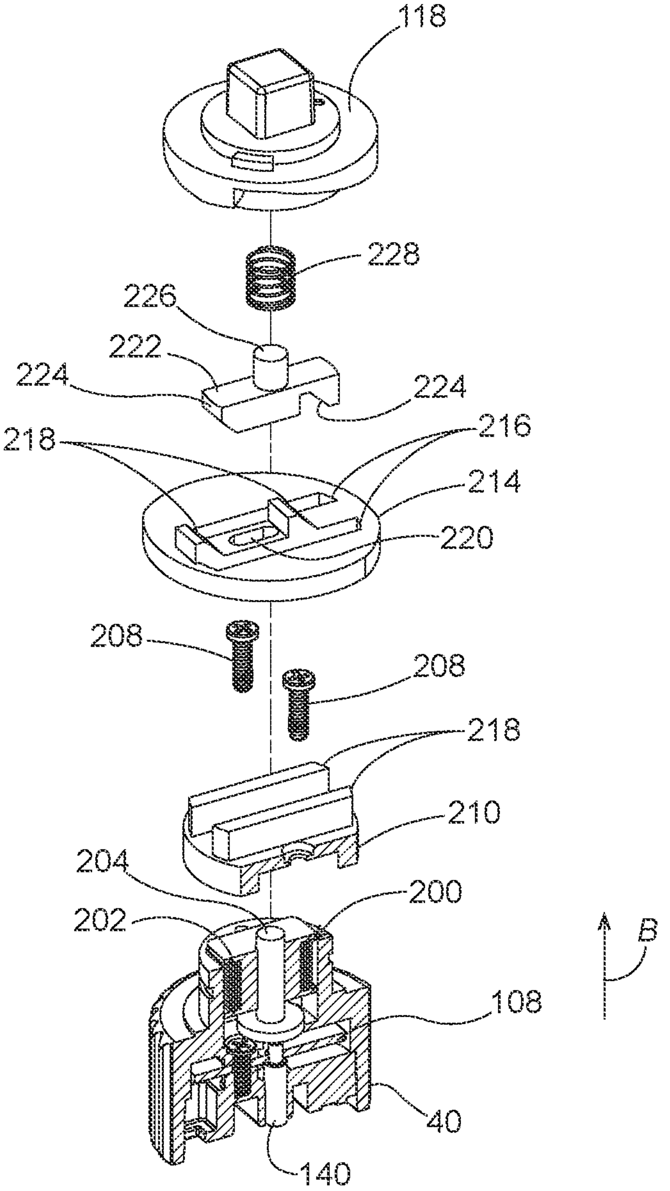
FIG. 20 is a partial cross-section and exploded detail view of a knob assembly and drive shaft of the outer housing, for use with a third example of a combination lock.
Figure 21:
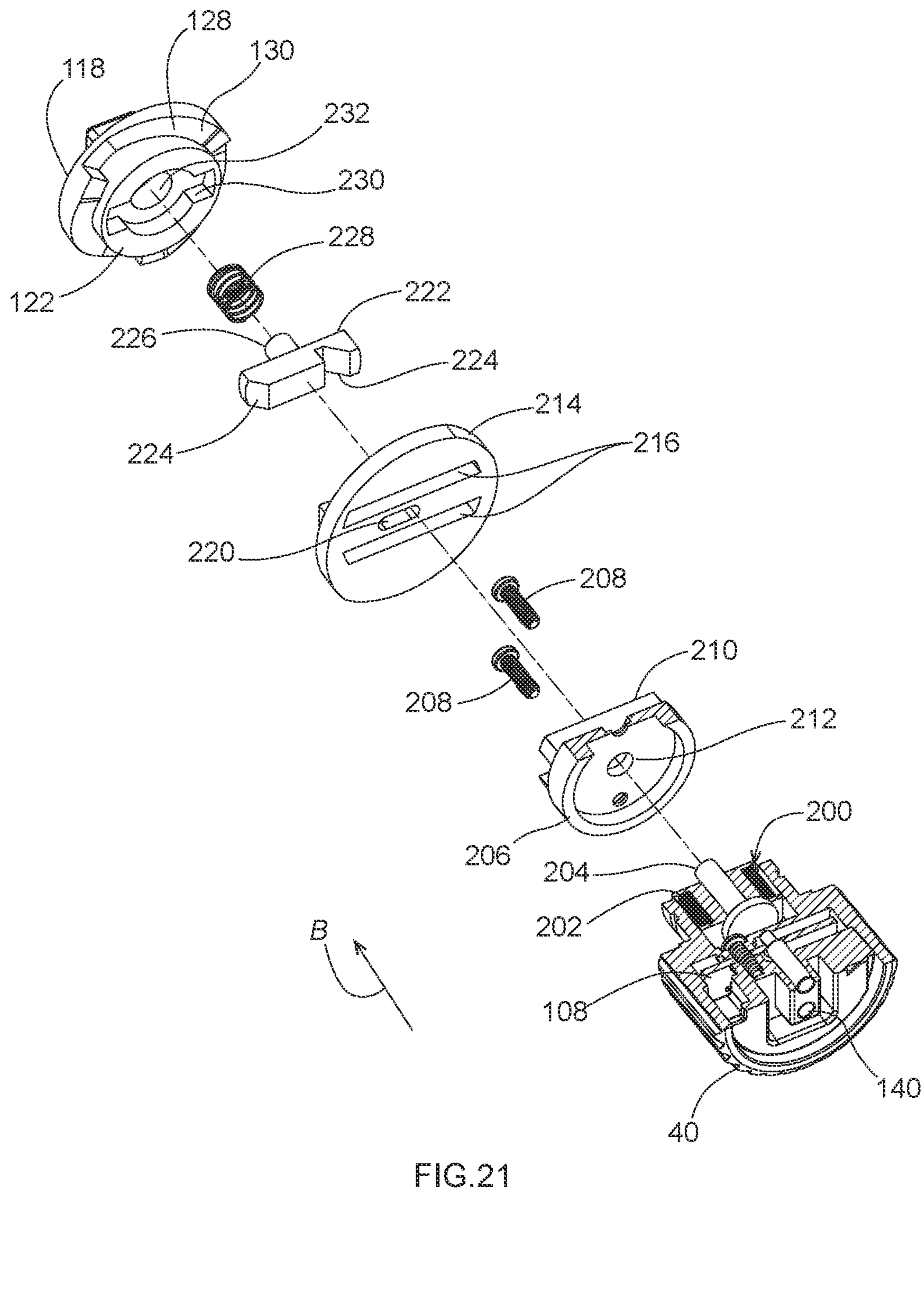
FIG. 21 is a second partial cross-section and exploded detail view of the knob assembly and drive shaft of FIG. 20.

FIGS. 20 & 21 depict another example of a system for shifting the outer housing 12 between the locked position and the unlocked position. Disclosed is a knob 40 including a port 140 and a circuit board 108, similar to the previous embodiments. A linear solenoid actuator 200 is further disclosed that includes a coil 202 and a push rod 204. Unlike previous embodiments, the direction of actuation of the push rod 204 is in direction B, i.e., toward the back plate 56.

A retaining plate 206 is affixed to the knob 40 via two screws 208. The retaining plate 206 includes two tongues 210 extending upwardly in parallel and a push rod hole 212 that allows the push rod 204 to traverse through it. A sliding plate 214 is disposed on the retaining plate 206 and includes parallel passages 216 that are configured to receive the tongues 210. The passages 216 in the sliding plate 214 are longer than the tongues 210, and so sliding plate 214 can slide laterally relative to the retaining plate 206 in a direction perpendicular to direction B. The tongues 210 have a height that is greater than the thickness of sliding plate 214 and therefore extend above the top surface of the sliding plate 214 to form a slot therebetween. The sliding plate 214 further includes a pair of ramps 218 disposed between the passages 216 and a push rod slot 220 through which the push rod 204 can traverse.

A locking slider 222 is disposed on the sliding plate 214 in the slot defined by the tongues 210 extending up through the passages 216 from the retaining plate 206. On the bottom of the locking slider 222 is a pair of ramp followers 224 configured to interact with the ramps 218 such that translational movement of the sliding plate 214 results in movement of the locking slider 222 in direction B. The locking slider 222 further includes a post 226 extending upwardly, and a spring 228 is disposed about the post 226.

Like in previous examples, a drive shaft 118 includes an outer cylinder 128 having a cam surface 130 and an inner cylinder 122. But unlike in previous examples, disposed within the inner cylinder 122 in this example is a slotted recess 230 configured to receive the locking slider 222 and a post recess 232 configured to receive the post 226 of the locking slider 222. Accordingly, when the sliding plate 214 translates laterally, the ramps 218 force the locking slider 222 in direction B into the slotted recess 230, such that rotation of the knob 40 now causes rotation of the drive shaft 118. Typically, the spring 228 biases the locking slider 222 away from and out of the slotted recess 230.

Figure 22:
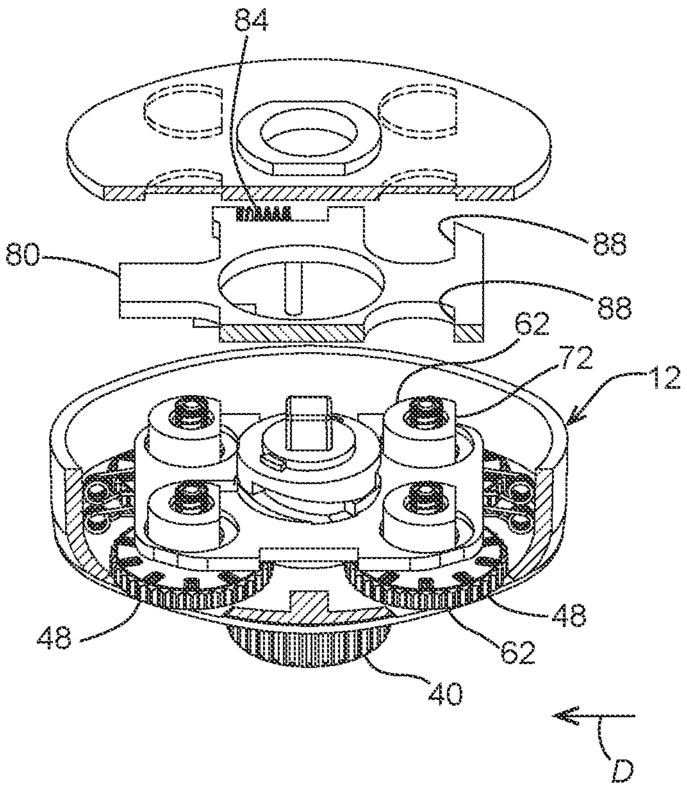
FIG. 22 is a partial cross-section view of the third example of the combination lock, taken along line A-A in FIG. 5, having the actuating system disclosed in FIG. 20, in which the outer housing is in the unlocked position, and the knob is pointed to the closed symbol.
Figure 23:
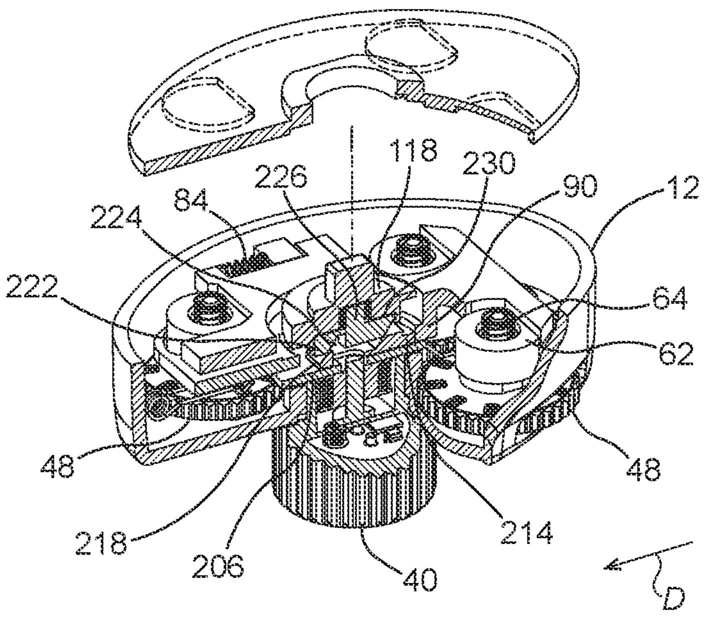
FIG. 23 is a partial cross section view, taken along line B-B in FIG. 5, of the outer housing disclosed in FIG. 22, in which the outer housing is in same position as in FIG. 22.

Referring now to FIGS. 22 and 23, the outer housing 12 is in the unlocked position, but the knob 40 still positioned such that it points to the closed position symbol 44; i.e., the user has unlocked the combination lock 10, but has yet to open it. The user has rotated the dials 48 to the pre-selected unlocking code such that the flat surfaces 72 of the cam wheels 62 engage the linear bearing surfaces 88 of the locking plate 80. Under the force of the locking springs 84, the locking plate 80 has moved in direction D, thereby forcing the push rod 90 toward the sliding plate 214. The sliding plate 214 translates laterally in direction D, and its lateral motion is constrained by the tongues 210 disposed in the slots 216 as described above. The ramps 218 of the sliding plate 214 interact with the ramp followers 224 of the locking slider 222, and force locking slider 222 upwardly into the slotted recess 230 of the drive shaft 118. Accordingly, it is now possible for the user to rotate the knob 40 to rotate the drive shaft 118 to move the combination lock 10 from the closed position to the open position.

Figure 24:
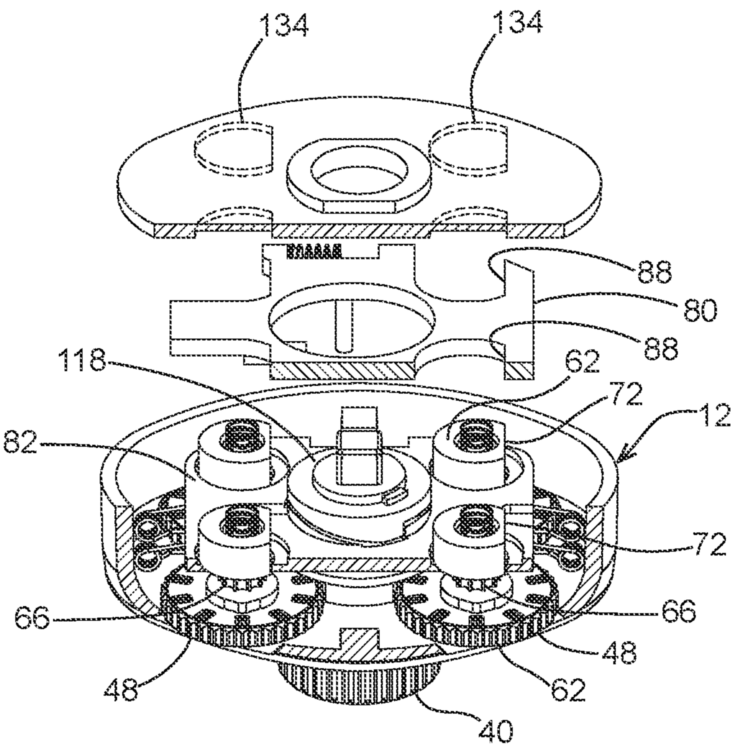
FIG. 24 is a partial cross-section view taken along line A-A in FIG. 5, of the outer housing disclosed in FIG. 22, in which the outer housing is in the unlocked position, and the knob has been rotated to the open symbol.
Figure 25:
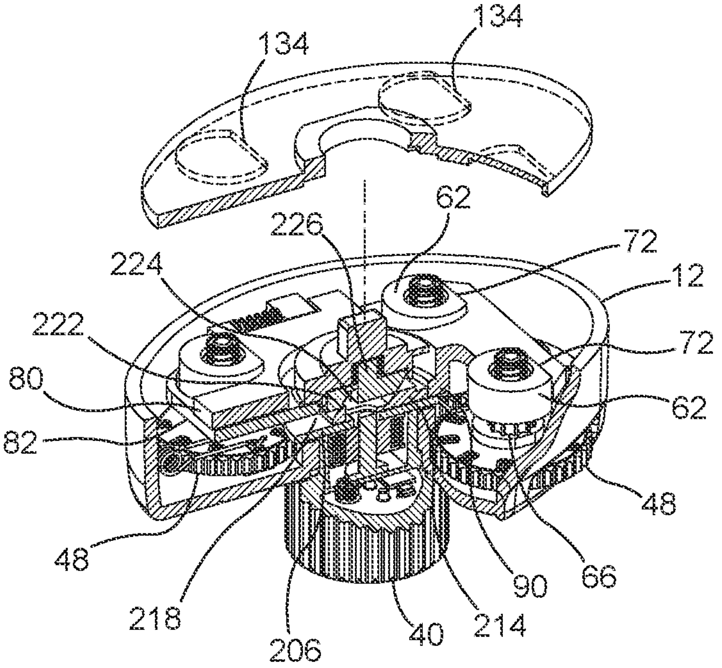
FIG. 25 is a partial cross-section view taken along line B-B in FIG. 5, of the outer housing disclosed in FIG. 22, in which the outer housing is in the same position as in FIG. 24.

Referring now to FIGS. 24 and 25, the dials 48 remain rotated to the pre-selected unlocking code such that the flat surfaces 72 of the cam wheels 62 engage the linear bearing surfaces 88 of the locking plate 80. In this position, however, the user has rotated the knob 40 90° counterclockwise, and the arrow indicator 42 on the knob 40 now points to the open position symbol 44. The bolt 32 is retracted into the housing 30 of the locking mechanism 14, and the user is free to open and close the locker door 16. The action of the cam plate 82 lifting the cam wheels 62 off the star drivers 66 and into the D-shaped recesses 134 is the same as described with respect to FIGS. 12 and 13.

Figure 26:
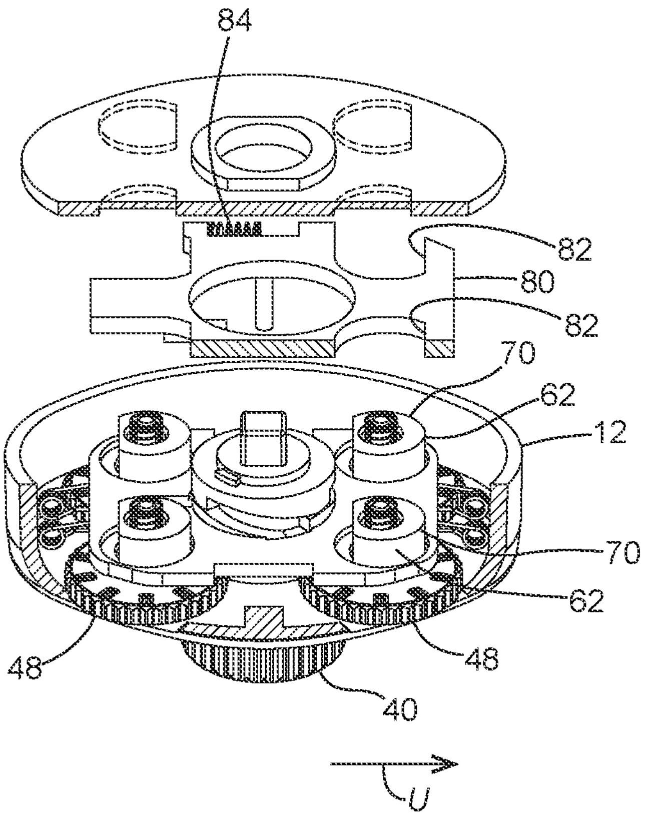
FIG. 26 is a partial cross-section view, taken along line A-A in FIG. 5, of the outer housing disclosed in FIG. 22, in which the outer housing is in the locked position, and the knob is pointed to the closed symbol.
Figure 27:
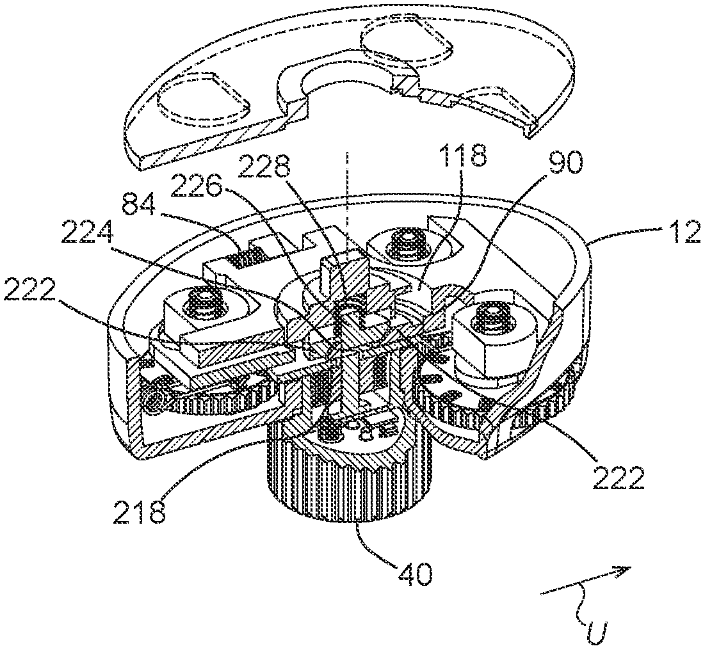
FIG. 27 is a partial cross-section view, taken along line B-B in FIG. 5, of the outer housing disclosed in FIG. 22, in which the outer housing is in the same position as in FIG. 26.

FIGS. 26 and 27 show the outer housing while it is in the locked position and the knob 40 is rotated such that the arrow indicator 42 points to the closed position symbol 44. The rotatable dials 48 have been rotated so that the curved surfaces 70 of the cam wheels 62 engage the linear bearing surfaces 88 of the locking plate 80, thereby forcing the locking plate 80 in direction U, as seen in FIG. 26, and against the biasing force of the locking springs 84. The push rod 90 of the locking plate 80 retracts from the sliding plate 214, and the spring 228 pushes the locking slider 222 downwardly, forcing the sliding plate 214 in direction U due to the interaction of the ramps 218 and the ramp followers 224, and further forcing the locking slider 222 and out of the slotted recess 230. The locking slider 222 no longer engages the drive shaft 118, and therefore when the combination lock 10 is in the locked position, rotation of the knob 40 will not rotate the drive shaft 118. The combination lock 10 cannot, therefore, move from the closed position to the open position.

Figure 28:
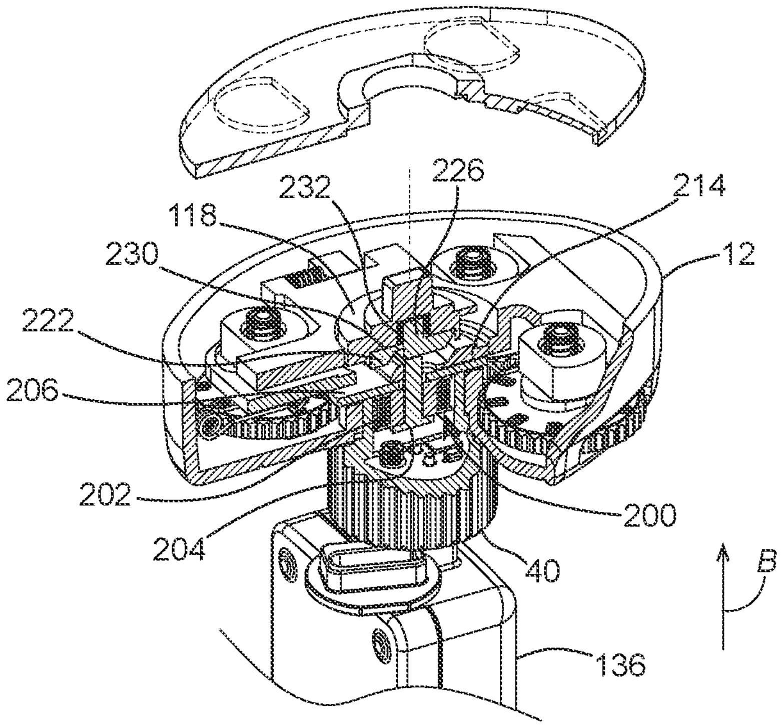
FIG. 28 is a partial cross-section view, taken along line B-B in FIG. 5, of the outer housing disclosed in FIG. 22, in which the electronic key has overridden the mechanical combination lock and placed the outer housing in the unlocked position.

Referring now to FIG. 28, the combination lock 10 can be operated with the electronic key 136 as described earlier. The user first opens the face plate 138 to expose the contacts 142 of the port 140. The user then inserts the contacts of the electronic key 136 into the contacts 142 of the port 140 to power the circuit board 108. The microcontroller reads the access code (or master code) from the electronic key 136; if it matches with the pre-programmed code stored in the memory associated with the microcontroller, the microcontroller allows the electronic key 136 to power the coil 202 of the solenoid actuator 200, and the magnetic field generated by the coil 202 pushes the push rod 204 in direction B, thereby lifting the locking slider 222 off the sliding plate 214 and into the slotted recess 230 of the drive shaft 118. The user can then rotate the knob 40, which will rotate the drive shaft 118, from the closed position to the open position, despite the dials 48 not being in the pre-selected unlocking combination.

Other structures, including other actuators, will be seen by those of skill in the art that can translate the sliders 106, 222 as described above. These other structures could include, for example, electric motors, pneumatic actuators, screw actuators, and the like.

Figure 29:
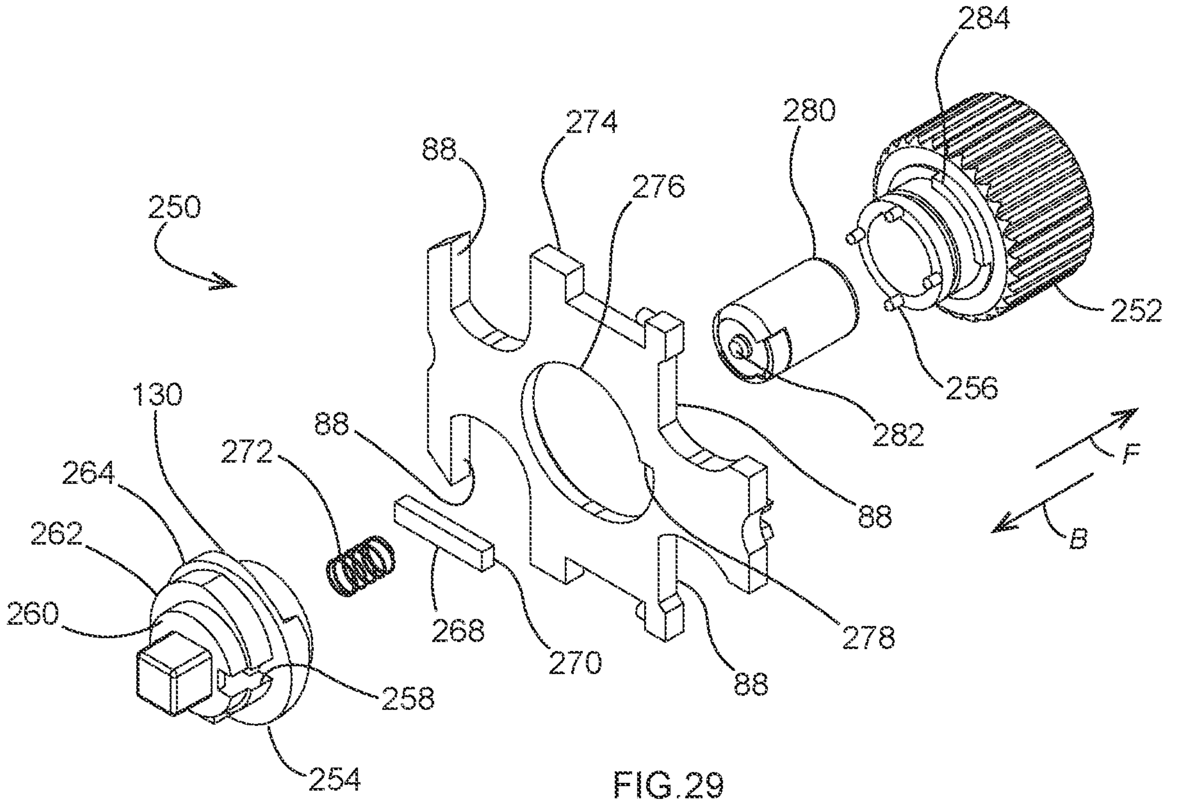
FIG. 29 is an exploded detail view of a knob assembly and drive shaft for use with a fourth example of a combination lock.
Figure 30:
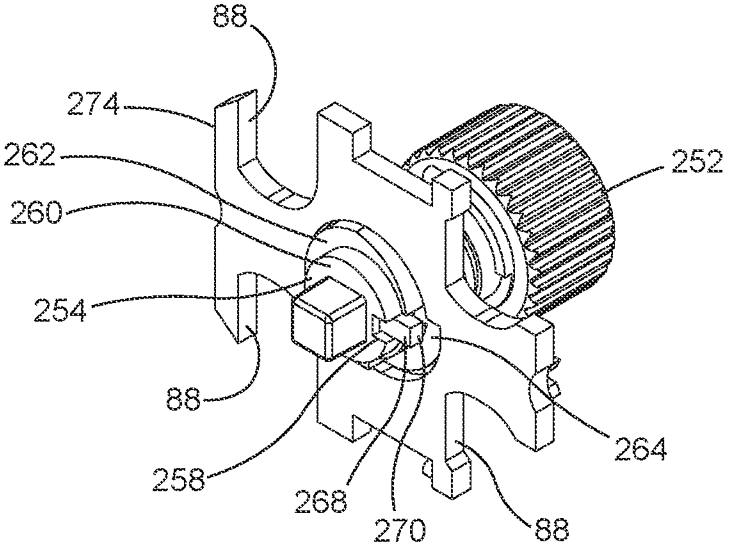
FIG. 30 is a perspective assembly view of the knob assembly and drive shaft of FIG. 29.

Referring now to FIGS. 29 and 30, an actuating system 250 for a fourth example of a combination lock is shown. Like in the previous examples, the actuating system 250 includes a knob 252 with a port and a microcontroller disposed therein, which are not shown in FIGS. 29 and 30 but can be the same as described with respect to FIGS. 6, 8, and 9. And again as in previous examples, the port can be a connector for receiving an electronic key 136 or it can be a wireless reader for receiving RFID, BLE, Bluetooth, NFC, or other wireless signals.

The actuating system 250 further includes a drive shaft 254 that is coupled to the knob 252. The knob 252 includes a set of pins 256 extending in the direction B, and the drive shaft 254 includes recesses (not shown) for receiving the pins 256. Accordingly, rotational motion of the knob 252 is transferred to the drive shaft 254 via pins 256. The drive shaft 254 further includes an opening 258 in its side, a first layer 260 generally having a circular cross-section, a second layer 262 having an irregular cross-section, and an annular surface 264 extending out from a base of the second layer 262. As in the previous examples, the first layer 260 rotates within an opening in the back plate 56.

The drive shaft 254 further includes a recess 266 that forms an interior (seen best in FIG. 32), and the opening 258 in its side extends through the first layer 260 and second layer 262. Finally, the drive shaft 254 includes the cylindrical cam surface 130 as in previous examples, which serves the same function as in the previous examples.

A slider 268 is disposed within the recess 266 with a locking end 270 of the slider 268 extending through the opening 258 and outside of the drive shaft 254 (seen best in FIG. 30). A spring 272 is disposed in the recess 266 as well and biases the slider 268 in the direction F such that the locking end 270 of the slider 268 sits against the annular surface 264 (see FIG. 30).

This example includes a locking plate 274 that is slightly different than in previous embodiments. While the locking plate 274 of this embodiment also includes linear bearing surfaces 88 that interact with the cam wheels 62 similarly to previous examples, it also includes an interior opening 276 with a bearing surface 278 that can selectively interact with the locking end 270 of the slider 268.

Finally, the actuating system 250 includes a linear actuator 280 with a push rod 282. When actuated, the push rod 282 of the linear actuator 280 translates in direction B, thereby translating the slider 268 off and away from the annular surface 264 and against the biasing force of the spring 272.

Figure 31:
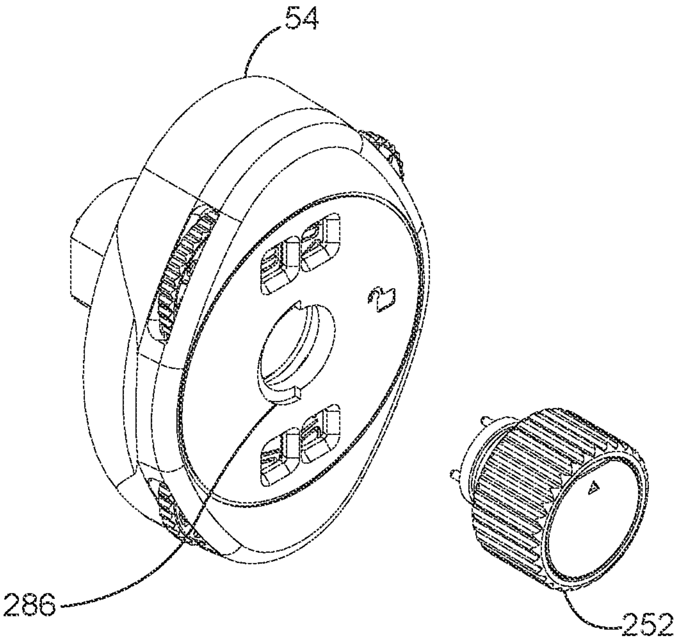
FIG. 31 is a perspective view of an outer housing of the fourth example of a combination lock with the knob exploded from the casing.

Referring now to FIGS. 29 and 31, the knob 252 includes a quarter-turn annular projection 284, and the casing 54 includes a half turn recess 286 sized and shaped to receive the quarter-turn projection 284 (see also FIG. 6). As will be understood, the quarter turn projection 284 slides within the half turn recess 286 as the knob 252 rotates, and the half-turn recess 286 limits the rotation of the knob 252 to a quarter turn between the open position and the closed position.

Figure 32:
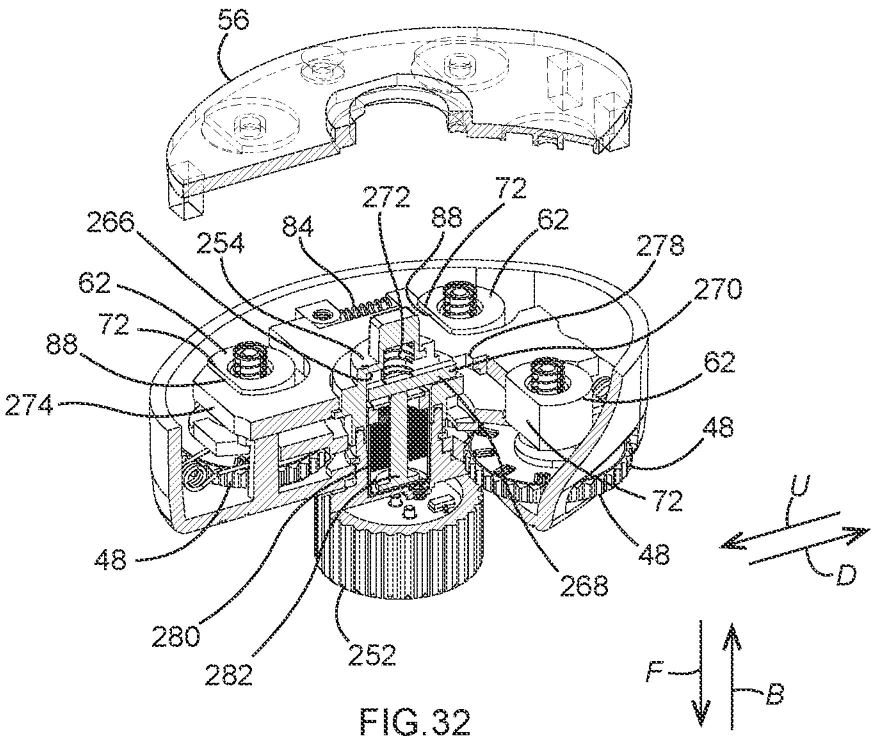
FIG. 32 is a partial cross-sectional view, taken along line B-B in FIG. 5, of outer housing of FIG. 31, in the unlocked position, incorporating the exemplary actuating system of FIG. 29, and with the back plate removed.
Figure 33:
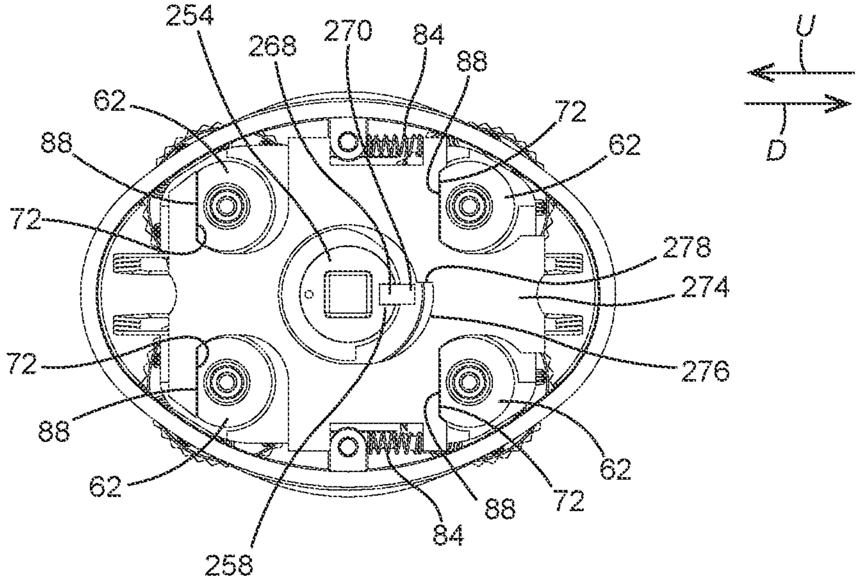
FIG. 33 is a plan view of the outer housing of FIG. 32.

Referring now to FIGS. 32 and 33, the outer housing 288 is in the unlocked position. The user has rotated the dials 48 to the pre-selected unlocking code such that the flat sections 72 of the cam wheels 62 engage the linear bearing surfaces 88 of the locking plate 274. Under the force of the locking springs 84, the locking plate 274 has moved in direction D. The bearing surface 278 defined by the interior opening 276 is removed from the locking end 270 of the slider 268. A user is free to rotate the knob 252, which will simultaneously rotate the drive shaft 254.

Figure 34:
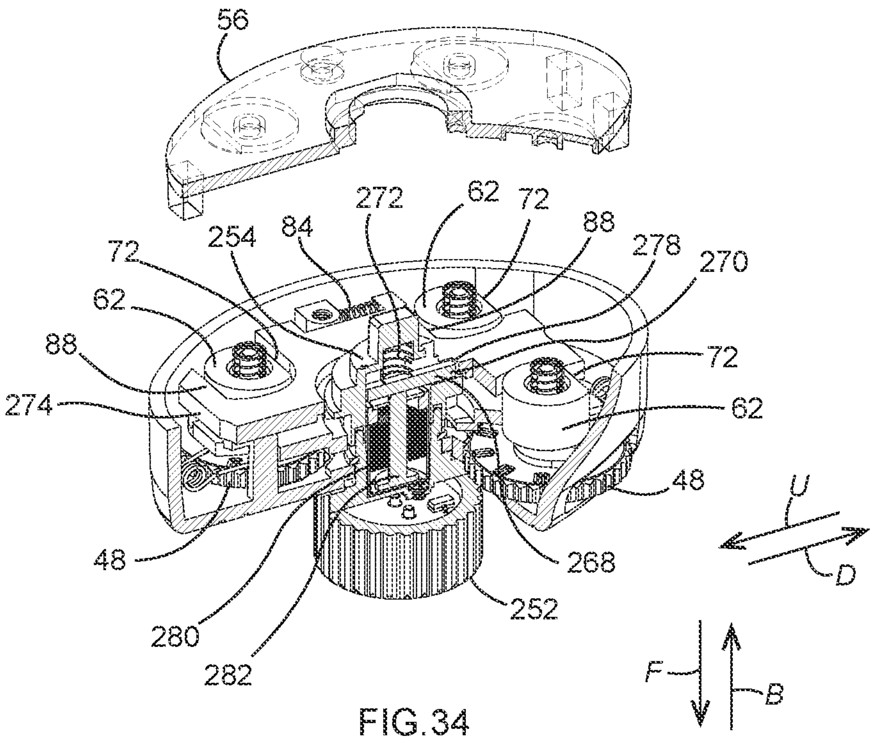
FIG. 34 is a partial cross-sectional view, taken along line B-B in FIG. 5, of the outer housing of FIG. 32, in the locked position.
Figure 35:
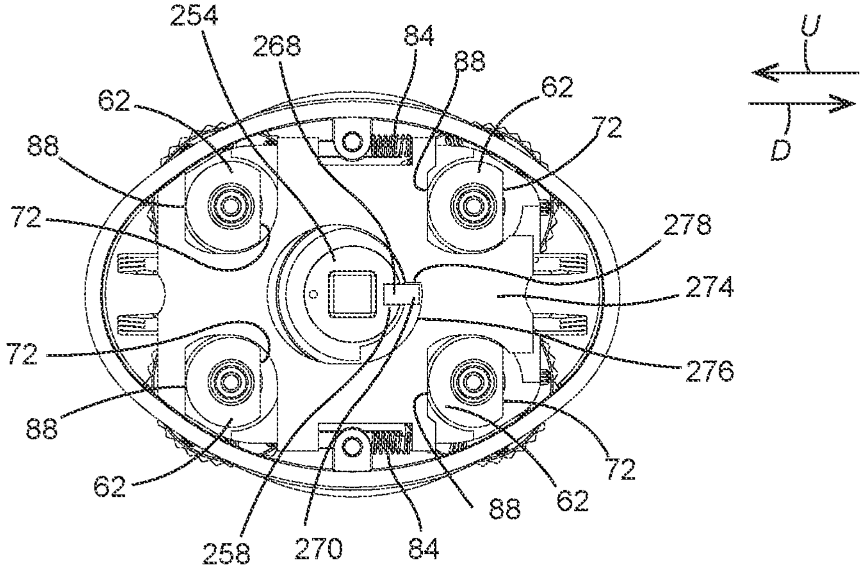
FIG. 35 is a plan view of the outer housing of FIG. 34.

Referring now to FIGS. 34 and 35, the dials 48 of the outer housing 288 have been rotated such that the curved sections 70 of the cam wheels 62 engage the linear bearing surfaces 88 of the locking plate 274. The cam wheels 62 force the locking plate 274 in direction U, with the bearing surface 278 of the interior opening 276 now engaging the locking end 270 of the slider 268. The knob 252 cannot be rotated in the counter-clockwise direction because of the interaction of the slider 268 and the bearing surface 278. Further, the knob 252 cannot be rotated in the clockwise direction due to the position of the quarter-turn projection 284 within the half turn recess 286. Accordingly, the knob 252 is precluded from rotation in either direction when in the locked position.

Figure 36:
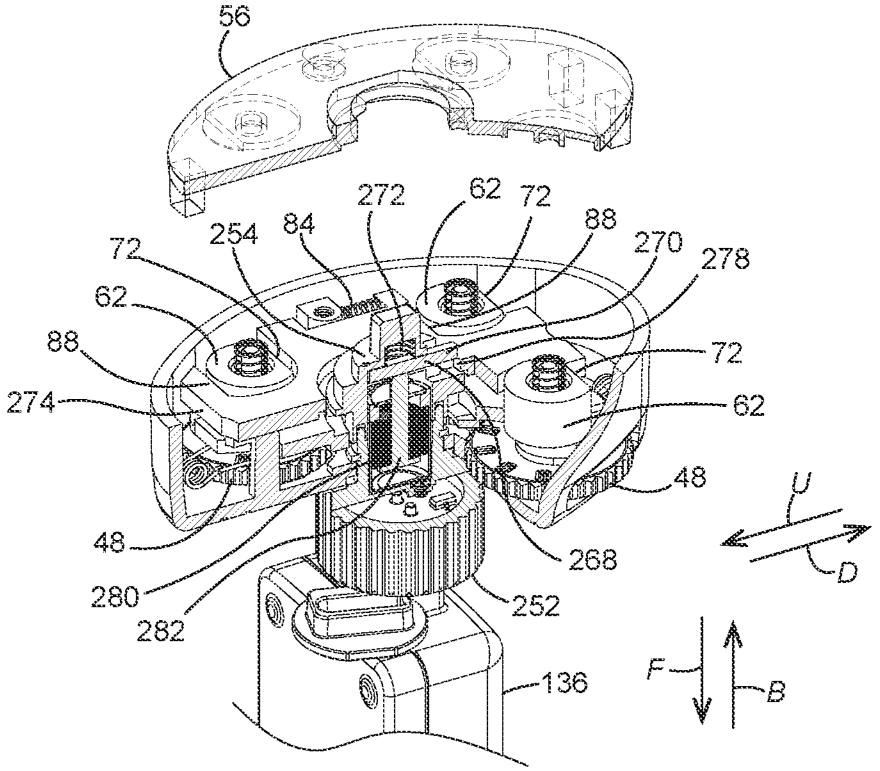
FIG. 36 is a partial cross-sectional view, taken along line B-B in FIG. 5, of the outer housing of FIG. 32, in which the electronic key has overridden the mechanical combination lock and placed the outer housing into the unlocked position.
Figure 37:
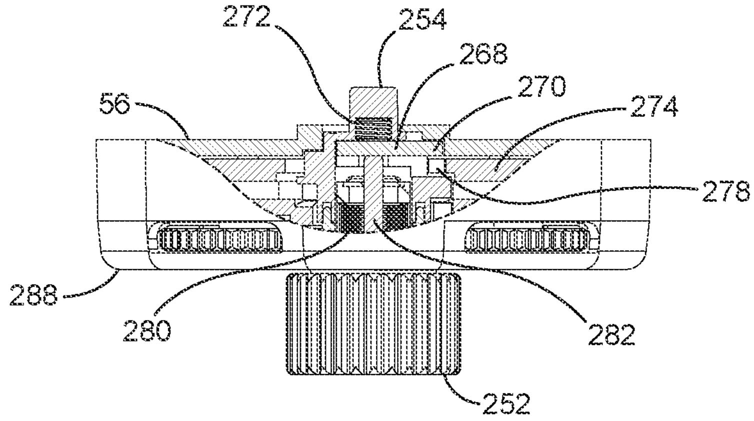
FIG. 37 is a side view of the outer housing of FIG. 32, in partial cutaway, in which the electronic key has overridden the mechanical combination lock and placed the outer housing into the unlocked position.
Figure 38:
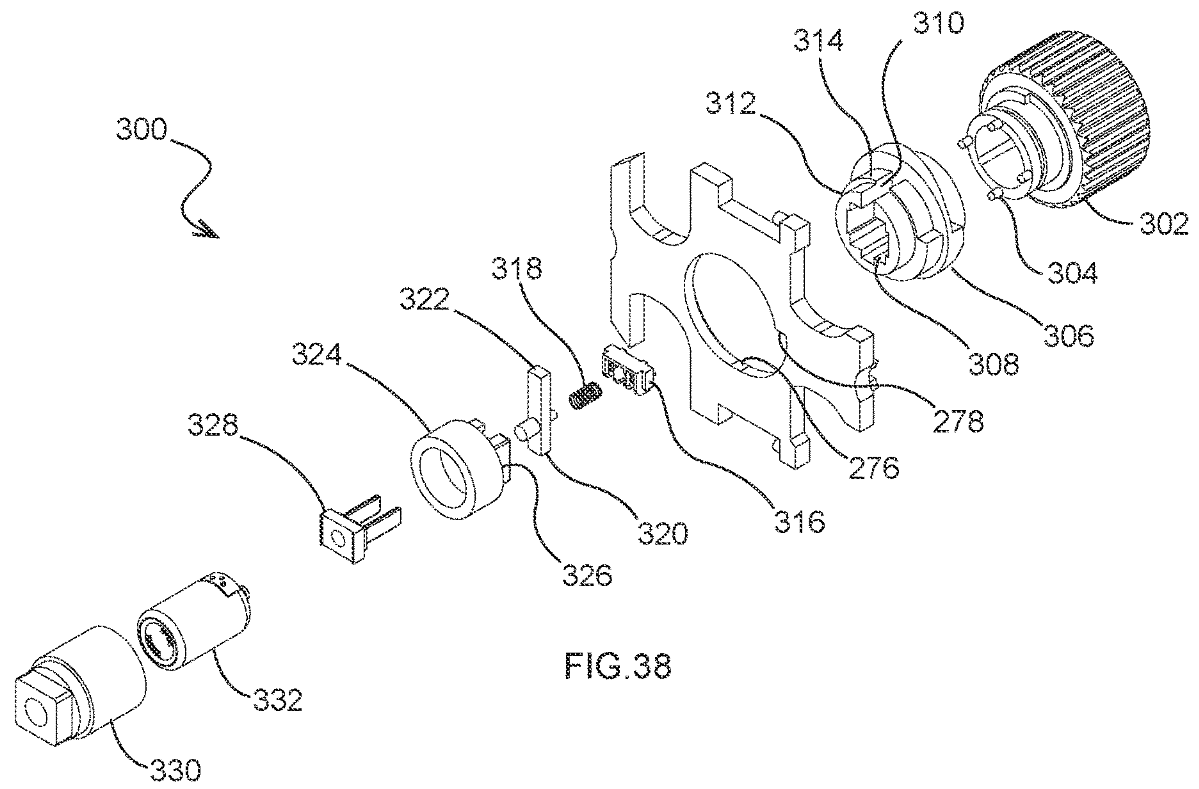
FIG. 38 is an exploded detail view of a knob assembly and drive shaft for use with a fifth example of a combination lock.
Figure 39:
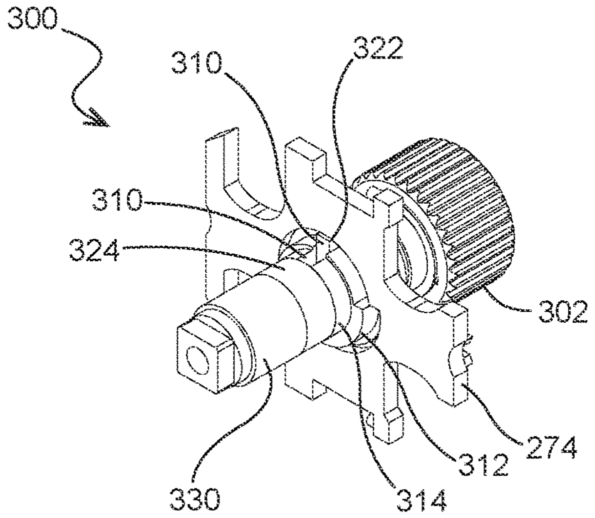
FIG. 39 is a perspective assembly view of the knob assembly and drive shaft of FIG. 38.
Figure 40:
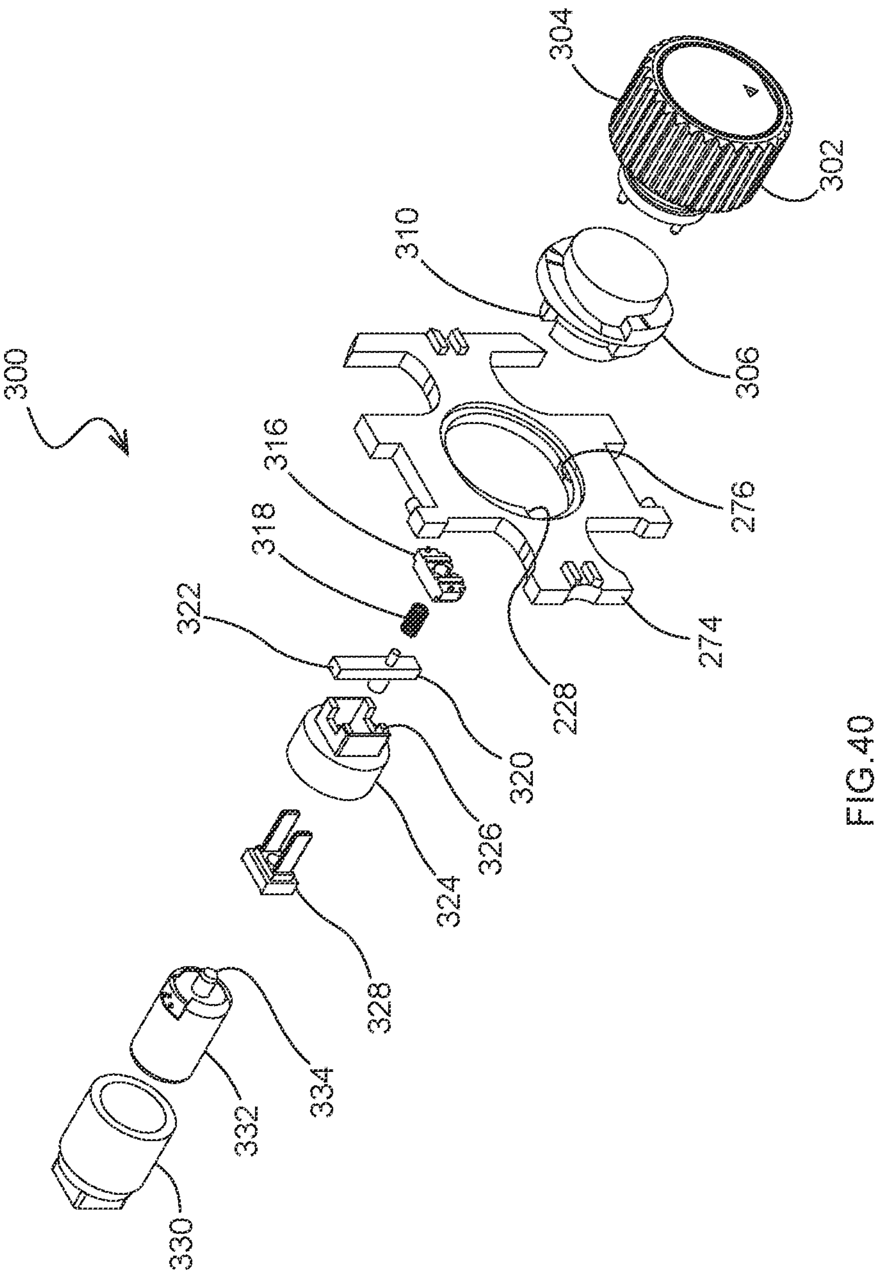
FIG. 40 is an exploded detail view of the knob assembly and drive shaft of FIG. 38 from a rear perspective.

FIGS. 36 and 37 depict the outer housing 288 with the electronic override key 136 applied to the port. In this example, when the actuator 280 is activated, it translates the push rod 282 in direction B. The actuator 280 overcomes the biasing force of the spring 272 and forces the slider 268 in direction B. The slider 268 moves to a position where it is no longer co-planar with the locking plate 274, and therefore the locking end 270 of the slider 268 no longer engages the bearing surface 278 of the locking plate 274. The user is therefore free to turn the knob 252 between the open position and the closed position while the actuator 280 is activated, regardless of the positioning of the dials 48.

Figure 41:
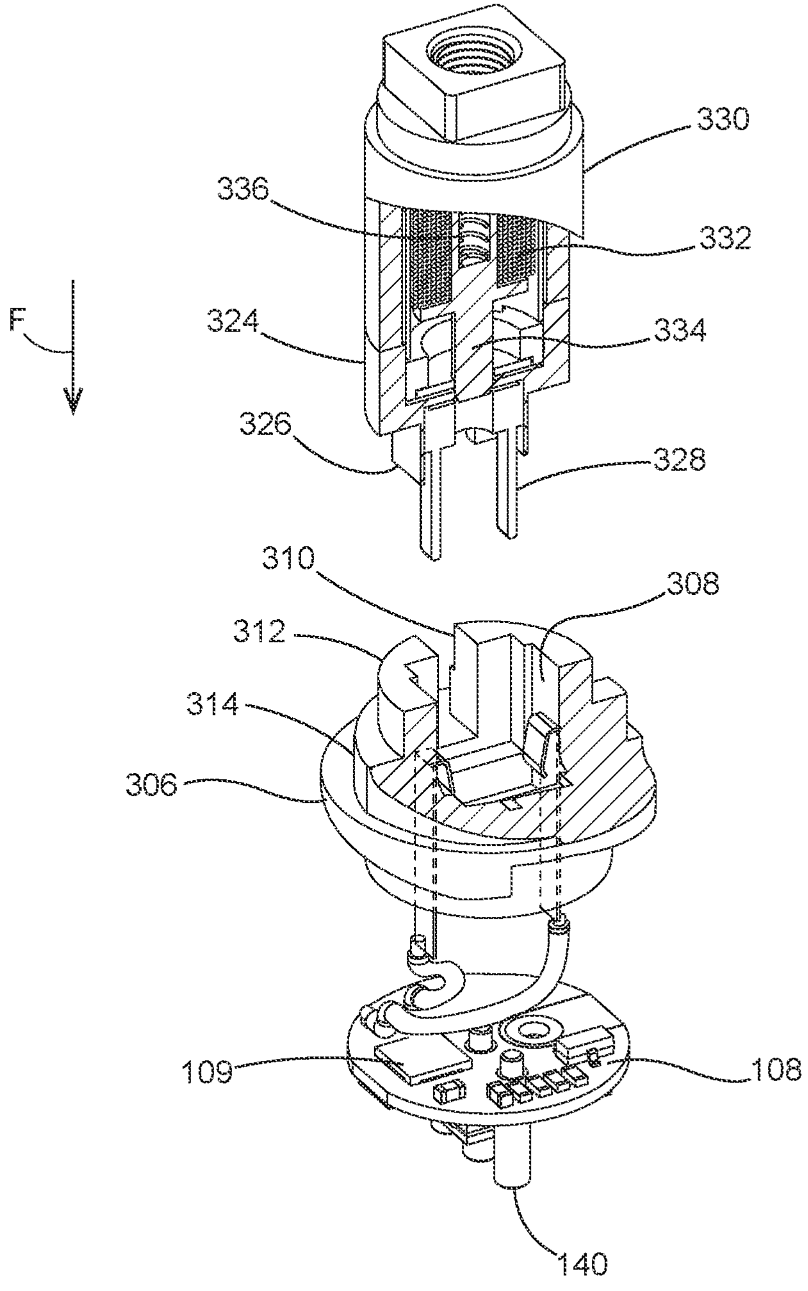
FIG. 41 is an exploded perspective view in partial cutaway of the actuating system of FIG. 38.

Referring now to FIGS. 38-41, a fifth example of an actuating system 300 is depicted. The actuating system 300 operates similarly to the actuating system 250, but with several of the components inverted. The actuating system 300 includes a knob 302 with pins 304 that couple the knob 302 to a drive shaft 306. The drive shaft 306 includes a recess 308 and an opening 310 extending through a first layer 312 and a second layer 314. As best seen in FIG. 41, disposed within the recess 308 is a connector 316 that is in communication with the microcontroller 109 disposed on the circuit board 108 within the knob 302. As in previous examples, the microcontroller 109 is in communication with the port 140. And similar to the previous example, also disposed within the recess 308 is a lower spring 318 and a slider 320. Again, the slider 320 extends through the opening 310 in the first and second layers 312, 314, such that a locking end 322 of the slider 320 is external to the drive shaft 306.

The actuating system 300 further includes a collar 324 with legs 326 extending into the recess 308 and connecting the collar 324 to the drive shaft 306. A plug 328 is disposed within the collar 324 and connects to the connector 316. A generally cylindrical cap 330 is affixed to the collar 324 and houses a linear actuator 332, having a push rod 334, and an upper spring 336. The upper spring 336 biases the push rod 334 in direction F, thereby pushing the slider 320 in direction F such that it is co-planar with the locking plate 274. The actuator 332 is connected electronically to the microcontroller 109 via the connector 316 and the plug 328.

Figure 42:
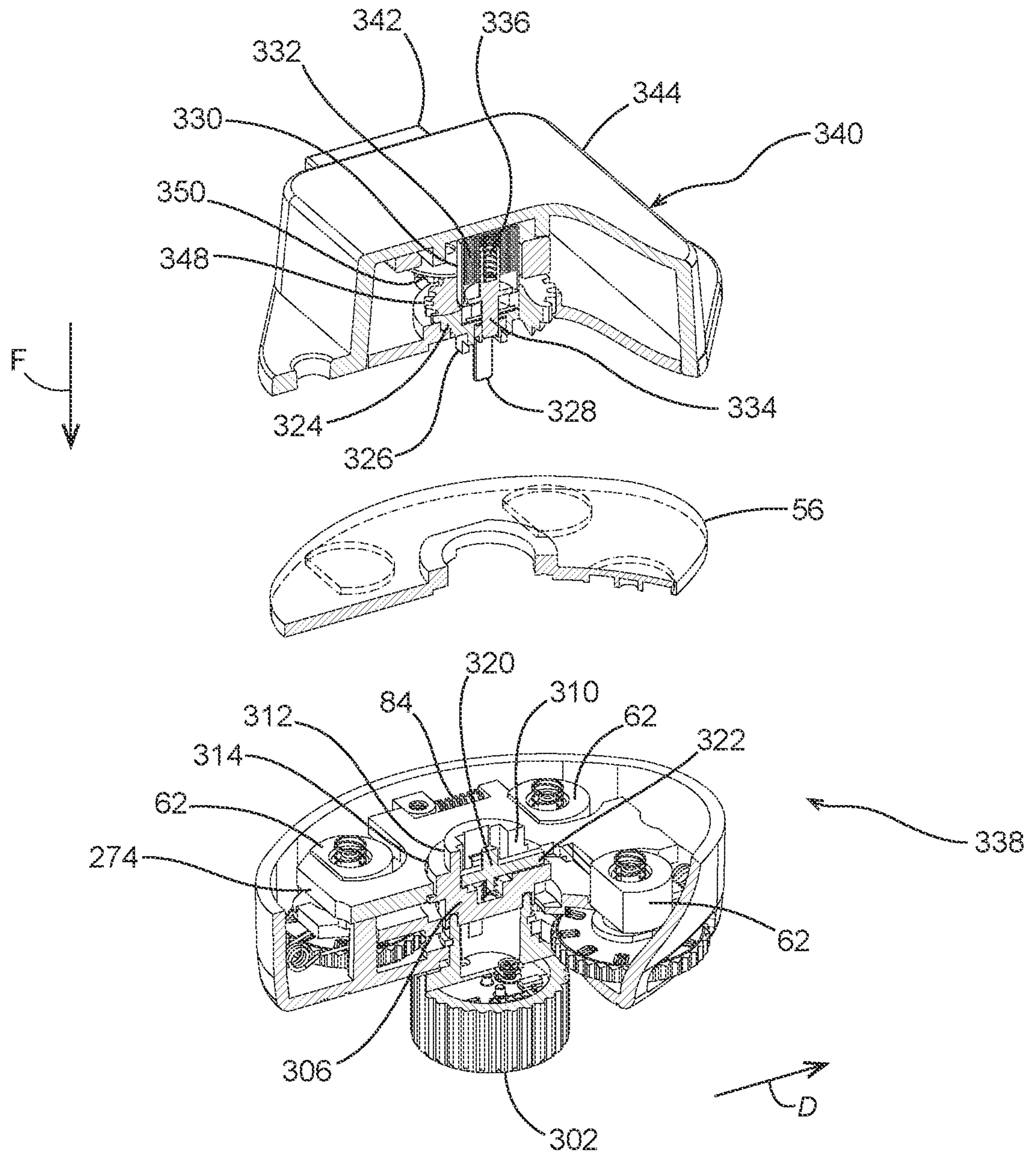
FIG. 42 is a partial cross-sectional view of the fifth example of the combination lock, taken along line B-B in FIG. 5, of an outer housing, in the unlocked position, incorporating the actuating system of FIG. 38, with a bolt locking element.

FIG. 42 depicts a combination lock 338 with a locking mechanism 340 having a retractable bolt 342. The locking mechanism 340 operates as is known in the art, with rotation of the knob 302 causing the bolt 340 to alternately extend and retract from the housing 344 of the locking mechanism 340 via gears 348 and 350. In this example, the collar 324 is integral with the gear 348. Here, the cam wheels 62 have been placed in the unlocking position, and the locking plate 274 is translated to in direction D via springs 84. This is the same position of the slider 268 and locking plate 278 as in FIGS. 32 and 33, and the user can similarly rotate the knob 302 between the open and closed position. In this example, the actuator 332 is contained within the housing 344, and the spring 336 biases the push rod 334 in direction F, thereby pushing the slider 320 in direction F such that it is maintained co-planar with the locking plate 274.

Figure 43:
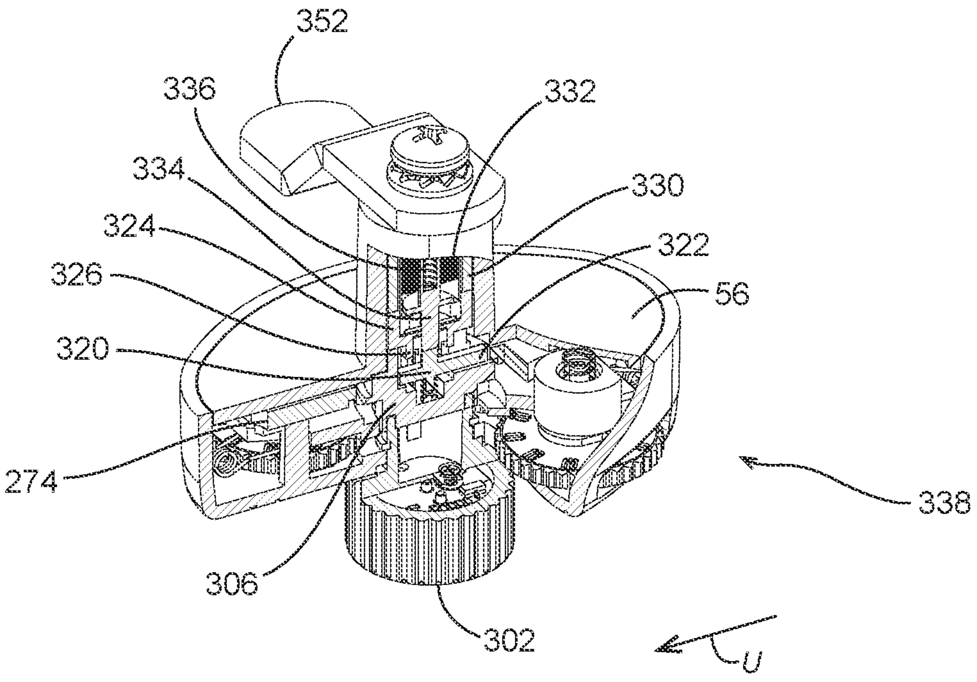
FIG. 43 is a partial cross-sectional view, taken along line B-B in FIG. 5, of the outer housing of FIG. 42, in the locked position, incorporating the actuating system of FIG. 38 and with a cam blade locking element.

FIG. 43 depicts the combination lock 338 with a cam blade 352 as the locking element. In this view, all of the cam wheels 62, the locking plate 274, and the slider 320 are in the same position as in FIGS. 34 and 35, with the locking plate 274 moved to in direction U relative to FIG. 42. The combination lock 338 is therefore in the locked position, with the upper spring 336 biasing the push rod 334 in direction F, thereby biasing the slider 320 to be co-planar with the locking plate 276. The locking end 322 of the slider

320 bears against the bearing surface 278 of the locking plate 274, thereby preventing rotational motion of the knob 302.

Figure 44:
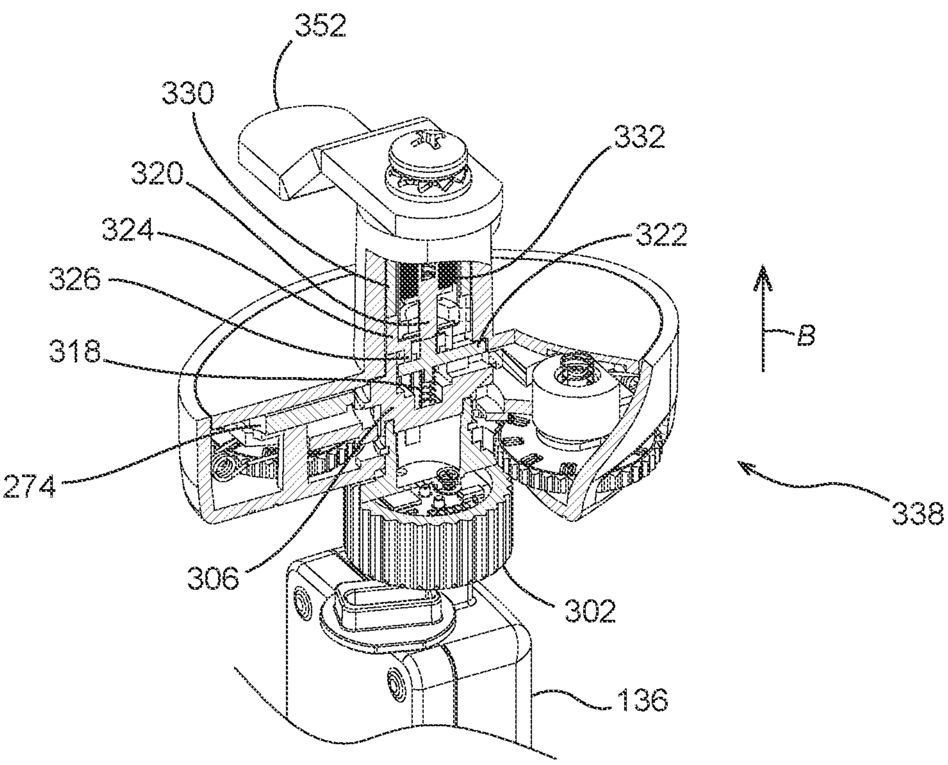
FIG. 44 is a partial cross-sectional view, taken along line B-B in FIG. 5, of the outer housing of FIG. 42, in partial cutaway, in which the electronic key has overridden the mechanical combination lock and placed the outer housing into the unlocked position.

Referring now to FIG. 44, the electronic key 136 has been inserted into the port 140 with the proper access code being entered. The microcontroller 109 signals the actuator 332 to energize, and the actuator 332 translates the push rod 334 in direction B, against the biasing force of upper spring 336. The slider 320 is then pushed in direction B under the force of lower spring 318. The slider 320 is pushed above the plane of the locking plate 274, as in the previous example, thereby removing the locking end 322 of the slider 320 from the bearing surface 278 of the locking plate 274. The knob 302 is thereby free to rotate, and therefore the cam blade 352 is free to rotate, between the open position and the closed position.

Figure 45:
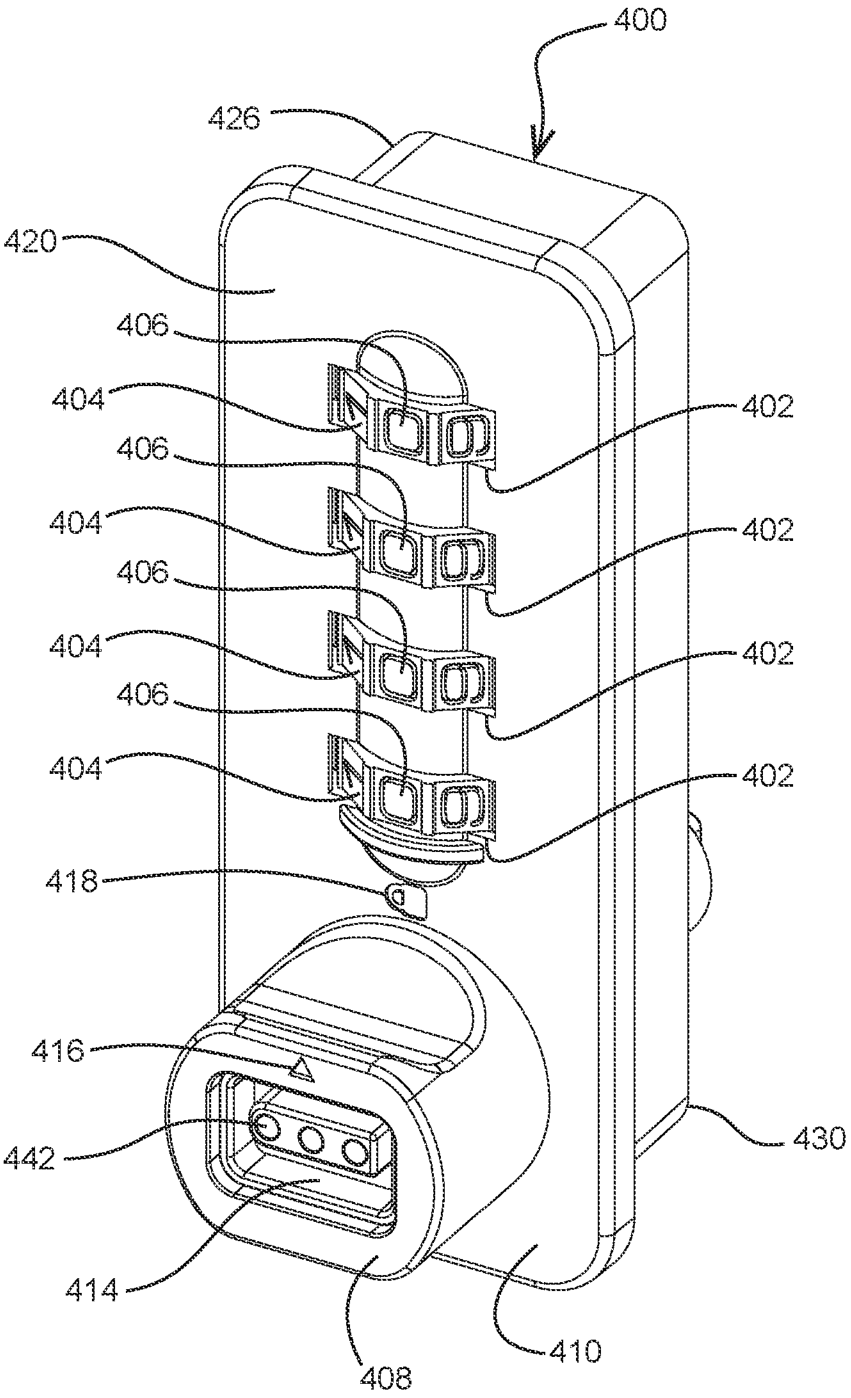
FIG. 45 is a perspective view of a sixth example of a combination lock.

Referring now to FIG. 45, a fifth example of a combination lock 400 with an electronic override is disclosed. The combination lock 400 includes four openings 402 through which four rotatable dials 404 are accessible, each of the rotatable dials 404 bearing indicia 406, and this example the indicia 406 are numerals from 0-9. As is well known, a user may physically manipulate and rotate the dials 404 to select a specific numeral 406 for each dial 404, thereby selecting a set of numerals. In the example shown in FIG. 45, as is known, each dial 404 has the numeral "0" in the selected position.

The combination lock 400 also includes a rotatable knob 408 located on a front side 410 of the combination lock 400. Again, as is well known, and as will be described further, when predetermined numerals 406 are each in the selected position, the combination lock 400 is in the unlocked position, and the user may rotate the knob 408. The knob 408 may include a port 414 that may serve as a connection point for an electronic key 136, as described above. In this example, the knob 408 includes an arrow 416, and the combination lock 400 includes a 'locked' symbol 418, such that when the arrow 416 on the knob 408 points to the locked symbol 418, the combination lock 400 is in the closed position, and the door or panel to which the combination lock is attached normally cannot be opened (that is, without the electronic override).

Figure 46:
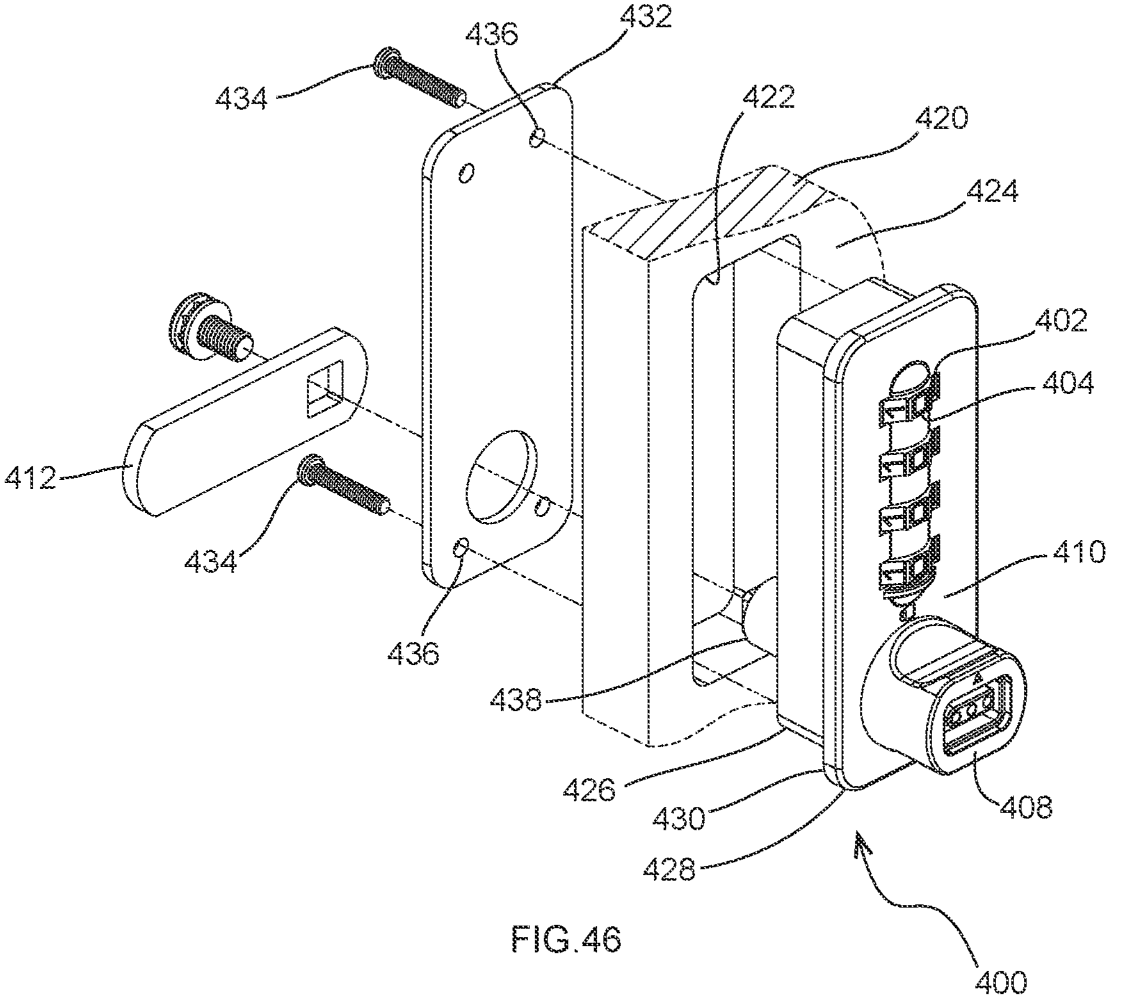
FIG. 46 is an exploded perspective view of the combination lock of FIG. 45 mounted to a door or panel.
Figure 47:
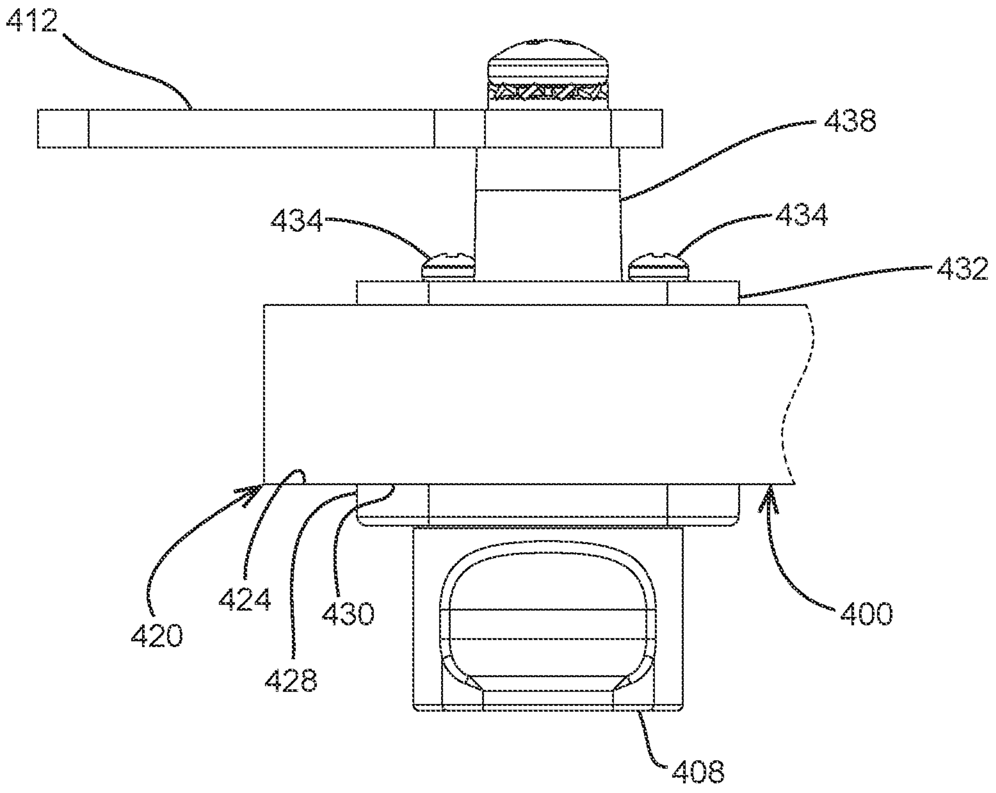
FIG. 47 is a top view of the combination lock of FIG. 45 mounted to a door or panel.

FIG. 46 is an exploded view depicting the combination lock 400 mounted to a door or panel 420, and FIG. 47 is a top assembly view of the same. The door or panel 420 will be referred to simply as a door 420 for ease of reference, and no limitation should be inferred. The door 420 includes an opening 422 and has an exterior face 424. The combination lock 400 has a main body portion 426 that has a cross section that is complementary to the opening 422 in the door 420, and the combination lock 400 further has a face portion 428 that includes a lip 430 that extends laterally out from the main body portion 426. When the combination lock 400 is installed on the door 420, the lip 430 bears against the exterior face 424 of the door 420.

The combination lock 400 can be mounted to the door 420 with the assistance of a separate mounting plate 432. The mounting plate 432 is disposed against a rear face of the door 420, and fasteners 434 extend through openings 436 in the mounting plate 432 and into complementary threaded holes (not shown) in the lock 400. As is well known in the art, a locking element 412 such as a cam blade can be affixed to a rotatable core 438 extending out a rear side of the main body portion 426 of the combination lock 400. Again, although a cam blade is shown, other known locking elements, such as bolts and latches, can be employed.

Figure 48:
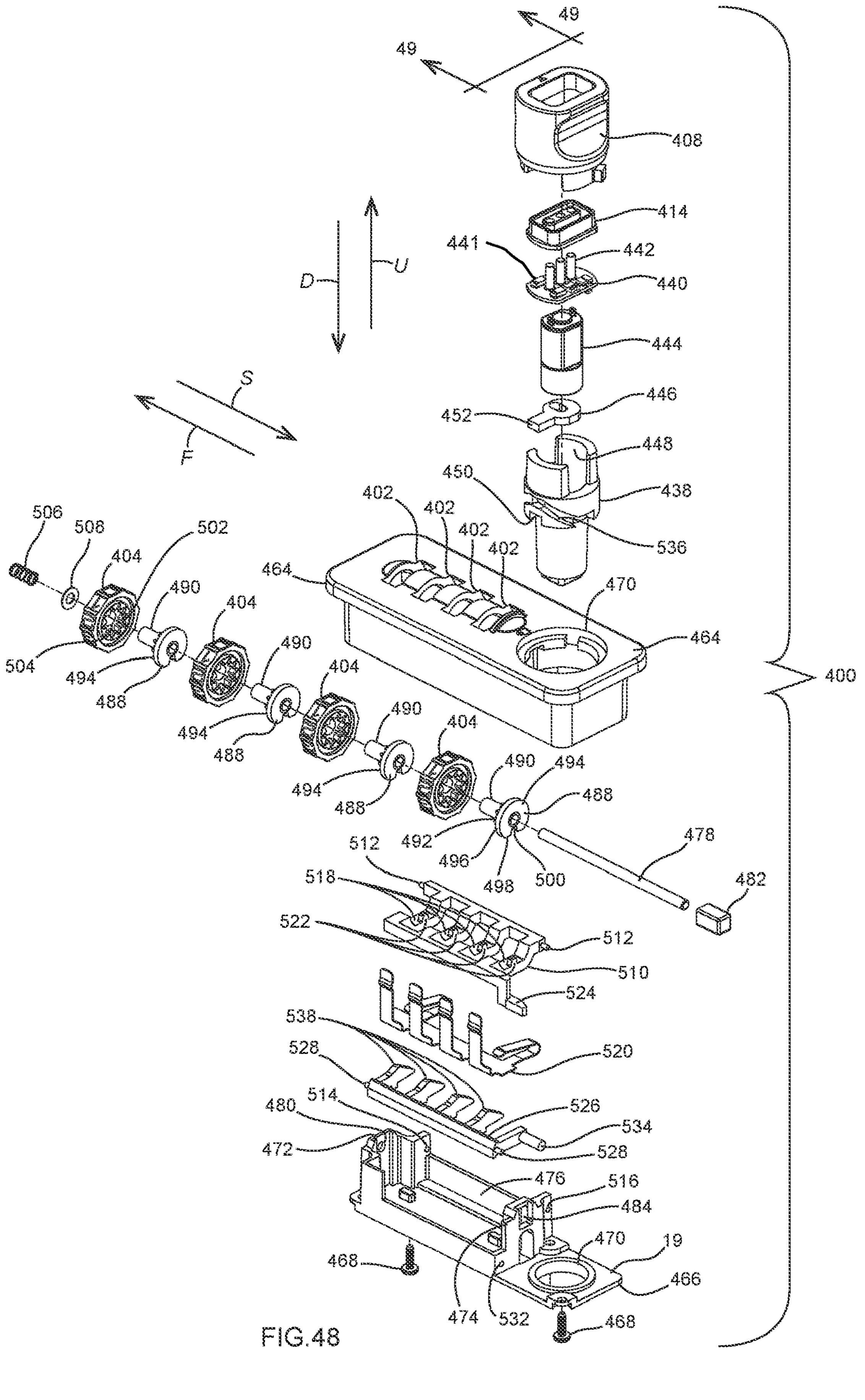
FIG. 48 is an exploded perspective view of the combination lock of FIG. 45.
Figure 49:
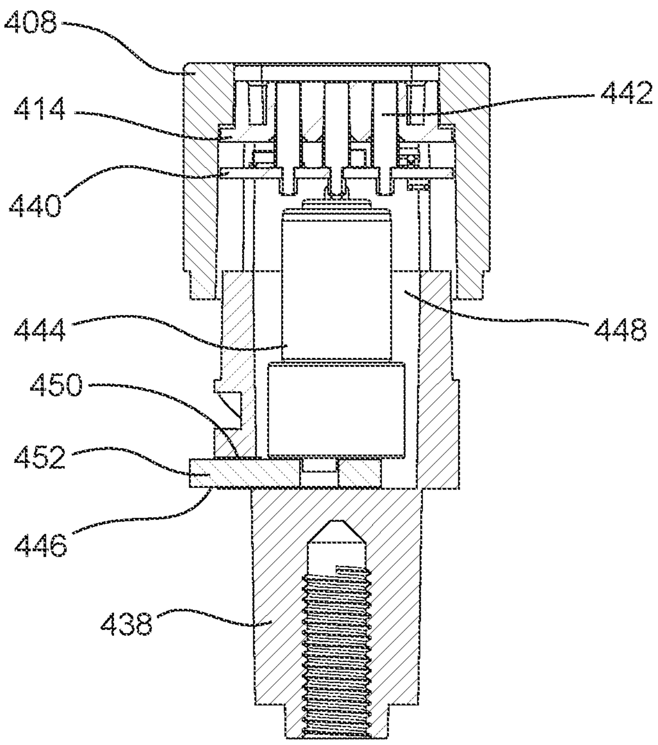
FIG. 49 is a section view of an electronic actuating assembly taken along line 49-49 in FIG. 48.
Figure 50:
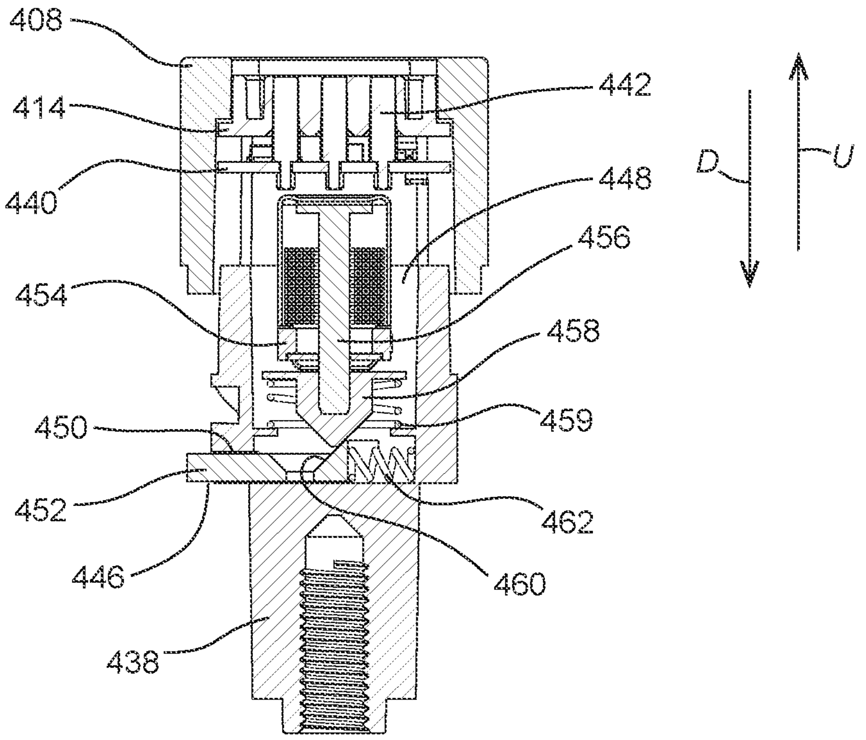
FIG. 50 is a section view of a second example of an electronic actuating assembly taken along line 49-49 in FIG. 48.
Figure 51:
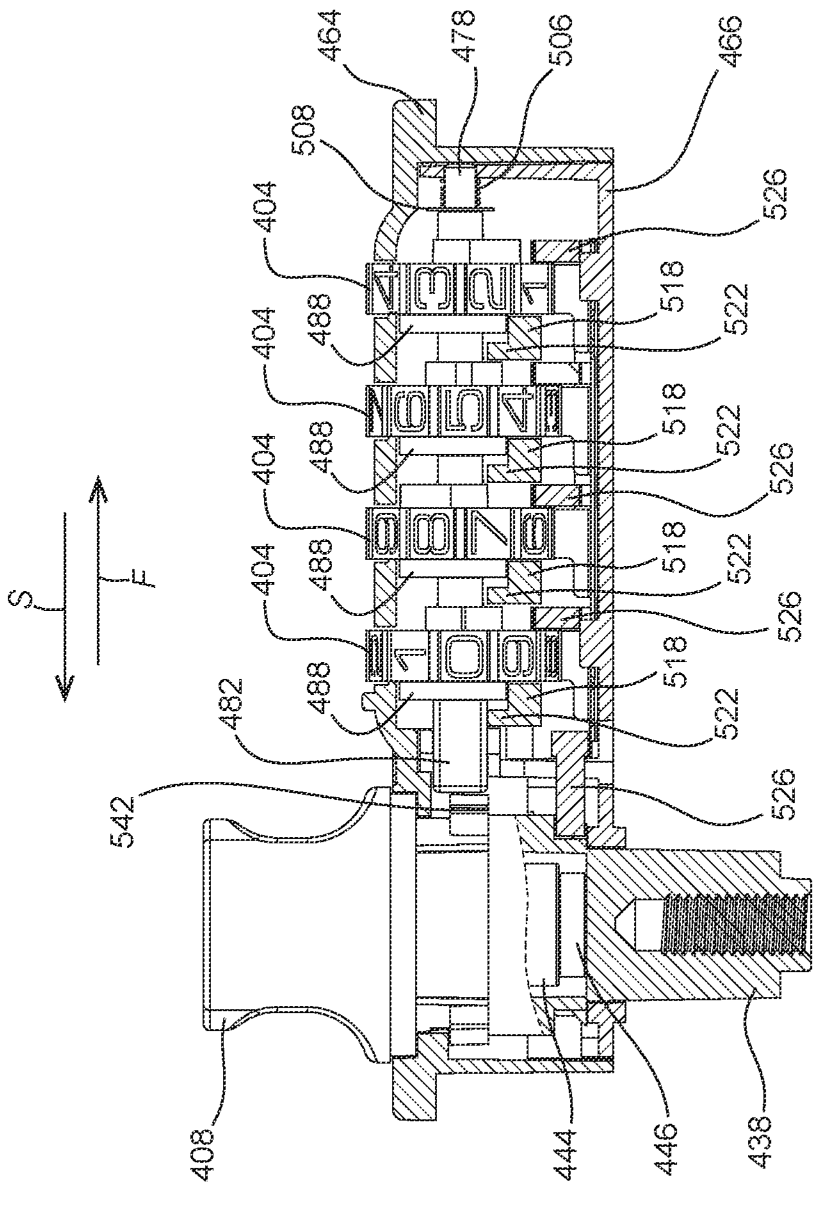
FIG. 51 is a front view of the combination lock of FIG. 45, with the housing in partial cutaway, with the cam wheels engaged with the rotatable dials.
Figure 52:
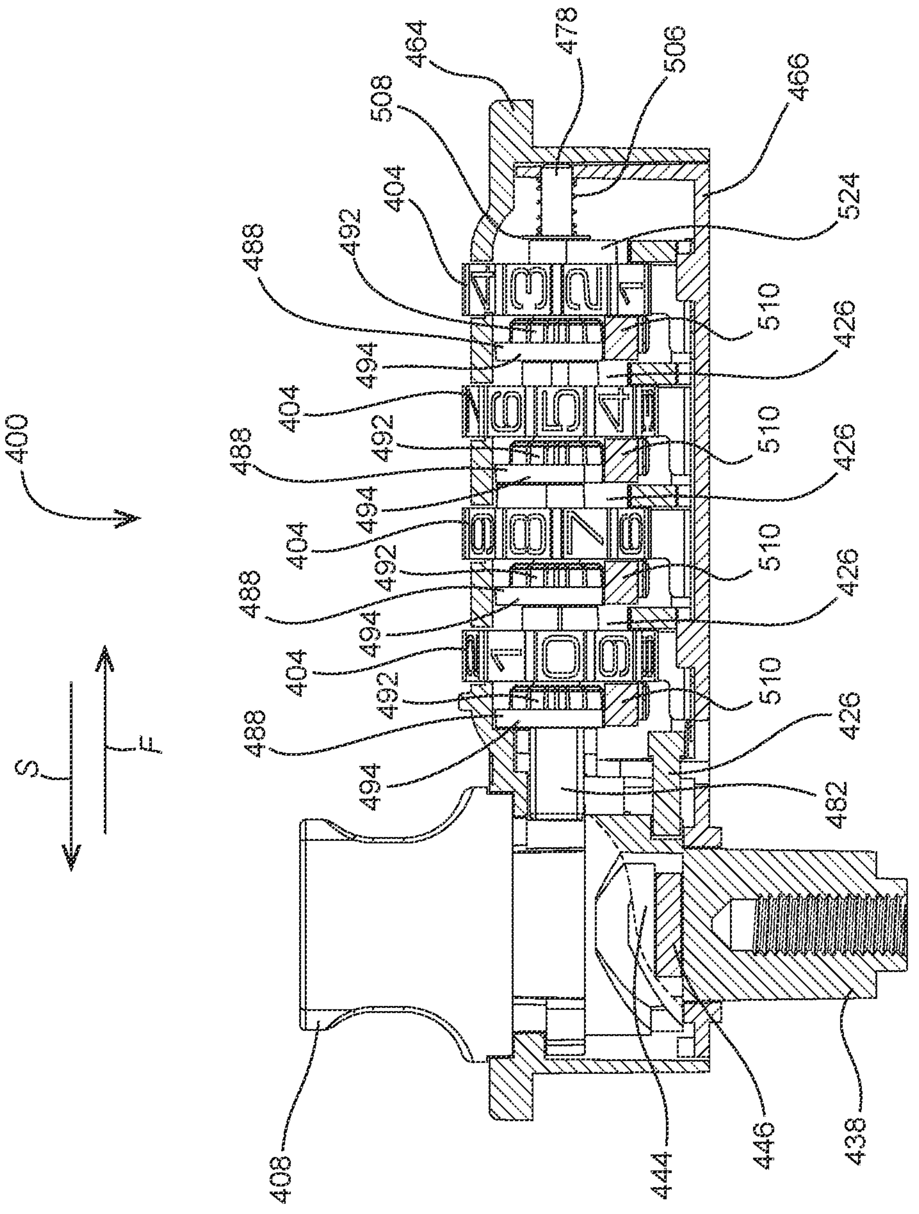
FIG. 52 is a front view of the combination lock of FIG. 45, with the housing in partial cutaway, with the cam wheels disengaged from the rotatable dials.
Figure 53:
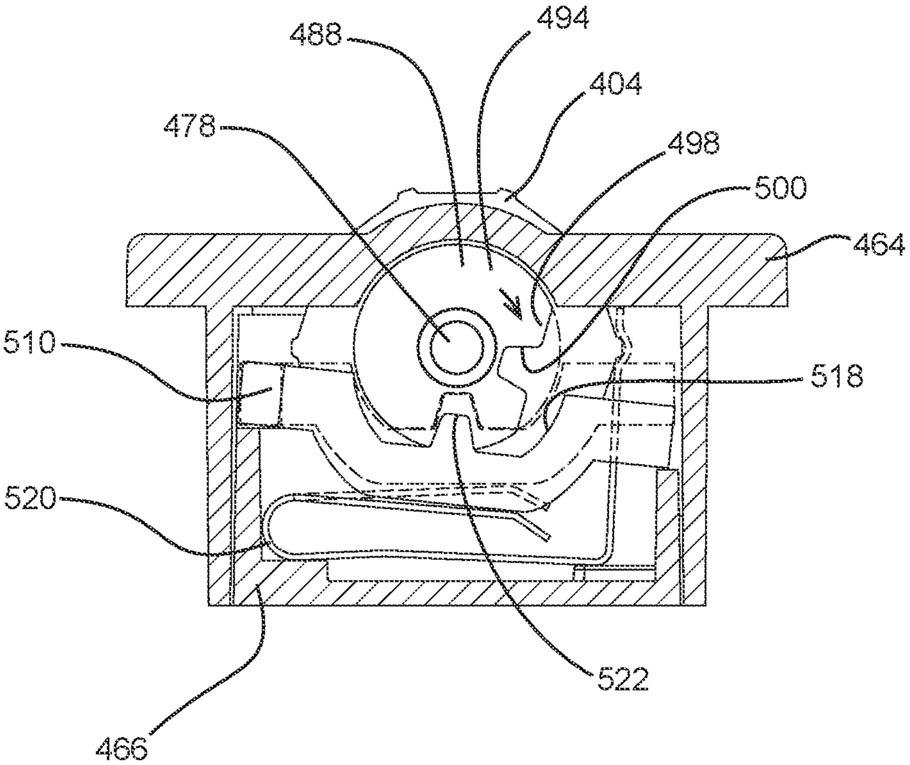
FIG. 53 is a right side view of the combination lock of FIG. 45, with the housing in partial cutaway.

FIG. 48 is an exploded view of the combination lock 400. As described above, disposed within the knob 408 is a port 414, and under the port 414 is a circuit board 440 with a microcontroller 441 and a connector 442 disposed thereon. See also FIGS. 49 & 50. The connector 442 may serve to receive the electronic key 136 as described in previous examples. Disposed underneath the circuit board 440 in the examples shown in FIGS. 48 and 49 is an electric motor 444 which is operatively connected to a locking slider 446. The knob 408 is mounted in fixed orientation to the rotatable core 438, and the port 414, circuit board 440, electric motor 444, and locking slider 446 are disposed in a compartment 448 formed between the knob 408 and the rotatable core 438. Further, the rotatable core 438 includes an opening 450 in its sidewall, and the locking slider 446 is disposed such that a locking end 452 of the locking slider 446 is disposed outside the rotatable core 438. Operation of the electric motor 444 translates the locking slider 446 between a position where the locking end 452 is exterior to the rotatable core 438 as shown in FIG. 49, to a position where the locking end 452 is within the compartment 448. Referring now to FIG. 50, instead of an electric motor 444, a linear actuator 454 is connected to the circuit board 440. The linear actuator 454 includes a push rod 456 terminating in a ramp 458, and a push rod spring 459 biases the ramp 458 in direction U away from the locking slider 446. Further, the locking slider 446 in this example includes a sloped opening 460 and is biased by a spring 462 to a position where the locking end 452 of the locking slider 446 is exterior to the rotatable core 438. Operation of the linear actuator 454 forces the ramp 458 in direction D, which translates the locking end 452 of locking slider 446 into the compartment 448.

The combination lock 400 includes an upper housing 464 and a lower housing 466 that can be fixed together using fasteners 468. The upper housing 464 and the lower housing 466 include concentric openings 470 through which the knob 408 and the rotatable core 438 are mounted. The lower housing 466 includes a first wall 472 and a second wall 474 that define a chamber 476 in which many of the mechanical components of the combination lock 400 are disposed and mounted.

Referring now to FIGS. 48, 51, 52, and 53, the dials 404 are rotatably disposed on a shaft 478. The shaft 478 is mounted through a first opening 480 in the first wall 472. A push block 482 is disposed in a first opening 484 in the second wall 474, and the push block 482 includes a cylindrical opening 486 (seen best in FIG. 57) in which the shaft 478 is disposed. The cylindrical opening 486 is constructed such that the push block 482 can slide laterally back and forth in directions F and S on the shaft 478 as it slides within the first opening 484 in the second wall 474.

Also disposed on the shaft 478 is a series of cam wheels 488, one for each dial 404. Each cam wheel 488 includes a cylinder 490, a star gear 492, and a cam 494. Each cam 494 has a circular portion 496 and a flat edge 498. Within each flat edge 498 is a recess 500. Each dial 404 includes an internal star gear 502 complementary to the star gear 492 of the cam wheel 488. Accordingly, when the star gears 492, 502 are engaged, rotation of the dial 404 also rotates the cam wheel 488. Further, each cylinder 490 of each cam wheel 488 extends through an internal opening 504 of the associated dial 404, and the cylinder 490 of a cam wheel 488 abuts a cam 494 of an adjacent cam wheel 488. Therefore, as disclosed in FIG. 51, translation of the push block 482 in the direction F translates all four of the cam wheels 488 in the direction F, while at the same time the dials 404 remain laterally stationary and are prevented from lateral motion by the openings 402 in the upper housing 464, such that the star gears 492 of the cam wheels 488 engage the internal star gears 502 of the dials 404.

Disposed on the shaft 478 on an end distal from the push block 482 is a spring 506 and a washer 508. The spring 506 biases the cam wheels 488 in direction S, to the position that they are disengaged from the dials 404 (see FIG. 52), and only when the push block 482 forces the cam wheels 488 in direction F are the cam wheels 488 engaged with the dials 404 (see FIG. 51).

A locking arm 510 is pivotably mounted within the first and second walls 472, 474 of the lower housing 466. The locking arm 510 includes pins 512 disposed in second openings 514, 516 in the first and second walls 472, 474. The locking arm 510 includes four cradles 518, each cradle 518 bearing against a respective cam wheel 488. Each cradle 518 includes a protrusion 522 facing upwardly. When the push block 482 is translated in direction F, and the cam wheels 488 are engaged with the dials 404, then rotation of the dials 404 will cause the cam wheels 488 to rotate freely within the cradles 518 without engaging the protrusions 522. See FIG. 51.

The locking arm 510 is further biased upwardly (in direction U) by leaf spring 520. See FIG. 53. Accordingly, when all of the dials 404 are rotated such that the flat edges 498 of the cam wheels 488 are facing down (direction D), the locking arm 510 pivots upwardly from the force of the leaf spring 520. As will be described further below, this position defines an unlocked position. When at least one of the dials 404 is rotated to a position where its cam wheel 488 flat edge 498 is not down, that cam wheel 488 will pivot the locking arm 510 in direction D. This position defines a locked position.

Also disposed within the chamber 476 is a reset arm 526. See FIGS. 48, 54, and 54A. The reset arm 526 includes pins 528 mounted in a third hole in the first wall 472 (not seen) and a third hole 532 in the second wall 474, such that the reset arm 526 can pivot about the pins 528. At an end of the reset arm 526 is a post 534 that servers as a follower, which is disposed within a channel 536 in the rotatable core 438 that serves as a cam. The channel 536 is constructed such that as the rotatable core 438 is rotated, the path of the channel 536 forces the post 534 up and down, and the reset arm 526 pivots up and down about an axis defined by its pins 528.

The reset arm 526 further includes a plurality of cams 538, where when the reset arm 526 is forced up by the channel 536, the cams 538 pivot up. See FIGS. 54 & 54A. Further, on a side of the dials 404 opposite the side incorporating the internal star gear 502, each dial 404 includes an egg-shaped cam follower 540. Accordingly, when the reset arm 526 pivots upwardly, the cams 538 engage the followers 540 and force the dials 404 to rotate to a reset position (shown in dashed lines in FIG. 54A), and in this example the numeral 0 is the reset position.

Figure 55:
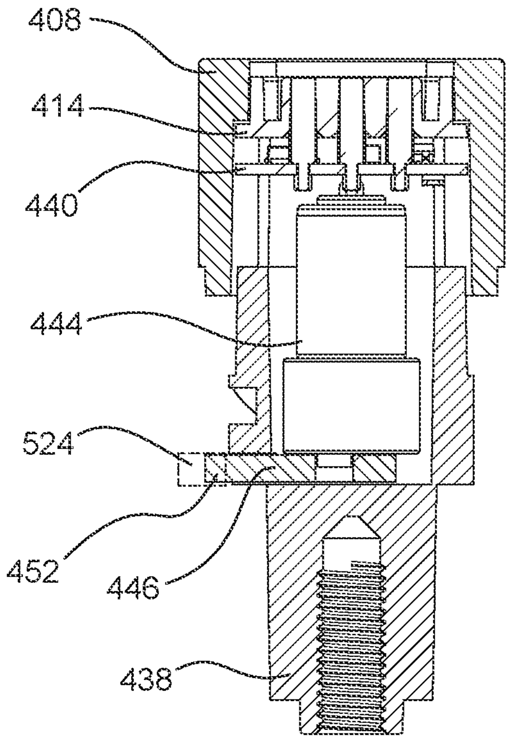
FIG. 55 is a section view of the electronic actuating assembly taken along line 49-49 in FIG. 48.
Figure 56:
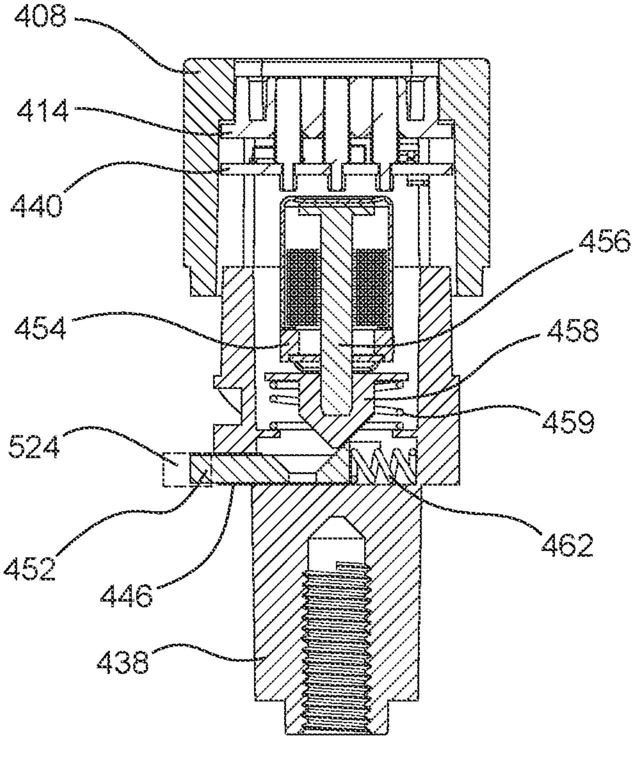
FIG. 56 is a section view of the second example of the electronic actuating assembly taken along line 49-49 in FIG. 48.
Figure 57:
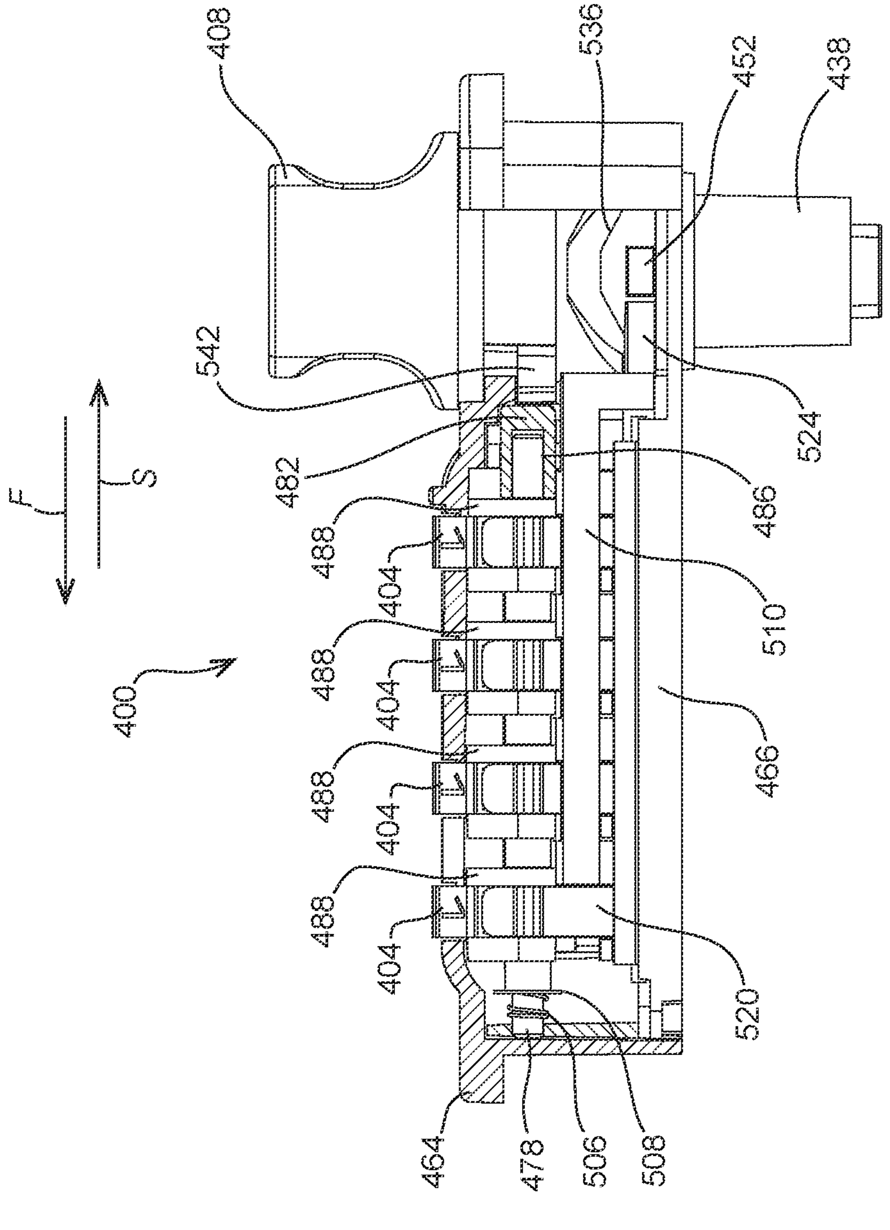
FIG. 57 is a rear view of the combination lock of FIG. 45, with the housing in partial cutaway.

Referring now to FIGS. 55-57, the combination lock 400 is depicted in the locked position. Referring particularly to FIG. 57, the knob 408 includes a rib 542 that forces the push block 482 in direction F. The push block 482 slides in direction F over the shaft 478 and pushes all of the cam wheels 488 in direction F such that the star gears 492 engage the internal star gears 502. The dials 404 have been rotated such that at least one of the flat edges 498 of the cam wheels 488 is not facing down, and the cam wheel 488 is therefore pushing the locking arm 510 down. Moreover, the locking end 452 of the locking slider 446 extends out from the rotatable core 438. As shown in FIG. 55, the electric motor 444 has placed the locking end 452 outside the rotatable core 438, and as shown in FIG. 56, the actuator 454 has retracted and the spring 462 maintains the locking end 452 outside the rotatable core 438.

When the combination lock 400 is in the locked position, and the locking end 524 of the locking arm 510 is down, it abuts the locking end 452 of the locking slider 446 and prevents rotation of the knob 408. The locking end 524 of the locking arm 510 prevents the opening of the combination lock 400 by blocking movement of the locking end 452 of the locking slider 446, and therefore a user cannot rotate the knob 408.

Figure 58:
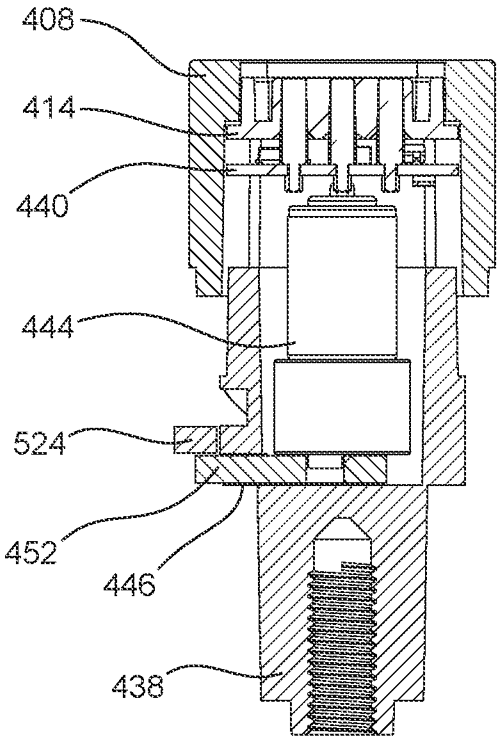
FIG. 58 is a section view of the electronic actuating assembly taken along line 49-49 in FIG. 48.
Figure 59:
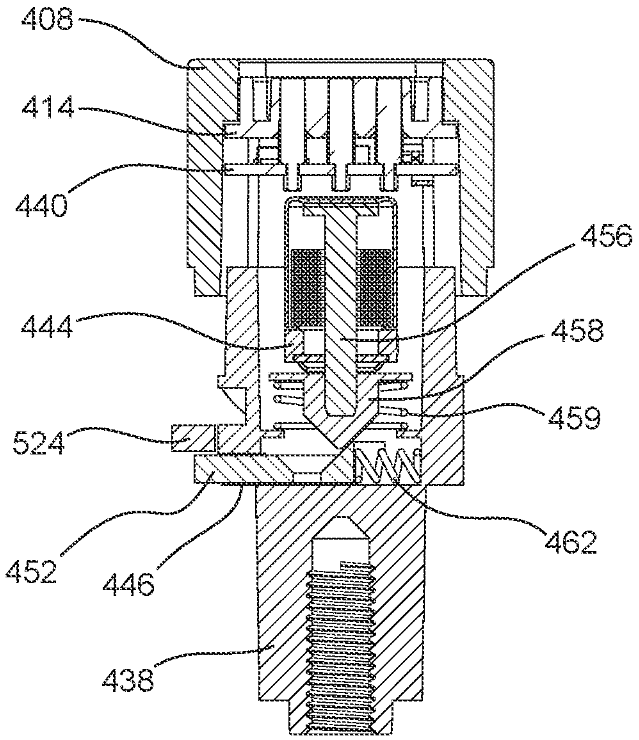
FIG. 59 is a section view of the second example of the electronic actuating assembly taken along line 49-49 in FIG. 48.
Figure 60:
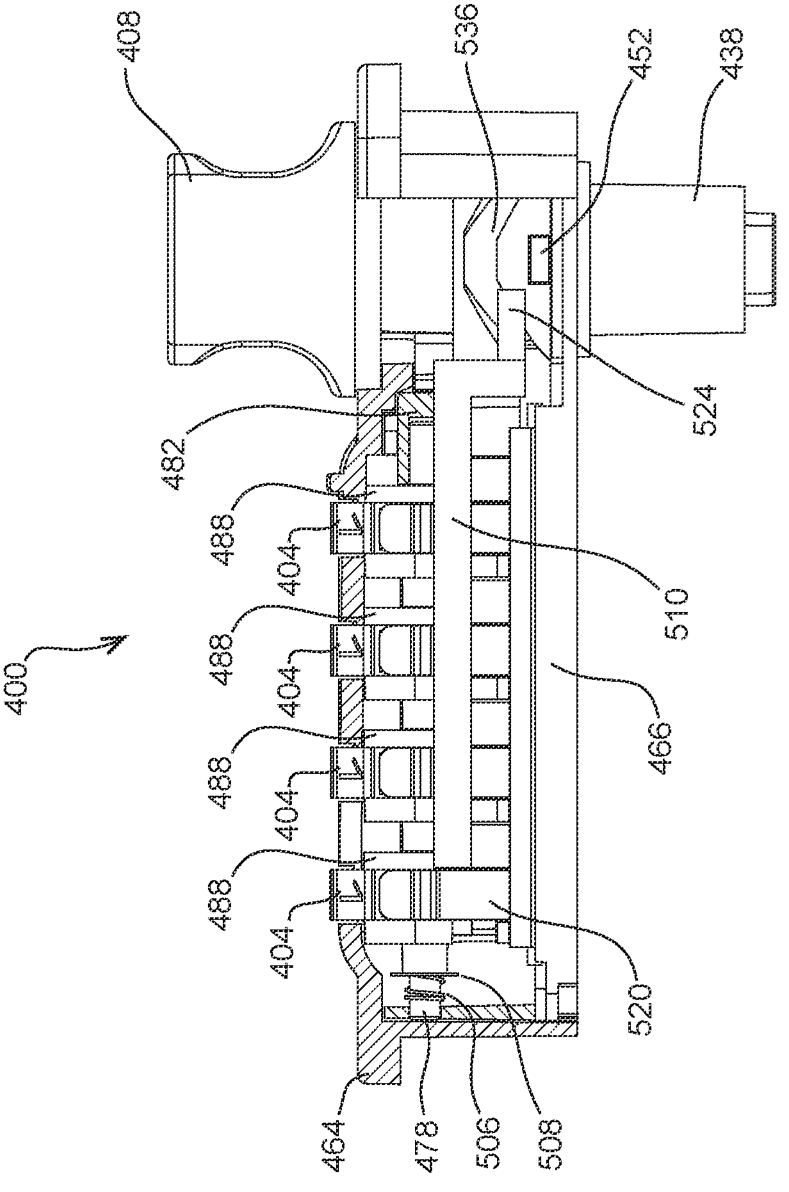
FIG. 60 is a rear view of the combination lock of FIG. 45, with the housing in partial cutaway.

Referring now to FIGS. 58-60, the combination lock 400 is depicted in an unlocked position. The cam wheels 488 continue to engage the dials 404 as in FIGS. 55-57, and the user has rotated the dials 404 to the pre-selected unlocking code, where the flat edges 498 of the cam wheels 488 all face downwardly. The locking arm 510 is pivoted upwardly by the leaf spring 520 into the unlocked position. When the locking arm 510 is up, the locking end 524 of the locking arm 510 is above the plane of the locking end 452 of the locking slider 446, and it no longer prevents rotation of the knob 408, thereby allowing a user to rotate the knob 408 from a closed position to the open position. Although the locking end 452 of the locking slider 446 is still external to the rotatable core 438, the locking end 524 of the locking bar 510 no longer interferes, and the user is able to rotate the knob 408. Rotation of the knob 408 rotates the rotatable core 438, which will rotate the locking element 412, as is known.

Figure 61:
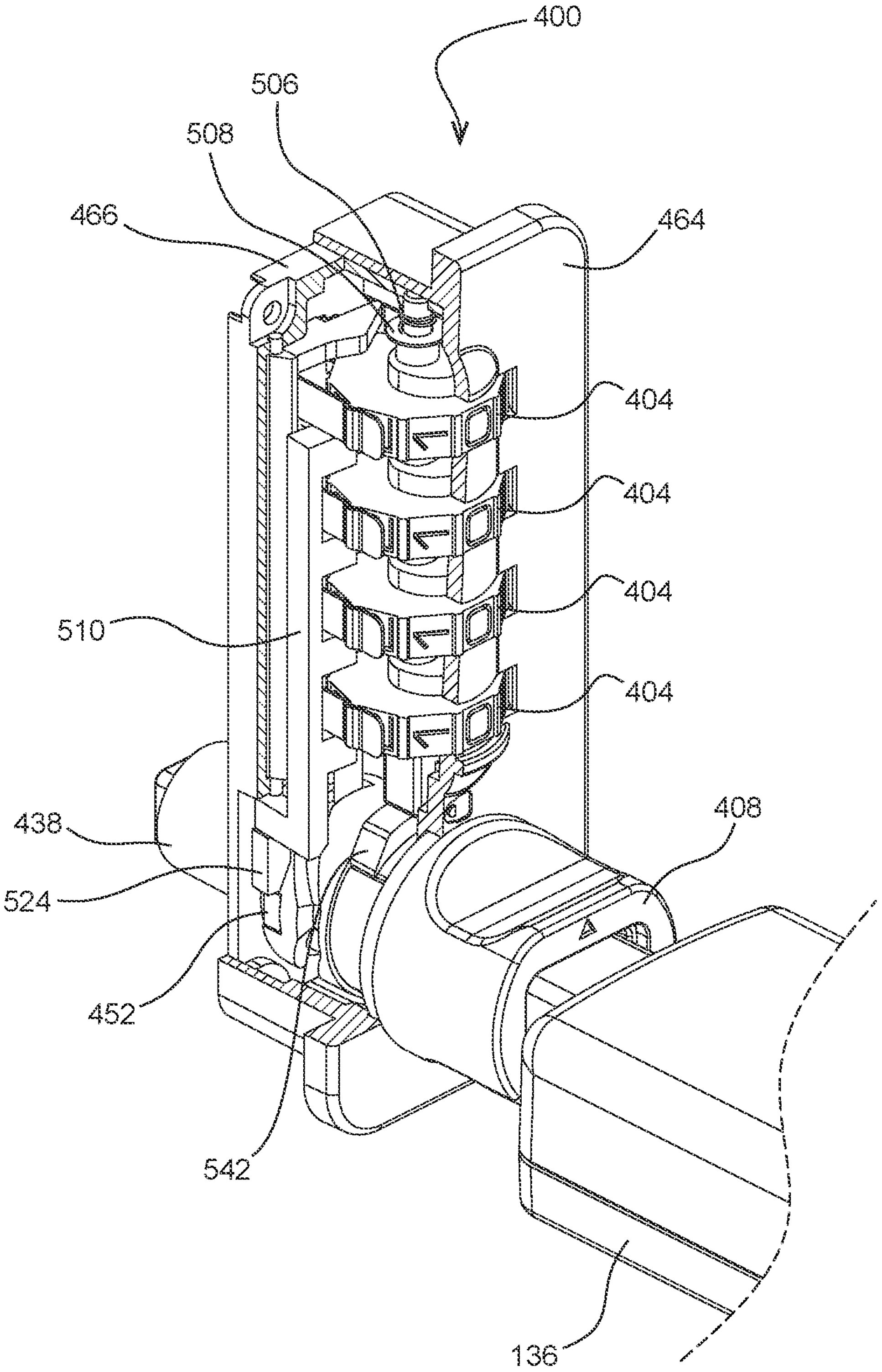
FIG. 61 is a perspective view of the combination lock of FIG. 45, in partial cutaway, with an electronic key applied.
Figure 62:
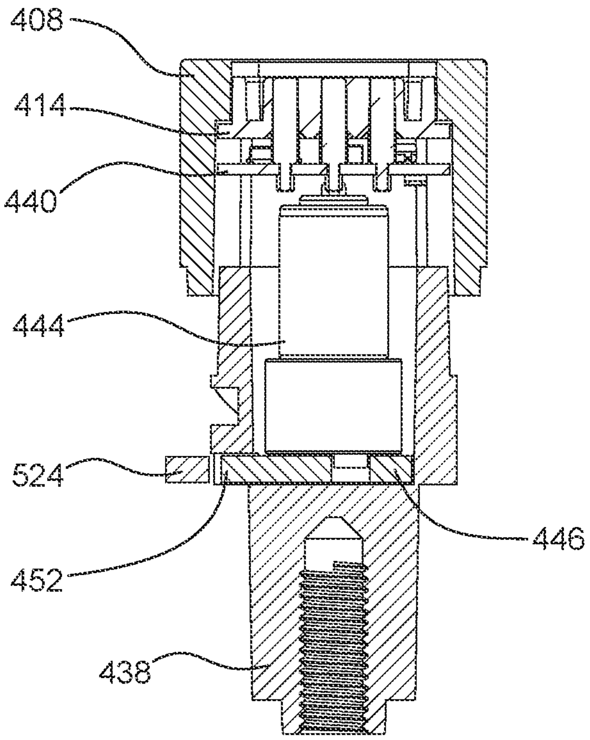
FIG. 62 is a section view of the electronic actuating assembly taken along line 49-49 in FIG. 48.
Figure 63:
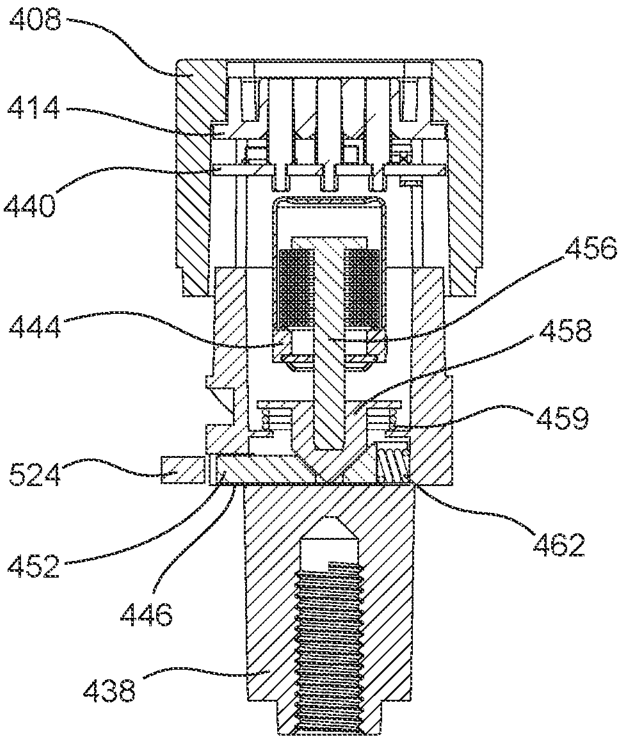
FIG. 63 is a section view of the second example of the electronic actuating assembly taken along line 49-49 in FIG. 48.

FIGS. 61-63 depict the combination lock 400 with the electronic override key 136 applied. In this position, the locking arm 510 is in the down position as in FIGS. 55-57, and the combination lock 400 is in the locked position. Upon successful application of the electronic key 136 to the knob 408, however, the electronics associated with the circuit board 440 cause the electric motor 444 (see FIG. 62) to rotate and pull the locking slider 446 such that the locking end 452 of the locking slider 446 is within the rotatable core 438. In the other disclosed embodiment, FIG. 63, the actuator 454 causes the push rod 456 and the ramp 458 to push downwardly, which interacts with the sloped surface 460 of the locking slider 446 to pull the locking end 452 of the locking slider 446 to within the rotatable core 438. With the locking end 452 of the locking slider 446 pulled within the rotatable core 438, it no longer abuts the locking end 524 of the locking arm 510, and therefore does not prevent rotation of the knob 408. The user can thereby open the combination lock 400. Again, an override key 136 is disclosed, but wireless technologies such as Bluetooth, BLE, NFC, and RFID may be used as well.

Figure 54:
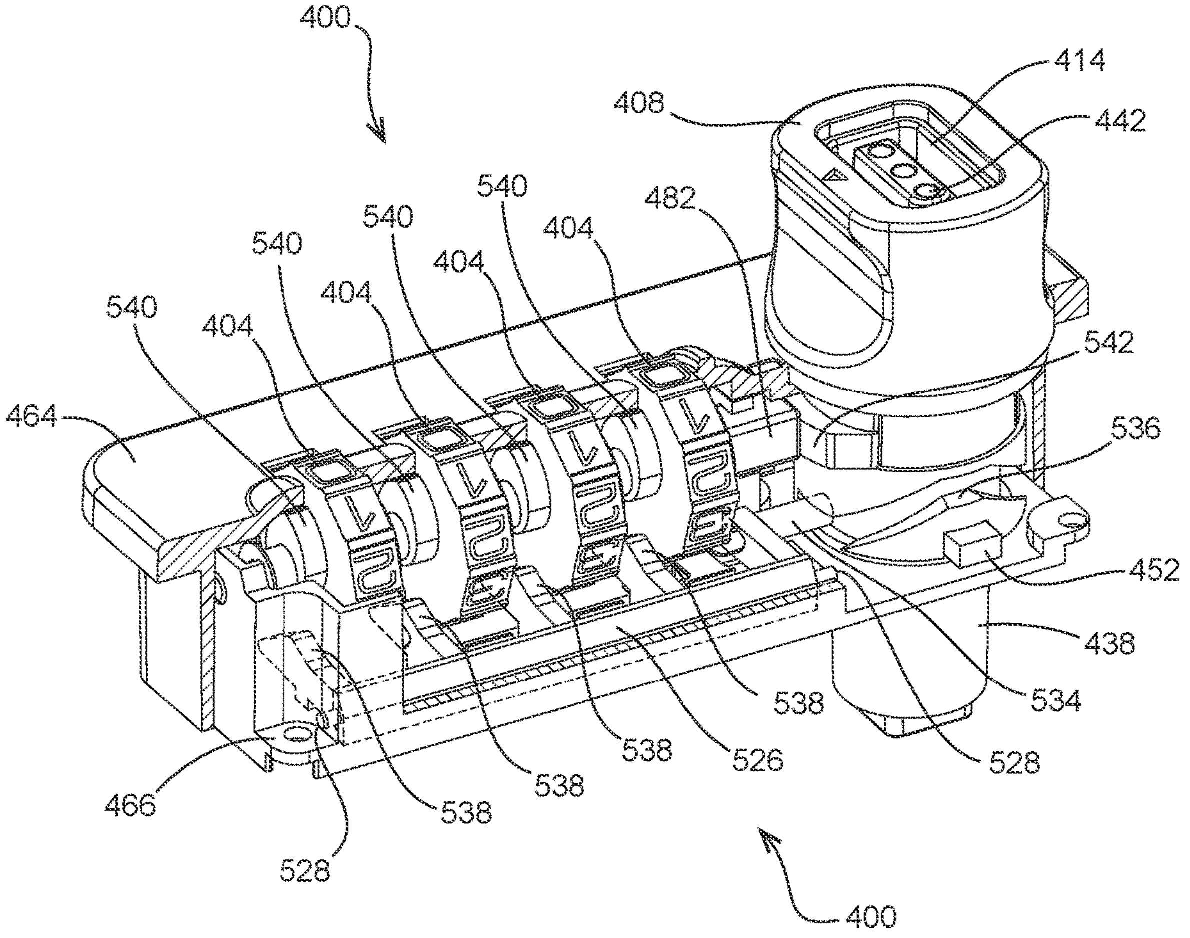
FIG. 54 is a perspective view of the combination lock of FIG. 45, with the housing in partial cutaway.
Figure 54A:
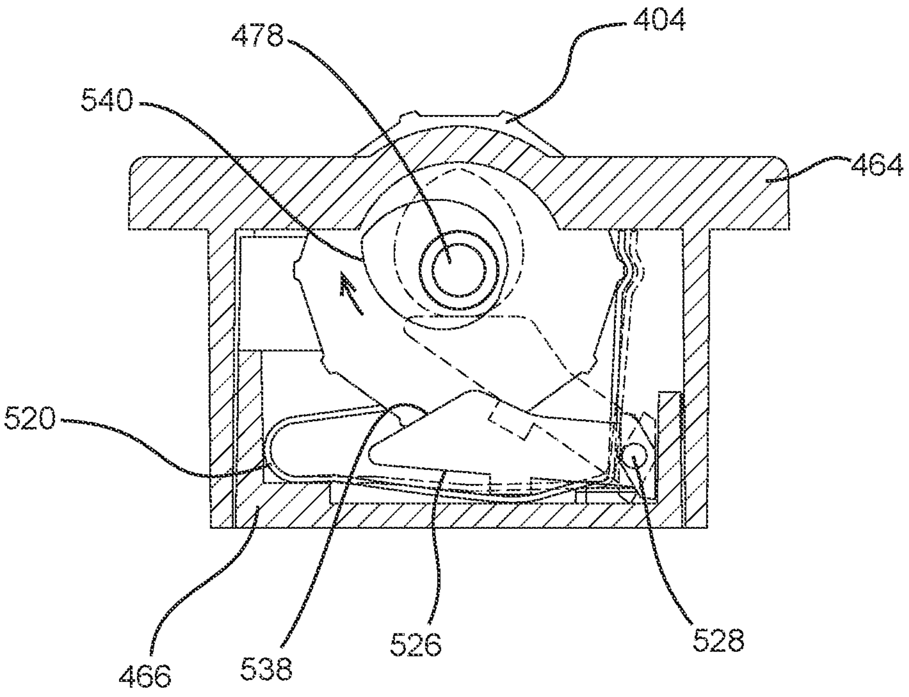
FIG. 54A is a right side view of the combination lock of FIG. 45, with the housing in partial cutaway.

As discussed above, the scrambling of the dials 404 is enabled by the interaction of the post 534 of the reset arm 526 and the cam channel 536 of the rotatable core 438. As can be seen in FIGS. 54 and 54A, the cam channel 536 can be designed such that when the knob 408 is rotated a quarter turn to open the lock 400, the cam channel 536 forces the reset arm 526 to pivot up, thereby scrambling all of the dials 404 to a selected position of "0." Thus, when a user turns the knob 408 to open the combination lock 400, the lock with automatically rotate the dials away from the pre-selected unlocking code so that the user does not accidentally leave the combination lock 400 in the unlocked position.

The unlocking combination for the combination lock 400 may also be easily reset. As best seen in FIG. 54, the knob 408 also may include a rib 542 extending radially outwardly. When the combination lock 400 is in the closed position, the rib 542 forces the push block 482 in the direction F, which forces the cam wheels 482 in direction F, such that the cam wheels 488 engage the dials 404.

Once the dials 404 are rotated and the cam wheels 488 are placed with flat edges 498 down—and the lock 400 is in the unlocked position—the user may rotate the knob 408 to the open position. The rib 542 serves as a cam surface, and the push block 482 as a cam follower. As the knob 408 is rotated, the thickness of the rib 542 relative to the push block 482 may recede. The push block 482, along with the cam wheels 488, will travel in direction S toward the knob 408 under force of spring 506. In this position, the cam wheels 488 are disengaged from the dials 404, and the recesses 500 of the cam wheels 488 are disposed on the protrusions 522 of the cradles 518. See FIG. 52. The dials 404 can therefore be rotated freely without rotating the cam wheels 488, and the cam wheels 488 remain in the unlocking position. In this manner, the end user can change the unlocking code. The user can then rotate the knob 408 back, with the rib 542 then re-engaging the push block 482 as the knob 408 is turned, which pushes the push block 482 back in direction F, thereby forcing the cam wheels 488 to engage with the dials 404 again, with the new unlocking code having been set.

Figure 64:
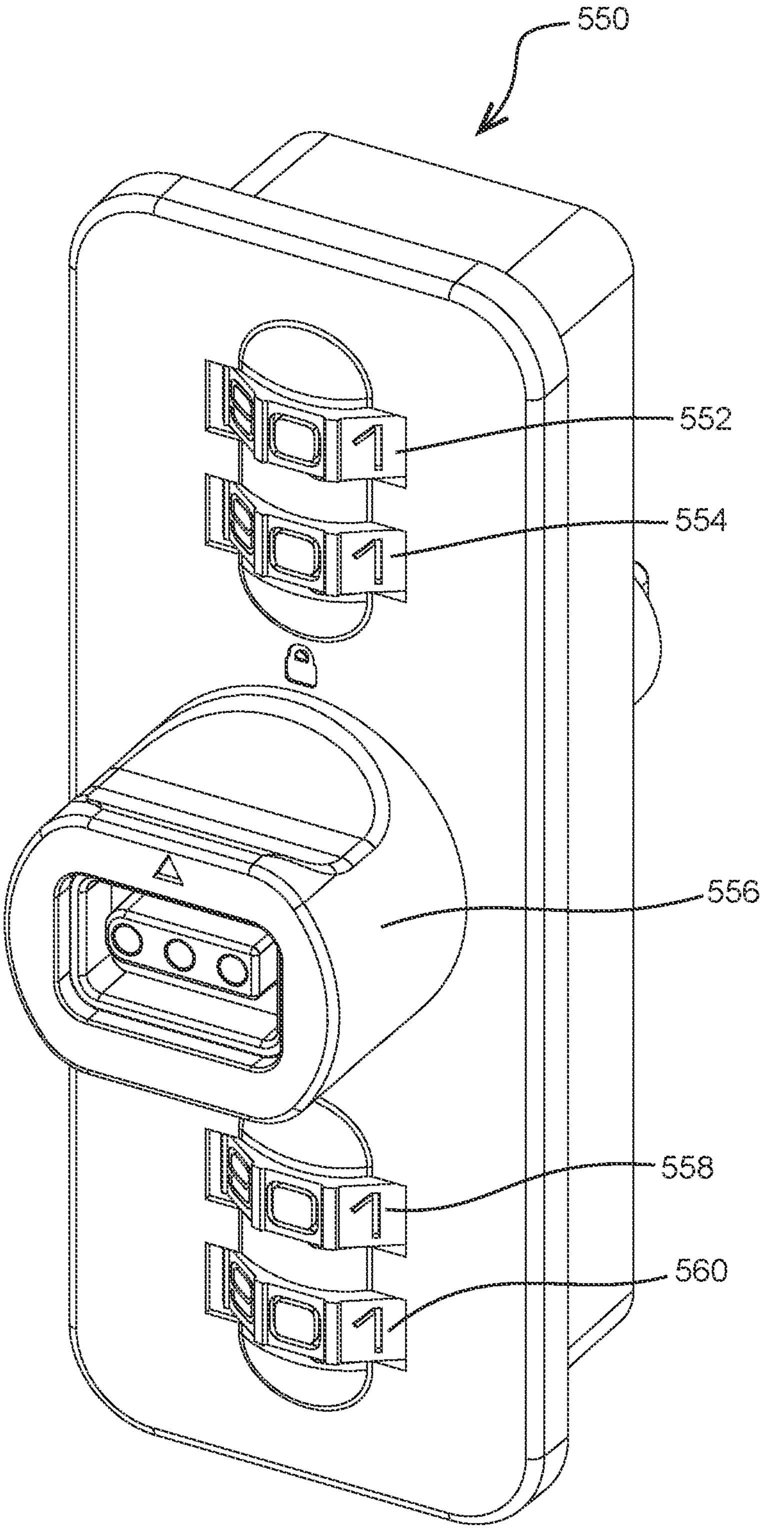
FIG. 64 is a perspective view of a seventh example of a combination lock.
Figure 65:
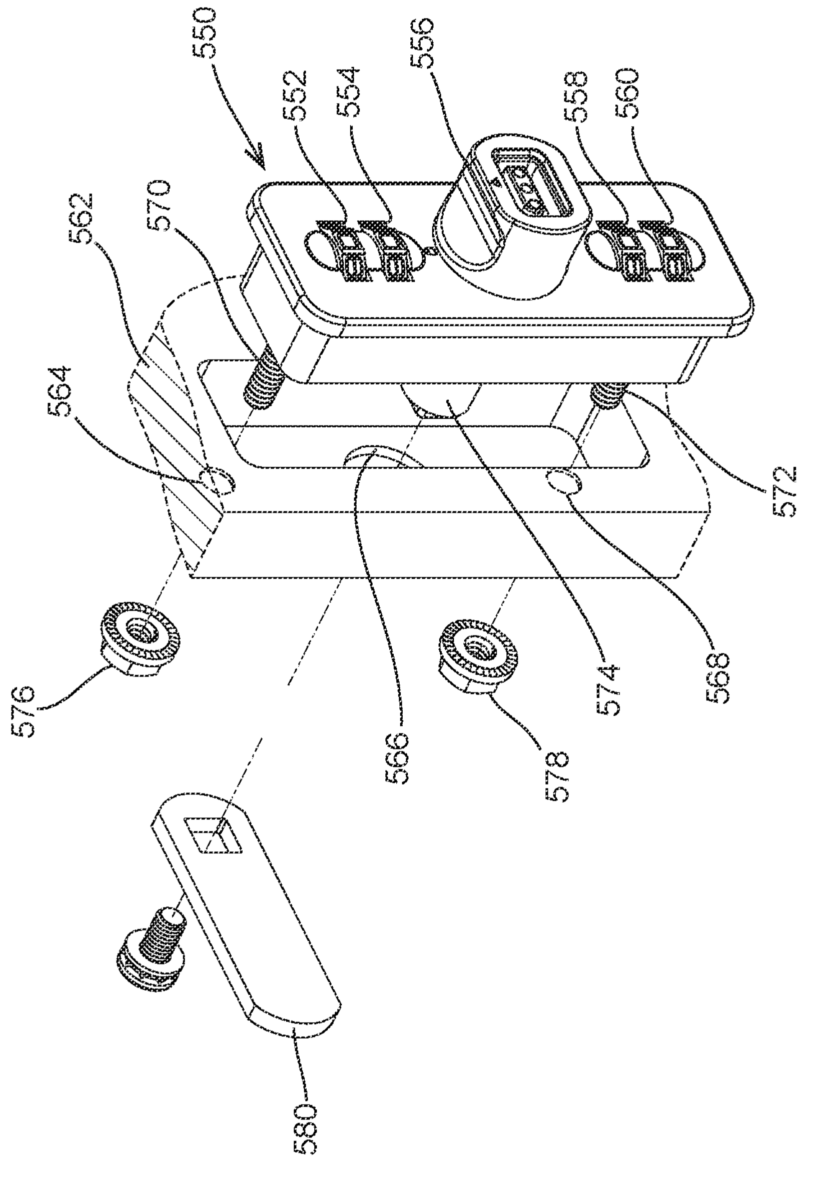
FIG. 65 is an exploded perspective view of the combination lock of FIG. 64 mounted to a door or panel.

Referring now to FIGS. 64 & 65, a sixth example of a combination lock 550 is disclosed. The combination lock 550 is similar in many ways to the combination lock 400 of the fifth example, with the following differences. The combination lock 550 is constructed to be mounted vertically, with first and second dials 552, 554 disposed above the knob 556, and third and fourth dials 558, 560 disposed below the knob 556. The dials 552, 554, 558, 560 rotate horizontally, with the indicia aligned accordingly.

Referring now to FIG. 65, the combination lock 550 is constructed to mount to a standard three-hole locker prep. Lockers have an industry standard three-hole configuration, vertically aligned, to which locks are mounted. The locker door 562 in FIG. 65 includes an upper hole 564, a middle hole 566, and a lower hole 568. Extending from a rear side of the combination lock 550 is a first threaded post 570 configured to extend through the upper hole 564 and a second threaded post 572 configured to extend through the lower hole 568. The rotatable core 574 extends through the middle hole 566. Once the threaded posts 570, 572 are placed through the first and third holes 564, 568, complementary nuts 576, 578 may be threaded on to the first and second posts 570, 572 to fasten the combination lock 550 to the door or panel 562, with the rotatable core 574 extending through the middle hole 566 and the locking element 580 affixed to the rotatable core 574 on the interior side of the door 562.

Figure 66:
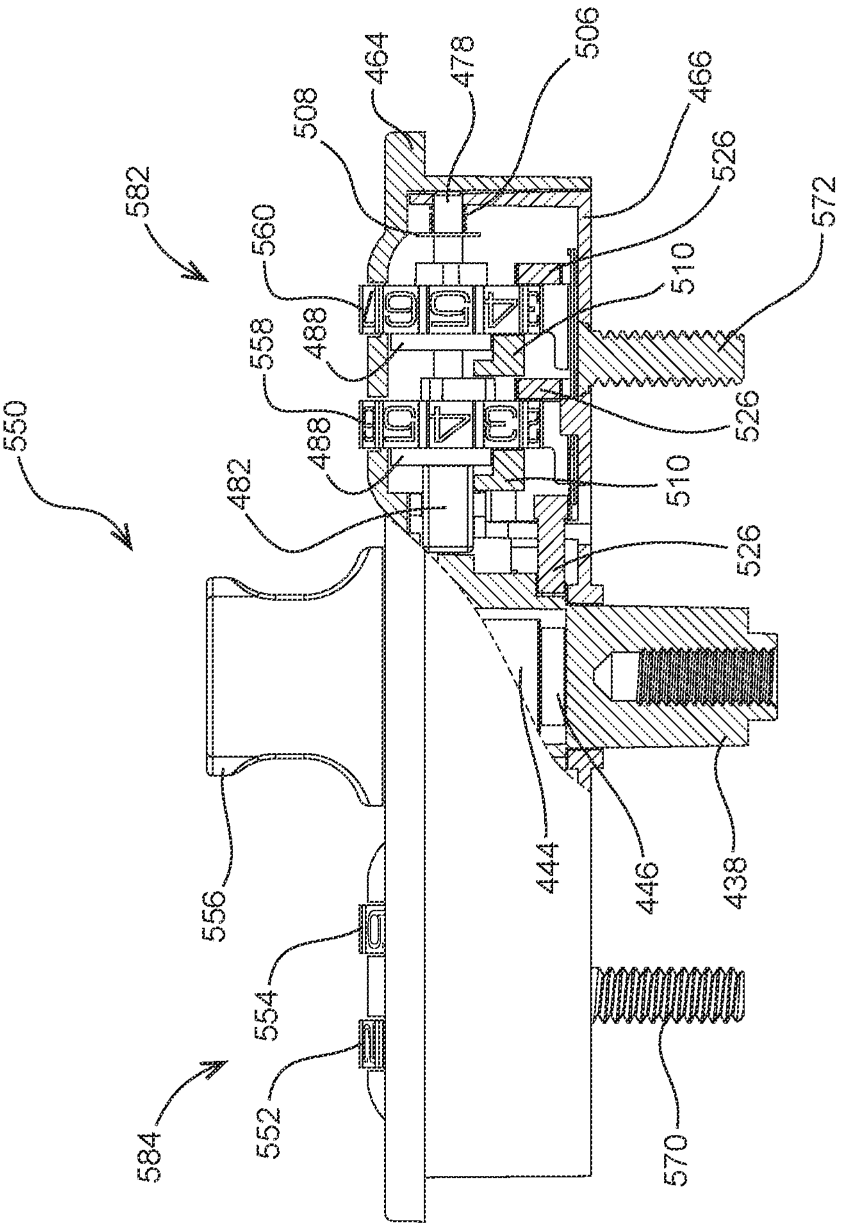
FIG. 66 is a front view of the combination lock of FIG. 64 in partial cutaway.
Figure 67:
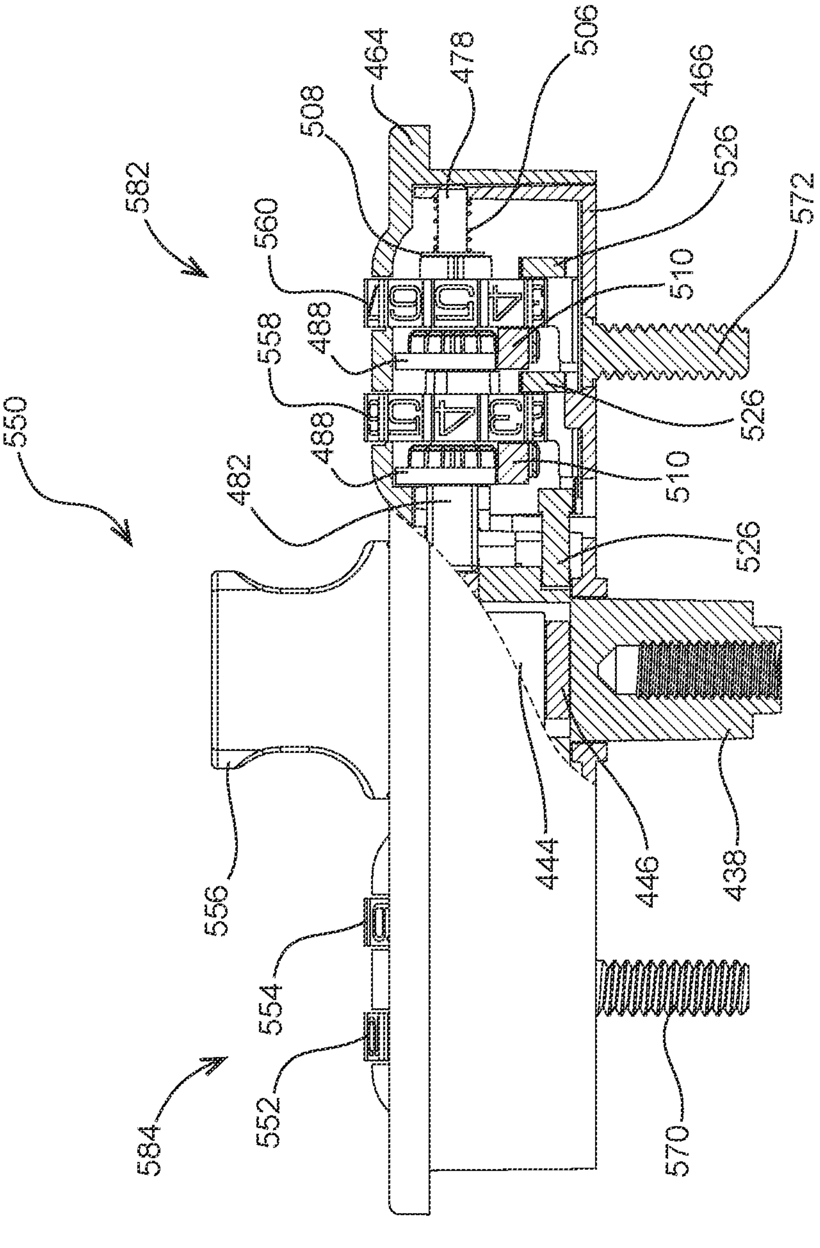
FIG. 67 is a front view of the combination lock of FIG. 64 in partial cutaway.

Referring now to FIGS. 66 and 67, the combination lock 550 includes an opposing right side 582 and left side 584 on either side of the knob 556. Each side 582, 584 can include structural elements that are a mirror image of the other. Further, each side 582, 584 includes structural elements that are the same as in the combination lock 400, but instead of having four dials 404 with associated structural elements, each side 582, 584 includes a total of two dials with associated structural elements. The structure and function of the combination lock 550 can otherwise be the same as the combination lock 400.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

The invention claimed is:

1. A combination lock with electronic override, comprising:

a knob rotatable between a first knob position in which the combination lock is in a closed position and a second knob position in which the combination lock is in an open position;

a drive shaft selectively couplable to the knob, wherein when the drive shaft is operatively coupled to the knob, the combination lock is in an unlocked position, and when the drive shaft is not operatively coupled to the knob, the combination lock is in a locked position;

a coupler disposed between the knob and the drive shaft and shiftable between at least two positions, wherein in a first coupler position, the knob is not operatively coupled to the drive shaft, and in a second coupler position the knob is operatively coupled to the drive shaft, least in part by the coupler, a circuit board including a processor;

a port in communication with the processor and configured to receive an access code;

an actuator in communication with the processor, the actuator operatively coupled to the coupler, wherein upon receipt of the access code by the port, the processor is configured to instruct the actuator to shift the coupler from the first coupler position to the second coupler position; and one or more rotatable selectors each having multiple indicia disposed thereon, the one or more rotatable selectors operatively coupled to the coupler;

wherein rotation of the one or more rotatable selectors to predetermined indicium is configured to selectively place the combination lock in the locked position and the unlocked position; and wherein when the combination lock is in the unlocked position, rotation of the knob causes rotation of the drive shaft to selectively place the combination lock in the closed position and the open position.

2. The combination lock of claim 1, wherein the port is configured to receive the access code wirelessly.

3. The combination lock of claim 2, wherein the port is configured to receive the access code via Bluetooth, BLE, NFC, or RFID.

4. The combination lock of claim 1, wherein the combination lock does not include a battery compartment.

5. The combination lock of claim 1, the actuator comprising a swing actuator, the swing actuator configured to shift the coupler in a direction parallel to a plane of rotation of the knob between the unlocked position and the locked position.

6. The combination lock of claim 5, the drive shaft further comprising a cylinder wall extending toward the plate and a recess in the cylinder wall comprising first and second notches in the cylinder wall.

7. The combination lock of claim 1, the actuator comprising a linear actuator, the linear actuator configured to shift the coupler in a direction parallel to a plane of rotation of the knob between the unlocked position and the locked position.

8. The combination lock of claim 7, the drive shaft further comprising a cylinder wall extending toward the plate and a recess comprising first and second notches in the cylinder wall.

9. The combination lock of claim 1, the actuator comprising a linear actuator, the linear actuator configured to shift the coupler in a direction perpendicular to the plane of rotation of the knob between the unlocked position and the locked position.

10. The combination lock of claim 9, the drive shaft further operatively connected to a recess sized and shaped to receive the coupler.

11. The combination lock of claim 1, wherein the port includes one or more electrical contacts, the combination lock further comprising an electronic key having a one or more contacts complementary to the one or more contacts in the port.

12. The combination lock of claim 11, the electronic key configured to provide sufficient current to power the processor and the actuator.

13. The combination lock of claim 11, wherein the electronic key is configured to supply the access code.

14. The combination lock of claim 11, wherein the electronic key comprises an administrator's mode, wherein the electronic key is adapted to actuate the actuator, and a manager's mode, wherein the electronic key is adapted to selectively actuate the actuator, delete the access code, and set a second access code.

15. The combination lock of claim 11, wherein the electronic key is configured to provide the access code, wherein the access code comprises a serial number and a revision number, and the processor is configured to store the access code in memory.

16. The combination lock of claim 15, wherein upon connection of the electronic key to the port, the processor is configured to store a second access code in memory if the revision number of the electronic key is greater than the revision number of the access code.

17. The combination lock of claim 1, further comprising a locking mechanism having a housing and adapted to receive the drive shaft, the locking mechanism further comprising a bolt, a cam, or a latch.

18. A combination lock with electronic override, comprising:

- a knob rotatable between a first knob position in which the combination lock is in a closed position and a second knob position in which the combination lock is in an open position;
- a coupler disposed distal the knob and shiftable between at least two positions, wherein in a first coupler position, the coupler is adjacent a bearing surface and the combination lock is in a locked position, and wherein in a second coupler position, the coupler is removed from the bearing surface and the combination lock is in a first unlocked position;
- a circuit board including a processor;
- a port in communication with the processor and configured to receive an access code;
- an actuator in communication with the processor, the actuator operatively coupled to the coupler, wherein upon receipt of an access code by the port, the processor is configured to instruct the actuator to shift the coupler from the first coupler position to the second coupler position; and
- one or more rotatable selectors each having multiple indicia disposed thereon, wherein rotation of the one or more rotatable selectors to predetermined indicium is configured to selectively shift the bearing surface between two positions, wherein in a first bearing position, the bearing surface is adjacent the coupler and the combination lock is in the locked position, and wherein in a second bearing position, the bearing surface is removed from the coupler and the combination lock is in a second unlocked position; and
- wherein when the combination lock is in the first unlocked position or the second unlocked position, rotation of the knob selectively places the combination lock in the closed position and the open position, wherein when the combination lock is in the locked position, the coupler and bearing surface prevent rotation of the knob.

19. The combination lock of claim 18, further comprising a lock plate, the lock plate comprises the bearing surface.

20. A combination lock, comprising:

- a housing;
- a knob disposed on a front side of the housing and rotatable between a first knob position in which the combination lock is in a closed position and a second knob position in which the combination lock is in an open position;
- a drive shaft operatively coupled to the knob;
- a locking element disposed on a back side of the housing and operatively coupled to the drive shaft;
- one or more rotatable selectors each having multiple indicia disposed thereon, wherein rotation of the one or more rotatable selectors to predetermined indicia is configured to selectively place the combination lock in a locked position and an unlocked position;
- wherein when the combination lock is in the unlocked position, rotation of the knob causes rotation of the drive shaft to selectively place the combination lock in the closed position and the open position;
- one or more cam wheels, each cam wheel operatively connected to a respective rotatable selector, each cam wheel having a periphery comprising a curved surface and a flat surface;
- a lock plate slidable in a direction parallel to the plane of rotation of the knob, the lock plate comprising one or more linear bearing surface, wherein when the flat surfaces of each cam wheel engage each respective linear bearing surface, the lock plate is configured to slide parallel to the plane of rotation of the knob and place the combination lock in the unlocked position; and
- an indicator window, the combination lock further comprising an indicator operatively coupled to the lock plate, wherein the indicator includes a first surface visible through the indicator window in the unlocked position and a second surface visible through the indicator window differentiable from the first surface in the locked position.

21. The combination lock of claim 20, wherein the locking element is a bolt or a cam blade.

* * * * *